(12) United States Patent
Katano et al.

(10) Patent No.: US 6,589,708 B1
(45) Date of Patent: Jul. 8, 2003

(54) IMAGE RECORDING BODY AND IMAGE FORMING DEVICE USING THE IMAGE RECORDING BODY

(75) Inventors: Yasuo Katano, Kanagawa (JP); Satoru Tomita, Kanagawa (JP); Minoru Morikawa, Kanagawa (JP); Kei Hara, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/673,653

(22) PCT Filed: Mar. 5, 1999

(86) PCT No.: PCT/JP99/01081
§ 371 (c)(1),
(2), (4) Date: Nov. 2, 2000

(87) PCT Pub. No.: WO00/51819
PCT Pub. Date: Sep. 8, 2000

(30) Foreign Application Priority Data

Mar. 2, 1999 (JP) ............................................. 11-53587

(51) Int. Cl.⁷ .............................. G03F 7/11; G03F 7/09; G03F 7/038; B41M 5/00; B41M 5/26

(52) U.S. Cl. ...................... 430/271.1; 430/19; 430/303; 430/964; 101/467; 347/221

(58) Field of Search .............................. 430/271.1, 303, 430/964, 19; 347/221; 101/467

(56) References Cited

U.S. PATENT DOCUMENTS

| | | | |
|---|---|---|---|
| 4,619,990 A | * 10/1986 | Elmasry | ..................... 430/964 |
| 4,733,422 A | 3/1988 | Schramm et al. | |
| 5,005,028 A | 4/1991 | Tamura et al. | |
| 5,132,704 A | 7/1992 | Nakagawa | |
| 5,278,126 A | 1/1994 | Katano et al. | |
| 5,335,001 A | * 8/1994 | Katano | ..................... 346/76 R |
| 5,436,642 A | * 7/1995 | Oyamaguchi et al. | ....... 347/221 |
| 5,471,234 A | 11/1995 | Katano et al. | |
| 5,632,204 A | 5/1997 | Lewis | ......................... 101/453 |
| 5,713,287 A | 2/1998 | Gelbart | ......................... 101/467 |
| 5,754,211 A | 5/1998 | Chung | |
| 5,792,278 A | 8/1998 | Wojcik | |
| 5,793,783 A | 8/1998 | Endriz | |
| 6,108,021 A | 8/2000 | Morikawa et al. | ........... 347/221 |

FOREIGN PATENT DOCUMENTS

| | | |
|---|---|---|
| DE | 4010275 A1 | 10/1990 |
| EP | 0 652 483 | 5/1995 |
| EP | 0 808 722 | 11/1997 |
| EP | 0 842 782 | 5/1998 |
| EP | 0 924 102 | 6/1999 |
| EP | 0 938 972 | 9/1999 |
| EP | 0 960 729 | 12/1999 |
| EP | 0 990 516 | 4/2000 |
| GB | 2 300 388 A | 11/1996 |
| JP | 57-109695 | 7/1982 |
| JP | 57-123073 | 7/1982 |

(List continued on next page.)

*Primary Examiner*—Richard L. Schilling
(74) *Attorney, Agent, or Firm*—Oblon, Spivak, McClelland, Maier & Neustadt, P.C.

(57) ABSTRACT

There is provided improvement of a light-heat conversion in a light-stimulated writing method.

An image recording body includes an element, which absorbs light (electromagnetic wave), provided in a surface of a recording body 10, or in a recording layer formed on uppermost layer of the recording body having a material exhibiting thermal changeable character of wettability, or in a substrate or an intermediate layer of the recording body. After a liquid is on the recording body 10 by a liquid forming means 3, light-stimulated writing is carried out. When the light-stimulated writing is carried out with light (electromagnetic wave) from a light (electromagnetic wave) source according to image information, an efficiency of light-heat conversion can be enhanced by a light (electromagnetic wave)-absorbing element.

8 Claims, 29 Drawing Sheets

FOREIGN PATENT DOCUMENTS

| | | |
|---|---|---|
| JP | 60-125948 | 7/1985 |
| JP | 61-133059 | 6/1986 |
| JP | 62-94043 | 6/1987 |
| JP | 63-319163 | 12/1988 |
| JP | 1-105906 | 4/1989 |
| JP | 03-178478 | 8/1991 |
| JP | 5-221116 | 8/1993 |
| JP | 5-278257 | 10/1993 |
| JP | 5-305764 | 11/1993 |
| JP | 6-8502 | 1/1994 |
| JP | 6-64301 | 3/1994 |
| JP | 6-72004 | 3/1994 |
| JP | 6-246950 | 9/1994 |
| JP | 6-255205 | 9/1994 |
| JP | 6-305238 | 11/1994 |
| JP | 7-52436 | 2/1995 |
| JP | 7-285232 | 10/1995 |
| JP | 8-150709 | 6/1996 |
| JP | 8-276663 | 10/1996 |
| JP | 9-201988 | 8/1997 |
| JP | 9-262997 | 10/1997 |
| JP | 9-300682 | 11/1997 |
| JP | 9-315025 | 12/1997 |
| JP | 10-95167 | 4/1998 |
| JP | 10-119333 | 5/1998 |
| JP | 10-211772 | 8/1998 |
| WO | WO 89/10264 | 11/1989 |

\* cited by examiner

FIG. 3
—[A]— SITE HAVING THERMAL CHANGEABLE CHARACTER OF WETTABILITY
—(B)— SITE HAVING ELECTROMAGNETIC WAVE ABSORBING ABILITY
FIG. 4
(A)
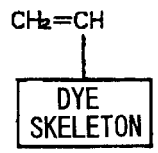
(B)　　　　(C)　　　　(D)
 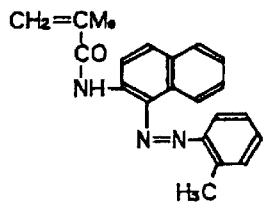 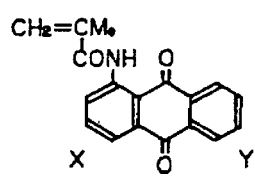

FIG. 15
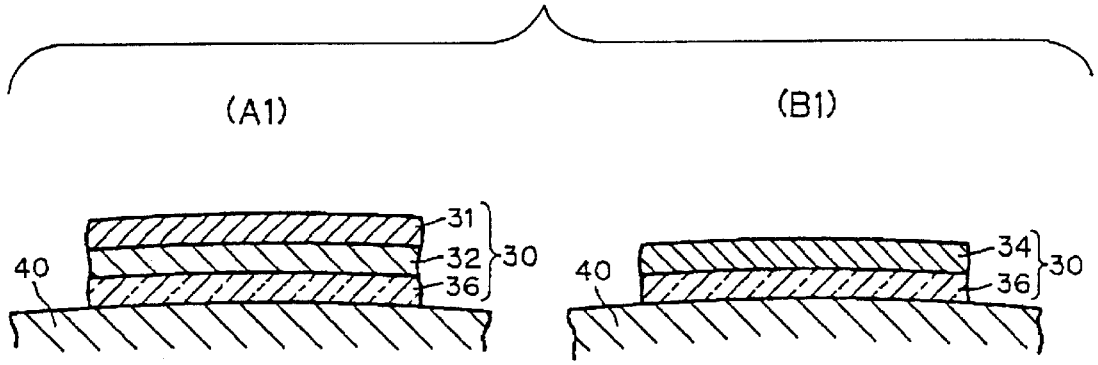
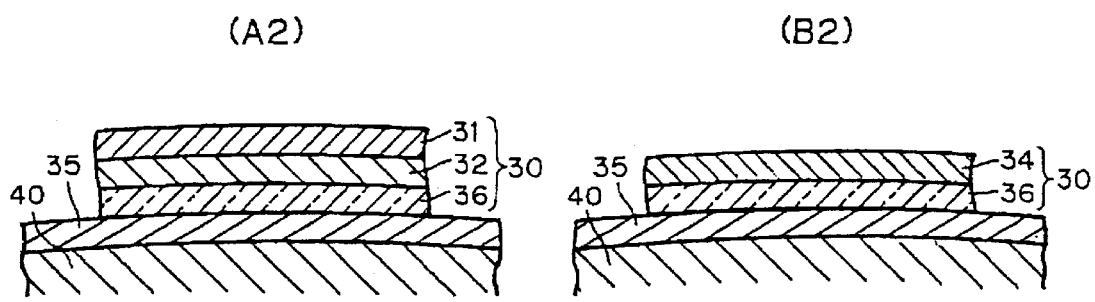
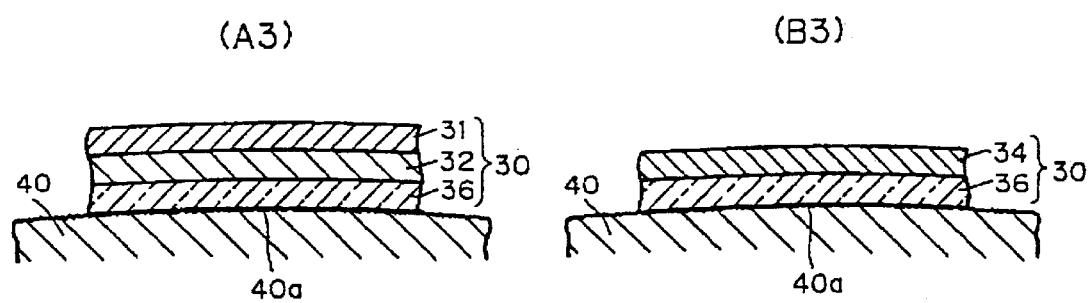
FIG. 16

PIXEL OF INTEREST

FIG. 36
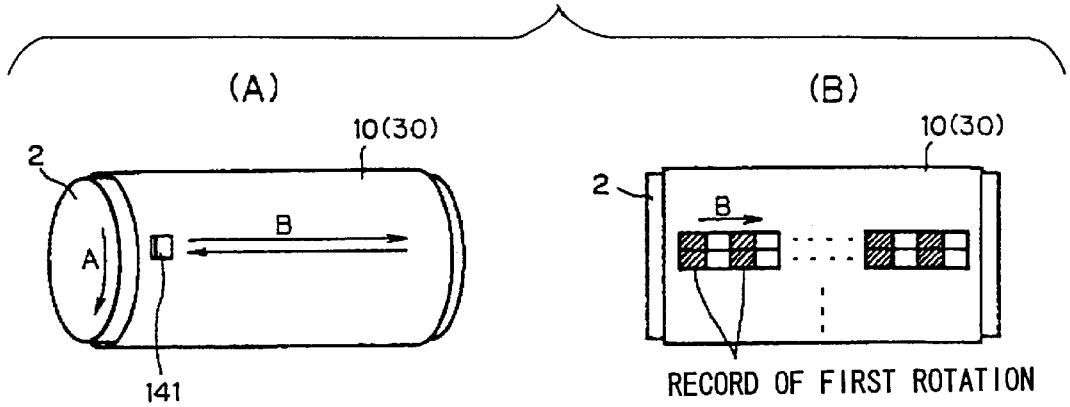
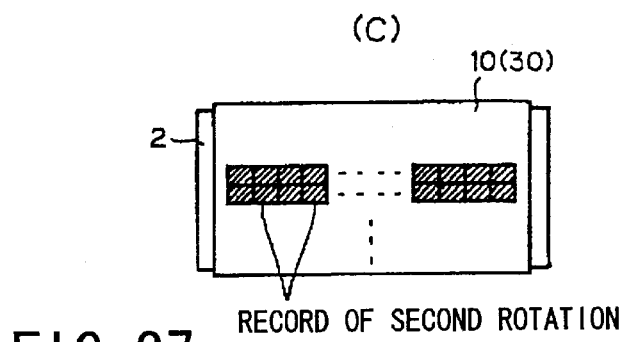
FIG. 37
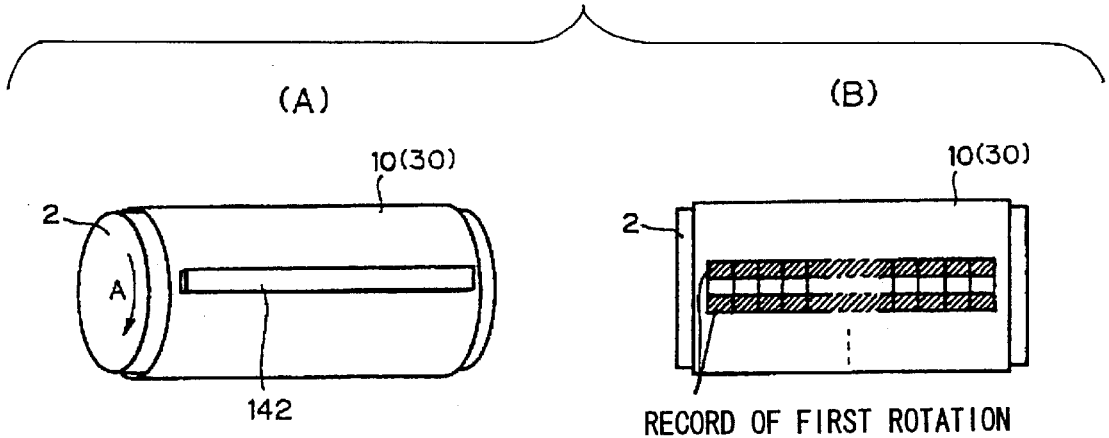
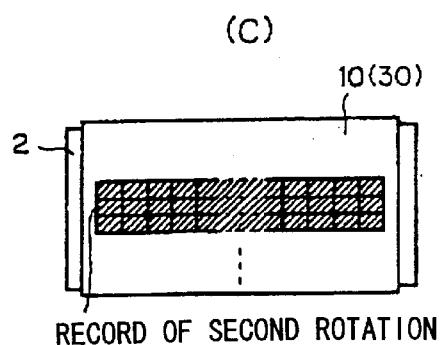

FIG. 44
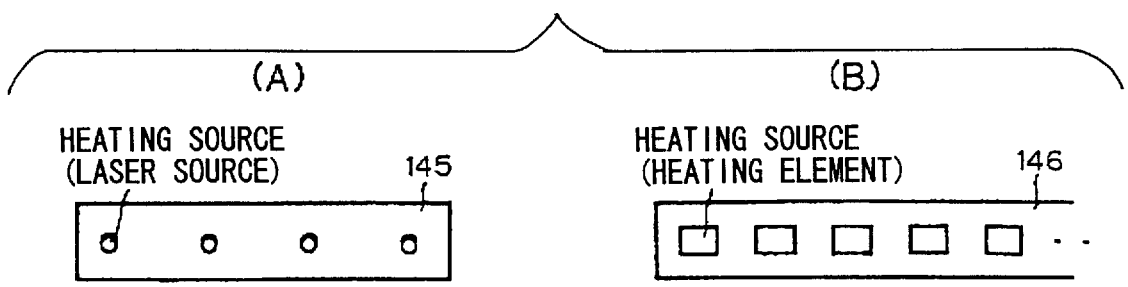
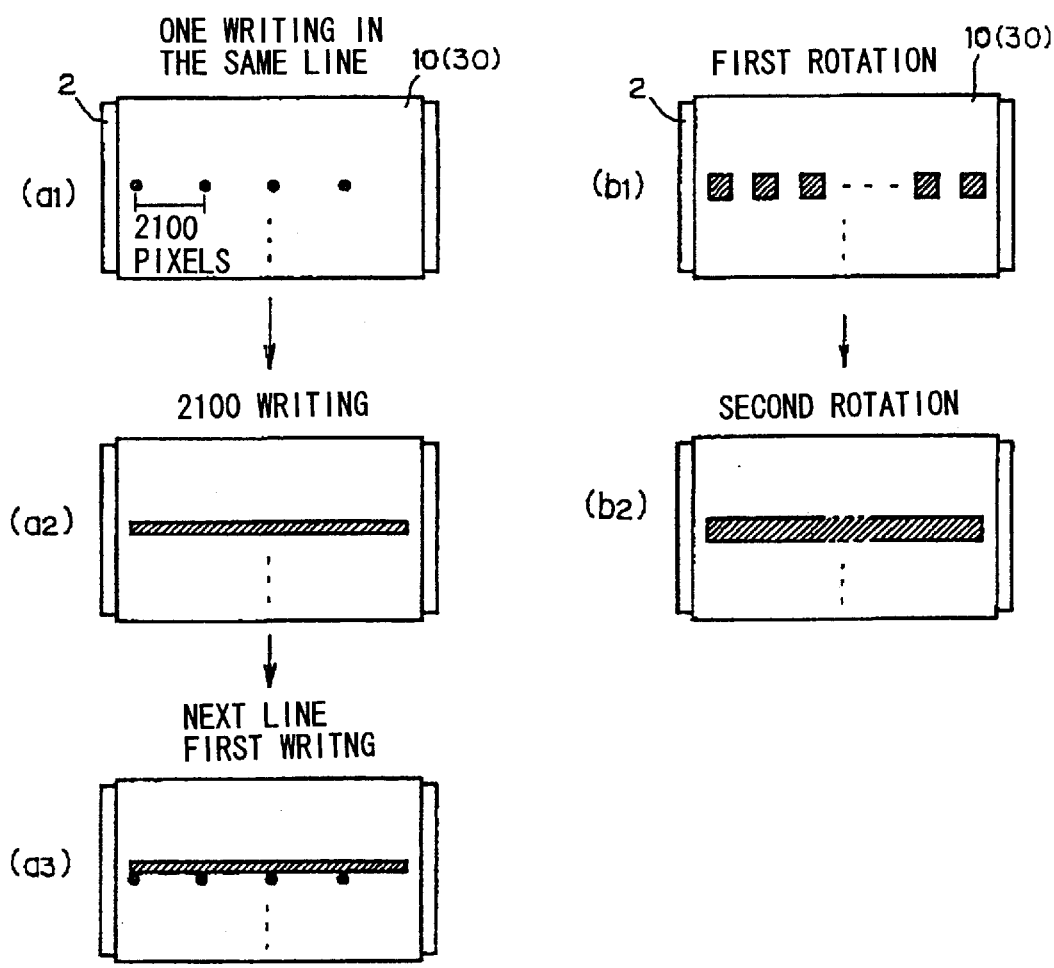

IMAGE RECORDING BODY AND IMAGE FORMING DEVICE USING THE IMAGE RECORDING BODY

TECHNICAL FIELD

The present invention relates generally to an image recording body and an image forming apparatus by use of the image recording body, and more particularly to a structure of the image recording body in order to form a latent image by means of a light (or heat)-stimulated writing method, improvement of a light-to-heat conversion efficiency during a light-stimulated writing operation, a long-life operation of a source for writing, an adjustment of a light (or heat) amount during the light-stimulated writing operation, a method for removing an ink remaining on the image recording body and a method for forming the latent image thereon.

BACKGROUND ART

FIG. 1 illustrates a schematic view of an essential part of an image forming apparatus of an embodiment according to the present invention. As shown in FIG. 1, the image forming apparatus comprises a heating source 1, a recording roller 2, an inking unit 3, an intermediate transfer roller 4, a recording paper 5, a pressure roller 6, an infrared heater 7, a cleaning unit 8, a liquid layer-forming roller 9 and an image recording body 10. Examples of the heating source 1 (preferably light source having a wavelength from 300 nm to 1300 nm) include a light-emitting diode array (which is hereinafter referred to as LED array), a semiconductor laser, a solid laser or the like. The image recording body 10 has surface characteristics that a receding contact angle decreases when a surface of the image recording body in a heated state is brought into contact with a liquid (hereinafter referred to as a liquid-attracting state), and the receding contact angle increases when the image recording body is heated in a state where the image recording body is not contact with the liquid (hereinafter referred to as a liquid-repelling state).

When the surface of the image recording body 10 is treated to become the liquid-attracting state, a liquid layer is formed on the surface of the image recording body 10 before the surface of the image recording body 10 is heated, or a liquid is come into contact with the surface of the image recording body 10 during a heating operation, or the liquid is come into contact with the surface of the image recording body 10 right after the surface is heated. As shown in FIG. 1, it is possible to form the liquid layer on the image recording body 10 by means of the liquid layer-forming roller 9. However, it is not necessary to use the liquid layer-forming roller 9 for formation of the liquid layer. For example, it is possible for the image recording body 10 to remove from the recording roller 2 or for the recording roller 2 to dip in the liquid, or for the liquid layer to form on the surface of the image recording body 10 by means of the cleaning unit 8.

As mentioned above, after the surface of the recording body becomes the liquid-attracting state, writing of an image can be carried out thereon. This image writing can be performed by scanning the heating source 1 with separation of the image recording body 10 from the inking unit 3, the intermediate transfer roller 4, the cleaning unit 8 or the like. As a scanning method, writing can be carried out by moving the heating source 1 in a main scanning direction by a linear motor or the like while rotating the recording roller 2, or a raster scanning can be applied for writing by means of polygon mirror or galvano mirror.

The image is then formed on the image recording body 10 and at this image forming period the recording paper 5 is fed while pressing the image recording body 10 with the intermediate transfer roller 4 and the inking unit 3. As the inking unit 3, a plurality of inking rollers can be used in order to control a thickness of an ink layer by means of a blade or the like 3b. An ink can be supplied from an upper portion of the blade 3b by dropping an ink from an ink supply container 3a.

After printing a desired press run, it is possible to reuse the image recording body 10 by forming another image thereon newly. At this time, that is to say, at the end of printing, the intermediate transfer roller 4 and the inking roller 3 are separated from the image recording body 10 and the cleaning unit 8 is brought into contact with the image recording body 10 so that the ink remaining thereon can be removed. After removal of the ink remaining on the image recording body 10, another liquid layer is formed on the surface of the image recording body 10 and the image recording body 10 is heated by means of the infrared heater 7 to treat the surface of the image recording body 10 so as to become the liquid-attracting state, while erasing the latent image of the previous image. However, in addition to the above method, as a method for treat the surface of the image recording body 10 so as to become the liquid-attracting state, it is possible to heat in a state where the liquid is come into contact with the surface of the image recording body 10 or for the surface of the image recording body 10 to bring into contact with the liquid right after heating the surface. In other words, as mentioned above, after printing a predetermined press run on the recording paper 5, the ink remaining on the image recording body 10 is removed and the latent image (a liquid-repelling region) formed on the image recording body 10 is erased, and the surface of the image recording body is then treated so as to become the liquid-attracting state. In this way, a new image (a latent image) can be formed on the image recording body 10 so that the image recording body 10 can be reused. That is to say, reuse of the image recording body 10 can be achieved by the following steps of: removing the ink remaining on the image recording body 10; forming the liquid layer on the surface of the image recording body by means of the liquid layer-forming roller 9; and heating the surface of the image recording body 10 by means of the infrared heater 7 to perform the liquid attracting treatment of the image recording body 10. As the cleaning unit 8, it is possible to use a waste 8b soaked with a cleaning liquid from the cleaning supply container 8a. The surface of the image recording body 10 is washed by pressing it with this waste 8b.

In writing of the image into the image recording body, there are positive writing and negative writing. As negative writing, by heating the image recording body 10 in a state where the body 10 is come into contact with an element selected from the liquid and/or a solid, or brought into contact with the element selected from the liquid and/or the solid right after the surface of the image recording body 10 is heated, the receding contact angle of an image region of the image recording body decreases so as to subject the surface of the image recording body 10 to the liquid-attracting treatment. By selectively heating a non-image region of the image recording body in the absence of the above contacting element, the receding contact angle of the non-image region of the image recording body increases so as to subject the surface of the image recording body to the liquid-repelling treatment. On the other hand, as positive writing, by selectively heating only the image region of the image recording body 10 in a state where the body is come into contact with the element selected from the liquid and/or the solid, or selectively brought into contact with the element selected from the liquid and/or the solid right after selectively heating the surface of the body, the image region of the image recording body 10 is subjected to the liquid-attracting treatment.

As stated above, in the image forming apparatus according to the present invention, the liquid-attracting treatment is performed on the image recording body 10 according to image information. The ink is attached to portions of the image recording body 10 subjected to the liquid-attracting treatment and the ink attached to the body 10 can be directly transferred to the recording paper 5 through the intermediate transfer roller 4 so as to achieve transfer and printing steps.

As described above, the image recording body 10 can be reused by the following steps of: printing the predetermined press run onto the recording paper 5; erasing the latent image (the liquid-attracting region) formed on the body 10 and removing the ink remaining thereon; and forming a new image (the latent image) on the body 10. That is to say, reuse of the image recording body 10 can be carried out by removing the ink remaining on the body 10 by use of the cleaning unit 8 or other means and then heating the image recording body 10 by means of the infrared heater 7 to provide the liquid-attracting state for the surface of the image recording body 10.

Japanese Laid-Open Patent Application No. 3-178478 describes a recording method by use of a thermosensitive material having changeable character of wettability. Japanese Laid-Open Patent Application No. 8-276663 describes a recording method by negative writing. However, the invention of the above patent application No. 3-178478 mainly relates to the recording method by means of a thermal head in which there may be occasions that a recording layer is mechanically damaged due to contact recording between the thermal head and a recording body having the recording layer. Also, for the recording method by negative writing described in the above patent application No. 8-276663, an efficiency of light-heat conversion of a light source is not enough high because of continuous oscillation of the light source. There are problems that writing for the above method is time-consuming and is required to employ an expensive device as the light source.

Further, in the recording method disclosed in the above patent application No. 8-276663, there are disadvantages that a lifetime of the light source is shorter as compared to positive writing.

Moreover, in a case where the above recording body having a light-heat converting layer, for example in a case of writing by means of laser light, when incident light from a surface of the recording layer is reflected at a surface of a substrate through the recording layer and the light-heat converting layer, regular reflecting component is strong and this component reaches a boundary surface between the light-heat converting layer and the recording layer or the surface of the recording layer, thereby leading to multi-reflections within the above layers. This results in spreading of exposed areas and a recording irregularity, such as a moire.

In addition, in order to reuse the recording body used once, a clear printing can not be performed with a recording paper fouled by the remaining ink unless the ink remaining on the recording body is removed completely.

Furthermore, in a case of writing to the recording body by use of a plurality of heating means, if only one of the heating means is broken, a non-image region which is not heated is produced, thereby giving rise to a line of scumming.

In a case where negative writing is also carried out, an irregularity in heating and cumulative heat of an image forming means during negative writing operation cause the image to be degraded.

In a case where negative writing is also performed through a rotating multi-face mirror, if sensitivity of the recording body is low, a rotation rate of the rotating multi-face mirror must be low, so that the rotation rate is unstable because of the absence of an action of inertia induced by the rotation. This result in an irregularity of the light-heat conversion, thus producing irregularities relating to an image density, dot size and dot line.

DISCLOSURE OF INVENTION

A technical feature of the present invention resides in an image recording body comprising an element, which absorbs light (which includes an electromagnetic wave) in response to image information to achieve recording, provided in a recording layer of the image recording body formed on an uppermost layer thereof comprising a material having thermal changeable character of wettability, or in a substrate of said image recording body or an intermediate layer thereof, thereby improving a light-heat conversion efficiency in the light-stimulated writing.

The present invention provides the recording body having the highest efficiency of the light-heat conversion, in which the material having the thermal changeable character of wettability includes an organic material comprising an element having the changeable character of wettability and an element which absorbs the light (which includes the electromagnetic wave) in response to image information to achieve recording.

According to the above invention, by dissolving or dispersing a dye or a pigment which absorb light (which includes the electromagnetic wave) in the material which exhibits the thermal changeable character of wettability so as to contain the dye or the pigment in the above material, the recording body comprises a recording material and a absorbing material, so that there is a wider selection for the recording and the absorbing materials.

According to the above invention, by providing a reflecting layer which reflects light (which includes the electromagnetic wave) placed between the recording layer comprising the material having the changeable character of wettability and the substrate, a number of reflections takes place at the recording body so that a optical path length in the redording layer extends, thereby increasing the efficiency of the light-heat conversion.

According to the above invention, a rough surface of the reflecting layer results in a scattering of the light, so that an even penetration of the light can be carried out.

The present invention further provides a recording apparatus by use of the recording body comprising the material showing the changeable character of wettability which is sensitive of heat, in which scannable light can be used as an image writing source and a long lifetime of the writing source can be realized as a positive light-stimulated writing by providing a liquid layer forming means for forming a liquid layer on a surface irradiated by the light of the recording body during the light-stimulated writing.

According to the above invention, when the liquid layer forming means is means for forming a gel-like element, both of an easy holding of the liquid layer and a liquid supply can be realized simultaneously.

According to the above invention, when the liquid layer forming means is means for forming a layer comprising a microcapsule-like fine particle element containing a liquid, stability both for the liquid supply and the liquid storage can be ensured.

According to the above invention, by providing a light (which includes the electromagnetic wave) transmissible film for the liquid layer forming means in order to keep the liquid layer between the liquid forming means and the surface of the recording body so as to form the film on the surface of the recording body in a state where the liquid is placed between the liquid layer forming means and the recording body, a High speed writing can by obtained easily.

The recording body according to the present invention comprises a recording layer, a light-heat converting layer, a base body and a regular reflection-preventing layer between the base body and the light-heat converting layer to inhibit the regular reflection of light which is used for writing. This results in weakness of the regular reflection component in a case of reflection at a surface of the base body, so that multi-reflection can be lowered within each layer.

The recording body according to the present invention comprises the recording layer, the light-heat converting layer, the base body has a finely irregular structure provided on a surface of a light-heat converting layer side thereof in order to inhibit the regular reflection of light which is used for writing. This results in weakness of the regular reflection component of the light without an increase in the number of the layer, so that multi-reflection can be lowered within each layer.

The recording body according to the present invention comprises a recording layer having a light-heat converting agent dispersed therein, a regular reflection-preventing layer to inhibit the regular reflection of light which is used for writing and passes through the recording layer and a base body carrying the regular reflection-preventing layer. The regular reflection component is weakened in a case of reflection at a surface of the base body, thereby lessening multi-reflection within each layer.

The recording body according to the present invention comprises a recording layer having a light-heat converting agent dispersed therein and a base body carrying the recording layer. By providing an finely irregular structure on a surface of a recording layer side of the base body in order to inhibit the regular reflection of light which is used as writing and passes through the recording layer, the regular reflection component can be weakened in the event of reflection at the base body of the substrate without increase in the number of the layer, so that multi-reflection can be lowered within each layer.

Since the recording body according to the present invention comprises a recording layer, a light-heat converting layer, a transparent base body and a regular reflection-preventing layer to inhibit the regular reflection of light which is used to record onto an opposite side of the light-heat converting layer to the transparent base body, a regular reflection component can be weakened in a case of reflection at a back surface of the transparent base body, so that multi-reflection can be lowered within each layer.

The recording body according the present invention comprises a recording layer, a light-heat converting layer and a transparent base body. Since the transparent base body comprises a back surface thereof having a finely irregular structure, the surface being arranged in an opposite side to the light-converting layer having the finely irregular structure, the regular reflection component can be weakened in the event of the reflection at the back surface of the transparent base body without increase in the number of the layer.

Since the recording body according to the present invention comprises a recording layer having a light-heat converting agent dispersed therein, a transparent base body carrying the recording layer, a regular reflection-preventing layer provided on a surface arranged in an opposite side to the recording layer on the transparent base body in order to inhibit the regular reflection of light which is used for recording, the regular reflection component can be weakened in a case of reflection at a back surface of the transparent base body, so that multi-reflection can be lowered within each layer.

Since the recording body according to the present invention comprises a recording layer having a light-heat converting agent dispersed therein and a transparent base body, the transparent base body having a finely irregular structure on an opposite surface to the light-heat converting layer, the regular reflection component can be weakened in the event of reflection at the back surface of the transparent base body without increase in the number of the layer, so that multi-reflection can be lowered within each layer.

According to the present invention, in a carrier of the recording body carrying a transparent recording medium against light which is used for recording, by providing a reflecting layer on the surface of the carrier of the recording body in order to inhibit the regular reflection of the light which is used for recording, the regular reflection component can be weakened in the event of the reflection at the surface of the carrier, so that multi-reflection can be lowered within each layer.

According to the present invention, in a carrier of the recording body carrying a transparent recording medium against the light which is used for recording, by providing a finely irregular structure on the surface of the carrier, the regular reflection component can be weakened in a case of reflection at the surface of the carrier without increase in the number of the layer, so that multi-reflection can be lowered within each layer.

The recording body according to the present invention comprises a recording layer having the thermal changeable character of wettability and a substrate carrying the recording layer. The recording layer of the recording body is heated to form a latent image on the recording layer and the latent image is developed to transfer to a recording paper. The recording body has a surface having a roughness of less than 20 $\mu$m.

The recording body according to the present invention comprises a recording layer having the thermal changeable character of wettability and a substrate carrying the recording layer. The recording layer of the recording body is heated to form the latent image on the recording layer and the latent image is then developed to transfer to the recording paper. The recording body has the recording layer having a pencil hardness of more than H.

The recording body according to the present invention comprises a recording layer having the thermal changeable character of wettability and a substrate carrying the recording layer. The recording layer of the recording body is heated to form the latent image on the recording layer and the latent image is developed to transfer to the recording paper. The recording body has the recording layer having a Young's modulus of less than $1.0 \times 10^7$ N/m$^2$ and a thickness of more than 2 $\mu$m.

The recording body according to the present invention comprises a recording layer having the thermal changeable character of wettability and a substrate carrying the recording layer. The recording layer of the recording body is heated to form the latent image on the recording layer and the latent image is then developed to transfer to the recording paper. The recording body has the substrate having a Young's modulus of less than $5.0 \times 10^8$ N/m$^2$ and a thickness of more than 25 μm.

The recording body according to the present invention comprises a recording layer having the thermal changeable character of wettability, a substrate and a cushion layer which is placed between the recording layer and the substrate and has a elastic property. The recording layer of the recording body is heated to form the latent image on the recording layer and the latent image is then developed to transfer to the recording paper. The recording body comprises the cushion layer having a Young's modulus of less than $8.0 \times 10^7$ N/m$^2$ and a thickness of more than 5 μm.

According to the present invention, a method of removing an ink remaining on a recording body having the thermal changeable character of wettability, the method comprising the steps of coating a liquid which is compatible with a resin and a pigment which are contained in a recording ink on the recording body, and then wiping the liquid thus coated.

According to the present invention, a method of removing an ink remaining on a recording body having the thermal changeable character of wettability, the method comprising the steps of coating an involatilizable or a volatilizable solvent which is contained in a recording ink on the recording body, and then wiping the solvent thus coated.

According to the present invention, a method of removing an ink remaining on a recording body having the thermal changeable character of wettability, the method comprising the steps of coating a liquid which is compatible with a resin and a pigment which are contained in a recording ink on the recording body, and then supersonically cleaning the recording body.

According to the present invention, a method of removing an ink remaining on a recording body having the thermal changeable character of wettability, the method comprising the steps of coating a involatilizable or a volatilizable solvent which is contained in a recording ink on the recording body, and then supersonically cleaning the recording body.

According to the present invention, the surface of the recording body is cleaned after removal of the ink remaining on the recording body by any one of the methods described above.

According to the present invention, a method of removing an ink remaining on a surface of a recording body having the changeable character of wettability, the method comprising the steps of bringing a adhesive element into contact with the surface of the recording body developed already, and then stripping the adhesive element from the surface of the recording body, so that the remaining ink can be removed from the surface of the recording body together with the adhesive element.

According to the present invention, a method of removing an ink remaining on a surface of a recording body having the changeable character of wettability, the method comprising the steps of bringing an element having a rougher surface than that the surface of the recording body into contact with the surface of the recording body developed already, and then stripping the element from the surface of the recording body, so that the remaining ink can be removed from the surface of the recording body together with the element.

According to the present invention, a method of removing an ink remaining on a surface of a recording body having the changeable character of wettability, the method comprising the steps of forming a solid film on the surface of the recording body developed already, and then stripping the solid film from the surface of the recording body, so that the remaining ink can be removed from the surface of the recording body together with the solid film.

According to the present invention, a method of removing an ink remaining on a surface of a recording body having the changeable character of wettability, the method comprising the steps of completely curing the ink remaining on the surface of the recording body by an air drying, and then removing the ink by any one of the method described above.

According to the present invention, a method of removing an ink remaining on a surface of a recording body having the changeable character of wettability, the method comprising the steps of completely curing the ink remaining on the surface of the recording body compulsorily, and then removing the ink by any one of the method described above.

According to the present invention, an image forming apparatus comprising an image forming means for forming a latent image on an image region of a recording body by selectively heating a non-image region of a recording body, in which the latent image formed on the recording body is developed to transfer to a recording paper, wherein the image forming means comprises a plurality of heating sources for the recording body (that is to say, a multi-head), so that a same pixel can be heated by the plurality of heating sources and if a failed heating source is produced during writing, formation of a non-image region due to non-heating can be prevented, thereby eliminating generation of a line of scumming.

In the above invention, when a part of the multi-head is always heated to produce a failed heating source and the failed heating source is located at a marginal region, a region to be written by the failed heating source is not compensated by other heating source, so that time required for writing compensation is saved, thereby allowing capacity of control program to be reduced.

In the above invention, the image forming means comprises a multi-head having a broader recording width than that of an image formation area. A heating failure due to too much use can be inhibited by move the multi-head in a main scanning direction each time a predetermined printing is carried out.

In the above structure of the apparatus according to the present invention, the image forming means comprises a multi-head having a broader recording width than that of an image formation area. A heating failure due to too much use can be inhibited by move the multi-head in a main scanning direction every predetermined period.

In the above invention, the image forming means comprises heating means for heating an image region and heating means for heating a marginal region. A heating failure due to too much use can be inhibited by the above image forming means.

In the above invention, by using the heating means for heating the marginal region comprising the multi-head having a lower resolution than that of the heating means for heating the image region, so that a heating time for the marginal region can be shortened, thereby reducing a time for image formation.

In the above structure of the apparatus according to the present invention, a resistance value of each heating source of the multi-head and/or a voltage across a resistant element connected in series with the heating source are detected to examine whether or not the failed heating source is present by comparing the detected voltage with a defined voltage. If the failed heating source is generated, no formation of a non-image region by non-heating can be prevented, thereby eliminating generation of a line of scumming.

In the above structure, as a negative writing means, the image forming means heats the recording body in a state where the recording body is in contact with an element selected from a liquid and/or a solid, the recording body having surface properties in which a receding contact angle decreases (a liquid-attracting state) when the recording body comes into contact with the liquid in a heated state thereof and the receding contact angle increases (a liquid-repelling state) when the recording body is heated in a non-contact state with the liquid. Alternatively, right after a surface of the recording body is heated, the surface comes into contact with the element selected from the liquid and/or the solid to decrease the receding contact angle of the surface of the recording body, that is to say a liquid-attracting treatment. And then, an entire area of the surface of the recording body becomes liquid-attracting state and a region not to be recorded is then heated selectively by the image forming means in the absence of the liquid and/or the solid to make the region liquid-repelling state.

In the above structure, the image forming means comprises a plurality of heating sources corresponding to a respective recording ink color, so that a multi-color image can be obtained with high quality.

According to the present invention, an image forming apparatus comprising an image forming means for forming a latent image on an image region of a recording body by selectively heating a non-image region of the recording body, wherein the image forming means has a function that a writing heat quantity can be adjusted and a heated temperature can be adjusted to prevent an irregularity of heating.

In the above structure, the image forming means has a function that the writing heat quantity can be adjusted in response to temperature information of the recording body, so that an optimal heat quantity can be supplied based on a standard temperature of the recording body, thereby allowing a high quality image to be produced.

In the above invention, the image forming means has a function that the writing heat quantity can be adjusted in response to heating information of a pixel neighboring a pixel to be heated (a pixel of interest) and the pixel written with the pixel of interest at the same time or the pixel written already, so that the influence of a temperature irregularity on the pixel of interest in accordance with a heated state of the neighboring pixel can be inhibited and formation of a high quality image can be carried out.

In the above structure, by using the image forming means, for the pixel of interest the writing heat quantity can be changed in accordance with a heat record of a plurality of written lines which are in the same scanning direction or are in a near position and the influence of the temperature irregularity on the pixel of interest in response to the heat record of the written plurality of lines, thereby producing the high quality image.

In the above structure, the image forming means comprises the multi-head having a plurality of the heating source for the recording body. By changing the heat quantity form the multi-head in accordance with the number of the heating sources driving simultaneously, an irregularity of the heat quantity produced by the heat quantity of the heating source driving simultaneously can be inhibited, thereby producing the high quality image.

In the above structure, by using the image forming means, writing can be carried out every at least other line in a sub-scanning direction, so that accumulation of heat can be prevented during writing, thus allowing the high quality image to be produced while suppressing the thermal irregularity.

In the above structure, a writing rate can be changed in response to image information by use of the image forming means, so that an irregularity of accumulation of heat can be prevented during various writing in accordance with image information, thereby allowing the high quality image to be produced.

In the above structure, the writing rate can be changed in response to an increased temperature of the recording body by use of the image forming means, so that an increase in the temperature of the recording body can be lowered during writing, thereby producing the high quality image.

In the above structure, image formation can be carried out by increasing the heat quantity at an initial writing by use of the image forming means, so that a deficiency in the heat quantity can be prevented before the temperature of the recording body is stabilized, thereby producing the high quality image.

In the above structure, the image forming means comprises the multi-head and the pixel in the same line can be recorded more than every at least other pixel, so that accumulation of heat can be inhibited and the irregularity of heating can be eliminated to produce the high quality image.

In the above structure, the image forming means comprises the multi-head having a plurality of heating sources, each heating source being formed more than every other pixel, so that accumulation of heat can be inhibited and the irregularity of heating can also be eliminated to produce the high quality image.

In the above structure, the image forming means comprises the multi-head and the-pixel in the same line and in a spiral line can be recorded every at least other pixel, so that accumulation of heat can be inhibited and the irregularity of heating can also be eliminated to produce the high quality image.

In the above structure, the image forming means comprises the multi-head and the pixel in the same line can be recorded every at least other pixel. After the last line is completed, the image forming means or the recording body is movable in the main scanning direction to continue formation of the image, so that accumulation of heat can be inhibited and the irregularity of heating can also be eliminated to produce the high quality image.

In the above structure, as a negative writing means, the image forming means heats the recording body in a state where the recording body is in contact with an element selected from a liquid and/or a solid, the recording body having surface properties in which a receding contact angle decreases (a liquid-attracting state) when the recording body comes into contact with the liquid in a heated state thereof and the receding contact angle increases (a liquid-repelling state) when the recording body is heated in a non-contact state with the liquid. Alternatively, right after a surface of the recording body is heated, the surface comes into contact with the element selected from the liquid and/or the solid to decrease the receding contact angle of the surface of the recording body, that is to say a liquid-attracting treatment, thereby making an entire area of the surface of the recording body liquid-attracting state and then a non-image region of the recording body is heated selectively by the image forming means in the absence of the contacting element, such as the liquid and/or the solid to make a region not to be recorded the region liquid-repelling state.

In the above structure, the image forming apparatus comprises a plurality of image forming means corresponding to a respective recording ink color, so that a multi-color image can be obtained with high quality.

According to the present invention, an image forming apparatus comprising a laser source controlled to emit laser light in response to image information, a rotating multi-face mirror to scan the laser light from the laser source, a motor to rotate the rotating multi-face mirror, and a recording body irradiated with the laser light reflected by the rotating multi-face mirror, in which a latent image is formed on the recording body by irradiating the laser light in response to image information, wherein the recording body is a low sensitive recording body comprising a light-heat converting material which converts the laser light irradiated onto the recording body to heat, the rotating multi-face mirror is stably rotated at a low rate with a rate reducing means to which the motor is rotated at a high rotation of a stable rotation region to transmit a rotating force, so that a rotation of the multi-face mirror can be stabilized to allow a scanning rate and a scanning time of the laser light to be constant and lesser irregularities of an image density, dot and a line size (for example, broadening or narrowing) can be obtained to provide an inexpensive light scanning apparatus.

In the above invention, by providing a disk-like mass member having a weight equal to or more than that of the rotating multi-face mirror for the motor or a rotating axis of the rotating multi-face mirror, the rotation of the multi-face mirror can be stabilized at the low rate, so that lesser irregularities of an image density, dot and a line size (for example, broadening or narrowing) can be obtained to provide an inexpensive light scanning apparatus.

BRIEF DESCRIPTION OF DRAWINGS

FIG. 3 illustrates a schematic view showing a structural example in accordance with the present invention, the structure having light-(which includes an electromagnetic wave) absorbing ability within the recording body;

FIG. 4 shows a fundamental and specific structure of a polymeric dye;

FIG. 15 illustrates a cross-sectional view to explain other example of the recording body according to the present invention;

FIG. 16 illustrates a cross-sectional view to explain one example of the recording body according to the present invention;

FIG. 36 shows an essential schematic view to explain other embodiment according to the present invention;

FIG. 37 shows an essential schematic view to explain other embodiment according to the present invention;

FIG. 44 shows a diagrammatic view to explain other embodiment according to the present invention;

BEST MODE FOR CARRYING OUT THE INVENTION

Figure 2:
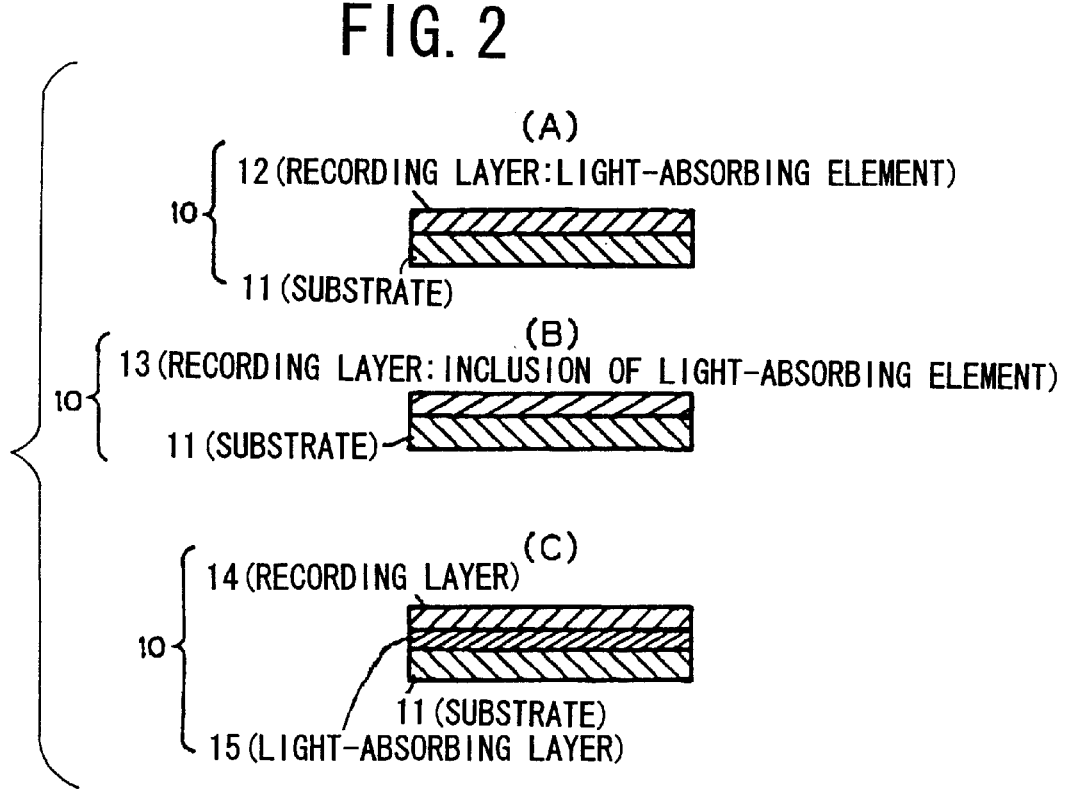
FIG. 2 illustrates an essential cross-sectional view showing an embodiment of a recording body according to the present invention.

FIG. 2 illustrates an essential cross-sectional structural view showing an embodiment of a recording body 10 according to the present invention. According to the present invention, a liquid is formed on a surface of the recording body 10 so as to absorb light (which includes an electromagnetic wave) by the liquid. FIG. 2(A) shows an example in a case where the recording body 10 comprises a substrate and a recording layer 12 provided on the substrate, the recording layer itself being a light-absorbing element. FIG. 2(B) shows an example in a case where the light (electromagnetic wave)-absorbing element contained within a recording layer so as to form the recording layer 13 comprising a light-absorbing element therein. FIG. 2(C) shows an example in a case where a light (electromagnetic wave)-absorbing layer 15 comprising the light-absorbing element is placed between the substrate 11 and the recording layer 14. Examples of such light-absorbing elements contained in the recording layer includes those as listed in Table 1 and 2. It is possible to use a dye and/or a pigment as the light-absorbing element.

TABLE 1

1. LIGHT-HEAT CONVERTING MATERIAL

| TRADE NAME | MAKER | ABSORPTION CHARACTERISTICS | | RAW MATERIAL NAME | REMARKS |
| --- | --- | --- | --- | --- | --- |
| | | 350~420 nm | ABOUT 1000 nm | | |
| ① COLOR FILTER CM-500S | HOYA | MORE THAN 60% TRANSMITTANCE | LESS THAN 2% TRANSMITTANCE | GLASS | MELT MIXING OF RAW MATERIAL AT THE TIME OF CASTING OF GLASS |
| ② NIR ABSORPTION FILM | KANEBO | 400 nm → 40% | LESS THAN 3% TRANSMITTANCE | POLYESTER HAVING A NEAR-INFRA-RED ABSORBING DYE DISPERSED THEREIN | HAVING ABSORPTION IN ULTRA VIOLET PORTION |
| ③ UGF-02 | KUHEHA LENTEK | MORE THAN 40% TRANSMITTANCE | LESS THAN 10% TRANSMITTANCE | ACRYLATE-BASED RESING USING A NEAR INFRA-RED ABSORBING DYE | |
| ④ SH-11 (T40) | SUMITOMO OSAKA CEMENT | MORE THAN 20% TRANSMITTANCE | LESS THAN 10% TRANSMITTANCE | THERMAL SHIELDING MATERIAL BASED ON INORGANIC MATERIAL | WHEN INCREASING A THICKNESS, ABSORPTION OF ULTRA-VIOLET PORTION BECOMES STRONG |
| ⑤ PA-1001 | MITSUI TOHATSU CHEMICAL | 375 nm → 50% | λ max 1110 nm LESS THAN 35% TRANSMITTANCE | METAL COMPLEX SYSTEM | SAMPLE AVAILABLE |
| ⑥ IRF-1000 | FUJI FILM | NO IDENTIFICATION | λ max 1000 nm | | NEED FOR REEXAMINATION |
| ⑦ DIINMONIUM | A. C. C | NO IDENTIFICATION | λ max 1090 nm | DIINMONIUM BASED-COMPOUND | NEED FOR REEXAMINATION |
| ⑧ NK-3508 | NIHON KAKOH SHIKISO | HIGH TRANSMITTANCE | λ max 1090 nm | CYANINE DYE | SPECTRUM OK |
| ⑨ NKX-114 | NIHON KAKOH SHIKISO | LOW TRANSMITTANCE | λ max 1090 nm | METAL COMPLEX SYSTEM | SPECTRUM NG |

TABLE 2

| TRADE NAME | MAKER | ABSORPTION CHARACTERISTICS | | RAW MATERIAL NAME | REMARKS |
| --- | --- | --- | --- | --- | --- |
| | | 350~420 nm | ABOUT 1000 nm | | |
| ⑩ IRG-022 | NIHON CHEMICAL | 400 nm → 50% | LESS THAN 2% TRANSMITTANCE | DIINMONIUM BASED-COMPOUND | SPECTRUM OK SAMPLE AVAILABLE |

TABLE 2-continued

| | TRADE NAME | MAKER | ABSORPTION CHARACTERISTICS 350~420 nm | ABOUT 1000 nm | RAW MATERIAL NAME | REMARKS |
|---|---|---|---|---|---|---|
| ⑪ | SIR-132 | MITSUI TOHATSU CHEMICAL | LOW TRANSMITTANCE | λ max 1070 nm | METAL COMPLEX SYSTEM | SPECTRUM NG SAMPLE AVAILABLE |
| ⑫ | CARBON BLACK | ORIENT CHEMICAL | ALL SURFACE ABSORPTION | ALL SURFACE ABSORPTION | | |
| ⑬ | SIR BLACK 1051M | MITSUI TOHATSU CHEMICAL | ALL SURFACE ABSORPTION | ALL SURFACE ABSORPTION | | |
| ⑭ | NIR-AMI | TEIKOKU CHEMICAL SANGYO | LOW TRANSMITTANCE | λ max 1070 nm | METAL COMPLEX SYSTEM | SPECTRUM NG SAMPLE AVAILABLE |
| ⑮ | NK-2545 | NIHON KANKO SHIKISO | HIGH TRANSMITTANCE | λ max 1050 nm | CYANINE DYE | SPECTRUM OK |
| ⑯ | NK-3509 | NIHON KANKO SHIKISO | HIGH TRANSMITTANCE | λ max 1050 nm | CYANINE DYE | SPECTRUM OK |
| ⑰ | NK-3555 | NIHON KAKOH SHIKISO | HIGH TRANSMITTANCE | λ max 1050 nm | CYANINE DYE | SPECTRUM OK SAMPLE AVAILABLE |
| ⑱ | NK-3519 | NIHON KAKOH SHIKISO | HIGH TRANSMITTANCE | λ max 1050 nm | CYANINE DYE | SPECTRUM OK |

As a light (electromagnetic wave) generating source 1, it is suitable to use a solid laser such as YAG laser, a semiconductor laser and a LED array. As a method for scanning light to the surface of the recording body, use is preferably made of the method based on a raster scanning with a polygon mirror and a galvano mirror, and the scanning method with rotating the recording body. It is preferable to use a shorter wavelength of the light (electromagnetic wave), so that a spot size irradiated by the source 1 becomes smaller to obtain a high resolution.

EXAMPLE

Functional material having the thermal changeable character of wettability: Acrylate-based polymer containing a fluorine atom Substrate: Polyester film Light (electromagnetic wave)-absorbing material: Cyanine-based dye Layer structure: A content of 1 wt % to 10 wt % of the cyanine dye was added in the recording layer.

Light (electromagnetic wave) source: Semiconductor laser having a wavelength of 800 nm.

Result: An image recording could be accomplished with one-tenth of an irradiation energy, as compared to a conventional material system.

Figure 1:
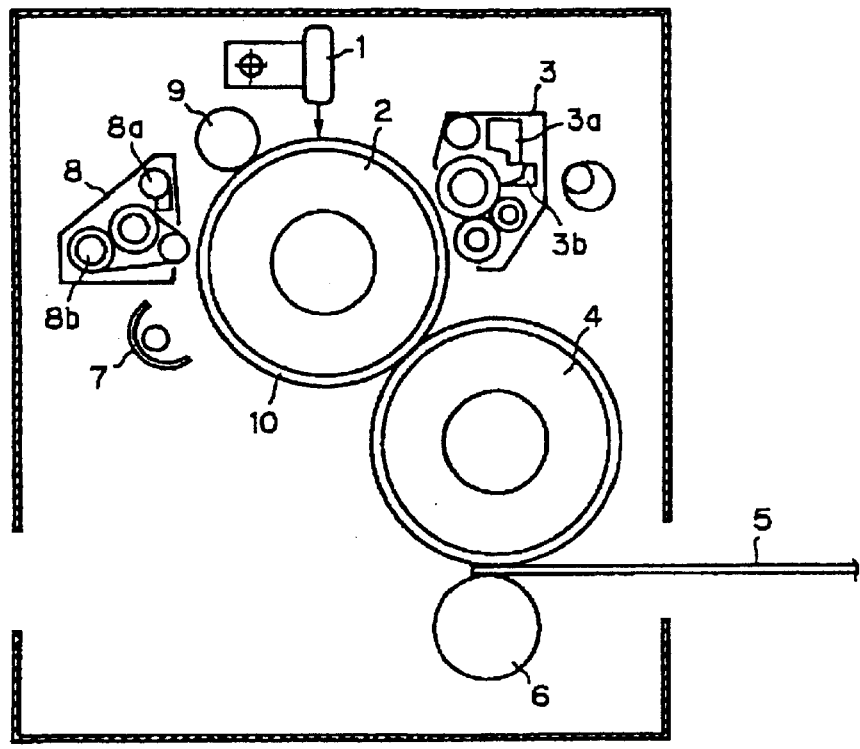
FIG. 1 shows an essential structural view to explain one example of an image forming apparatus which is applicable to the present invention.

FIG. 3 illustrates a schematic view showing a structural example of the recording body 10 having light-absorbing ability shown in FIG. 1. In this figure, A part is a site having the thermal changeable character of wettability and B part is a site having the light (electromagnetic wave)-absorbing ability. As shown in FIG. 3, as the recording body itself having the electromagnetic wave absorbing ability, it is preferable to use a coplymer comprising a monomer having the changeable character of wettability such as the polymer disclosed in Japanese Laid-Open Patent. Application No. 3-178478, and a monomer having a skeleton structure of the dye as a side chain, so-called a polymeric dye.

FIG. 4 shows examples of the polymeric dyes described above. Basically, as shown in FIG. 4(A), a structure of the polymeric dye is based on a vinyl monomer, that is to say, the vinyl monomer having the dye as the side chain. More specifically, it is possible to use the monomer having the structure as shown in FIGS. 4(A), 4(B) and 4(C).

EXAMPLE

Functional material having the thermal changeable character of wettability: Copolymer comprising an acrylate-based polymer containing the fluorine atom Substrate: Polyimide film Light (electromagnetic wave)-absorbing material: Monomer having a phthalocyanine-based dye as a pendant group.

Layer structure: Copolymer comprising the acrylate-based monomer containing the fluorine atom and the above monomer.

Light (electromagnetic wave) source: Semiconductor laser having a wavelength of 800 nm.

Result: An image recording could be accomplished with one-twentieth of the irradiation energy, as compared to the conventional material system.

Alternatively, it is possible to use the dye or pigment dissolved or dispersed in the recording layer, the dye or pigment absorbing incident light into the recording layer. In this case, the recording layer contains the recording layer material and the absorbing material separately. This results in a wide selection of each material. It is preferable to contain a concentration of from 10 wt % to 30 wt % in a case of the pigment, and from 1 wt % to 10 wt % in a case of the dye.

EXAMPLE

Functional material having the thermal changeable character of wettability: Acrylate-based polymer containing the fluorine atom.

Substrate: Polyester film

Light (electromagnetic wave)-absorbing material: Cyanine-based pigment (A particle size is 0.1 μm).

Layer structure: A content of 10 wt % to 50 wt % of the cyanine-based pigment was dispersed within the recording layer.

Light (electromagnetic wave) source: Semiconductor laser having a wavelength of 800 nm.

Result: An image recording could be accomplished with one-eighth of the irradiation energy, as compared to the conventional material system.

Further, a reflection layer is provided between the substrate and the recording layer containing the material having the changeable character of wettability so that multiple reflections tales place within the recording layer. This allows an optical path length of light to lengthen, thereby improving an efficiency of the light-heat conversion.

Figure 5:
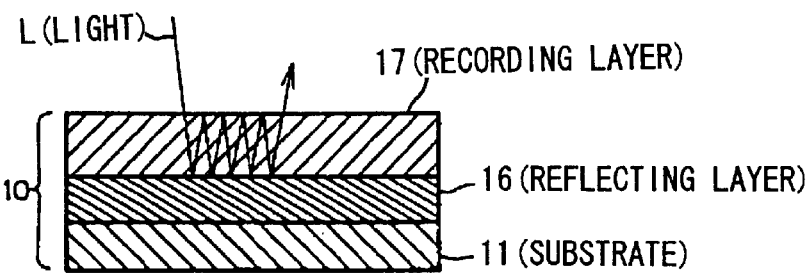
FIG. 5 illustrates an essential structural view showing one example in a case where a reflecting layer is provided within the recording body.

Referring to FIG. 5, as stated above, the reflection layer 16 reflects light (electromagnetic wave) L repeatedly so that the length of the optical path can be increased. This results in improvement of the light-heat conversion efficiency. As the reflecting layer, it is desirable to use the substrate 11 deposited with aluminum and the substrate 11 coated or deposited with a white oxide, for example titanium oxide and aluminum oxide or the like. Alternatively, it is possible to use a primer provided on a surface of the reflecting layer 16 in order to avoid that a contact strength may be deteriorated between the recording layer 17 and the primer.

EXAMPLE

Functional material having the thermal changeable character of wettability: Acrylate-based polymer containing the fluorine atom.

Substrate: Polyester film

Light (electromagnetic wave)-absorbing material: Cyanine-based dye.

Layer structure: A content of 1 wt % to 10 wt % of the cyanine-based dye was contained in the recording layer.

Light (electromagnetic wave) source: Semiconductor laser having a wavelength of 800 nm.

Reflection layer: Aluminum was deposited on the substrate with a thickness of 1000 Å.

Result: An image recording could be accomplished with one-twentieth of the irradiation energy, as compared to the conventional material system.

Figure 6:
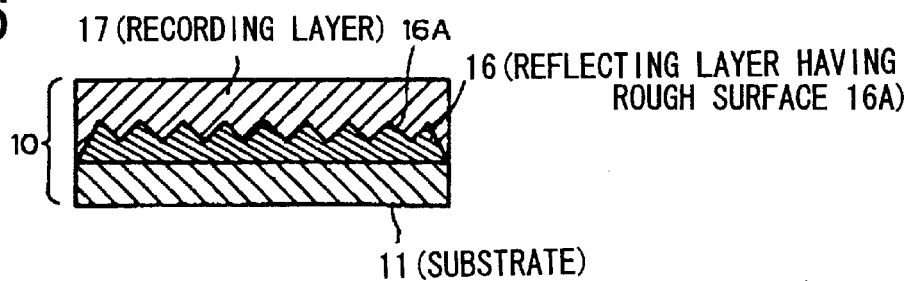
FIG. 6 illustrates a cross-sectional view showing one example in a case where a rough face is formed on a surface of the reflecting layer, the surface being adjacent to a recording layer.

Referring to FIG. 6, a rough surface 16A is formed on a surface of the reflecting layer, the surface being adjacent to the recording layer, so that light is scattered at the rough surface 16A. An even penetration of light can be improved by the light scattering at the rough surface. It should be noted that a roughness of the surface of the reflecting layer 16 is from 0.1 $\mu$m to 10 $\mu$m, this value being defined as Rz.

EXAMPLE

Functional material having the thermal changeable character of wettability: Acrylate-based polymer containing the fluorine atom.

Substrate: Polyester film

Light (electromagnetic wave)-absorbing material Cyanine-based dye.

Layer structure: A content of 1 wt % to 10 wt % of the cyanine-based dye was contained in the recording layer.

Light (electromagnetic wave) source: Semiconductor laser having a wavelength of 800 nm.

Reflection layer: Aluminum was deposited on the substrate having the roughness of 0.1 $\mu$m defined as Rz with the thickness of 1000 Å.

Result: An image recording could be accomplished with one-twentieth of the irradiation energy, as compared to the conventional material system.

Japanese Laid-Open Patent Application No. 8-276663 discloses a method for negative writing in which there are the drawbacks that a lifetime of a light source tends to shorten as compared to positive writing, since the light source is operated continuously. Because of this, it is necessary to lengthen the lifetime of the light source, to cope with easiness of holding the liquid layer and supply of the liquid, to ensure stability of supply and storage of the liquid, and to facilitate high rate writing, as positive writing.

Figure 7:
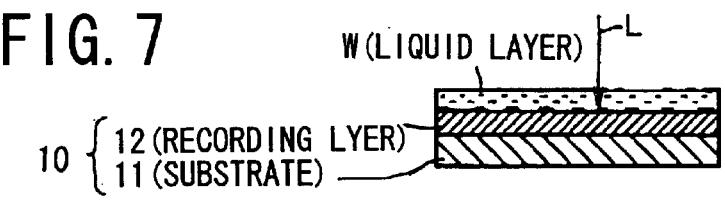
FIG. 7 illustrates a cross-sectional view of an example of a recording body used in a prior art, the example using a liquid.

As shown in FIG. 7, the recording body comprises the substrate 11 and the recording layer 12. The liquid layer W is formed on the recording layer 12 by a liquid layer forming means 9. The recording body 10 has surface characteristics in which when a surface of the recording body 10 is brought into contact with the liquid, a receding contact angle decreases (a liquid-attracting state), or when the surface of the recording body 10 is heated in a non-contact state with the liquid, the receding contact angle increases (a liquid-repelling state). An only image region is heated in a contact state with an element selected from the liquid and/or a solid, or right after the surface of the recording body is heated, the surface is selectively brought into contact with the element selected from the liquid and/or the solid, so as to form a latent image on the recording body. The latent image is developed by means of an inking unit 3 to form an image, and the image is then transferred through a transfer roller 4 or is recorded directly into a recording paper 5. The light (electromagnetic wave) generating apparatus is used as heating means 1 and heating is carried out in the non-contact state with the recording body.

As a method for forming the liquid layer W on the recording body, it is possible to coat the liquid or to attach a film containing the liquid or the like. As the liquid for use in the liquid layer W, it is possible to use a liquid having a non-repelling property on the recording body 10, for example a liquid having a surface energy near that of the recording body 10, an ink solvent (this solvent has the advantages that it is unnecessary to remove the liquid layer after writing), a viscous liquid containing water and a water-soluble resin (polyvinyl alcohol, polyvinyl pyrrolidone or the like) or the like.

Formation of the liquid layer W and irradiation of light (electromagnetic wave) L are carried out by pre-forming the liquid layer W on the surface of the recording body 10 followed by irradiating the light (electromagnetic wave) L, or pre-irradiating the light (electromagentric wave) followed by forming the liquid layer W on the surface of the recording body 10 while using a residual heat. Alternatively, Formation of the liquid layer W and irradiation of the light (electromagnetic wave) L are carried out simultaneously.

EXAMPLE

Substrate: Polyester film

Functional material having the thermal changeable character of wettability: Acrylate-based polymer containing the fluorine atom.

Light (electromagnetic wave)-absorbing material: Cyanine-based dye.

Layer structure: A content of 1 wt % to 10 wt % of the cyanine-based dye was contained in the recording layer.

Light (electromagnetic wave) source: Semiconductor laser having a wavelength of 800 nm.

Means for supplying the liquid layer: Coating on the surface of the recording body by means of a porous elastic roller impregnated with an involatile solvent of the ink.

Result: A positive image recording could be accomplished at a high rate.

Figure 8:
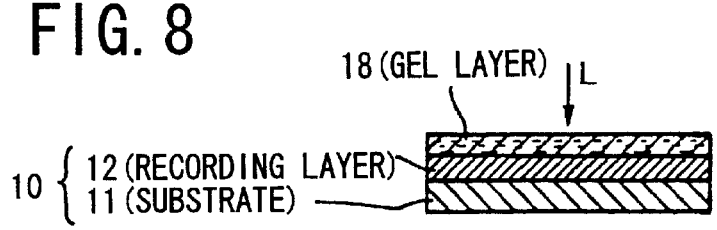
FIG. 8 illustrates an essential structural view of a recording body to explain an embodiment according to the present invention in a case of using a gel layer.

FIG. 8 illustrates an essential structural view of the recording body to explain other embodiment according to the present invention. In this embodiment, a gel layer 18 is formed on the surface of the recording layer 12 of the recording body 10 and recording can be carried out by irradiating the light (electromagnetic wave) L onto the gel layer 18. More specifically, by using a gel-like element having a sol-gel transition property, once the gel-like element makes sol to have liquidity and the sol is then coated on the recording body 10, so that the sol is again subjected to gelation treatment to achieve recording.

EXAMPLE

Substrate: Polyester film

Functional material having the thermal changeable character of wettability: Acrylate-based polymer containing the fluorine atom.

Light (electromagnetic wave)-absorbing material: Cyanine-based dye.

Layer structure: A content of 1 wt % to 10 wt % of the cyanine-based dye was contained in the recording layer.

Light (electromagnetic wave) source: Semiconductor laser having a wavelength of 800 nm.

Means for supplying the liquid layer: Contact of the gel, such as gelatin and the like with the recording body followed by removal after heating.

Result: The liquid layer was easily held on the recording body.

Figure 9:
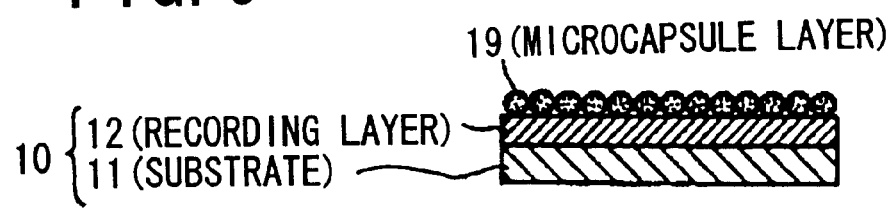
FIG. 9 illustrates an essential structural view of a recording body to explain an embodiment according to the present invention in a case of using a microcapsule layer.

FIG. 9 illustrates an essential structural view of the recording body to explain other embodiment according to the present invention. In this figure, a microcapsule layer is designated 19. In this embodiment, as a functional material having the thermal changeable character of wettability, the microcapsule layer 19 is included in the liquid and a microcapsule contained in the microcapsule layer 19 is broken down by means of thermal energy at the time of irradiation of light (electromagnetic wave) so as to form the liquid layer on the surface of the recording body 10. It should be noted that in this case, it is desirable to contain the light (electromagnetic wave)-absorbing agent on the surface of or inside the microcapsule.

EXAMPLE

Substrate: Polyester film

Functional material having the thermal changeable character of wettability: Acrylate-based polymer containing the fluorine atom.

Light (electromagnetic wave)-absorbing material: Cyanine-based pigment (the particle size is 0.1 μm).

Layer structure: A content of 10 wt % to 50 wt % of the cyanine-based pigment was dispersed in the recording layer.

Light (electromagnetic wave) source: Semiconductor laser having a wavelength of 800 nm.

Means for supplying the liquid layer: A microcapsule particulate based on polyethylene contained in the involatile solvent of the ink.

Result: Supply of the liquid and stability for storage of the liquid could be ensured.

Figure 10:
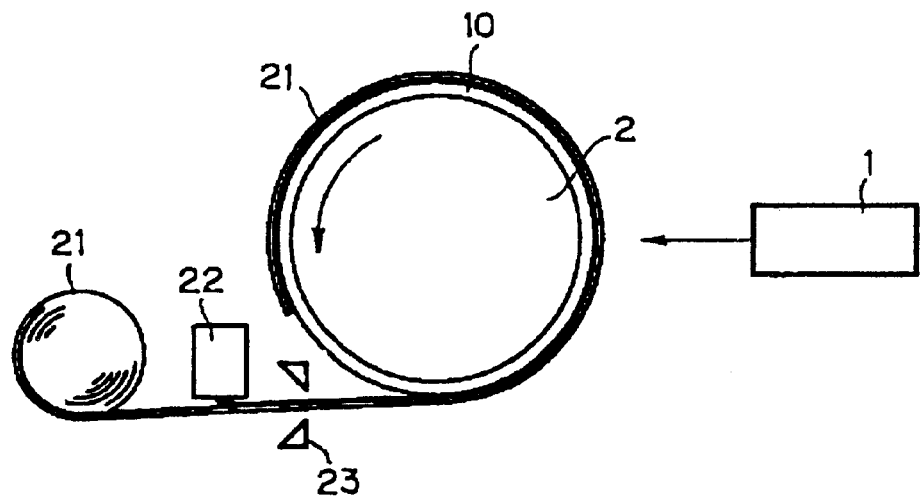
FIG. 10 illustrates an essential structural view to explain other embodiment according to the present invention.

FIG. 10 illustrates en essential structural view to explain other embodiment according to the present invention. Referring to FIG. 10, the image forming apparatus comprises a light (electromagnetic wave)-generating device 1, a rotating drum 2, a film 21, means for supplying the liquid 22 and a film cutter 23. In this embodiment, as shown in FIG. 10, the film 21 is wound around the rotating drum 2 while placing the liquid on the film 21 by means 22 so as to form the liquid layer on the recording body 10 on the rotating drum 2. It should be noted that use is made of the film 21 having the light (electromagnetic wave) transmissible property. An uniform thin layer of the liquid phase can be formed by placing the liquid between the films, so that uneven heating can be avoided to achieve the image formation without an irregularity.

EXAMPLE

Substrate: Polyester film

Functional material having the thermal changeable character of wettability: Acrylate-based polymer containing the fluorine atom.

Light-(electromagnetic wave) absorbing material: Cyanine-based base.

Layer structure: A content of 1 wt % to 10 wt % of the cyanine-based dye was contained in the recording layer.

Light (electromagnetic wave) source: Semiconductor laser having a wavelength of 800 nm.

Means for supplying the liquid layer: Inclusion of the recording body by a polyester film while supplying the involatile solvent of the ink at the time of recording.

Result: Writing could be accomplished at the high rate and the image formation could also be performed without the irregularity.

Figure 11:
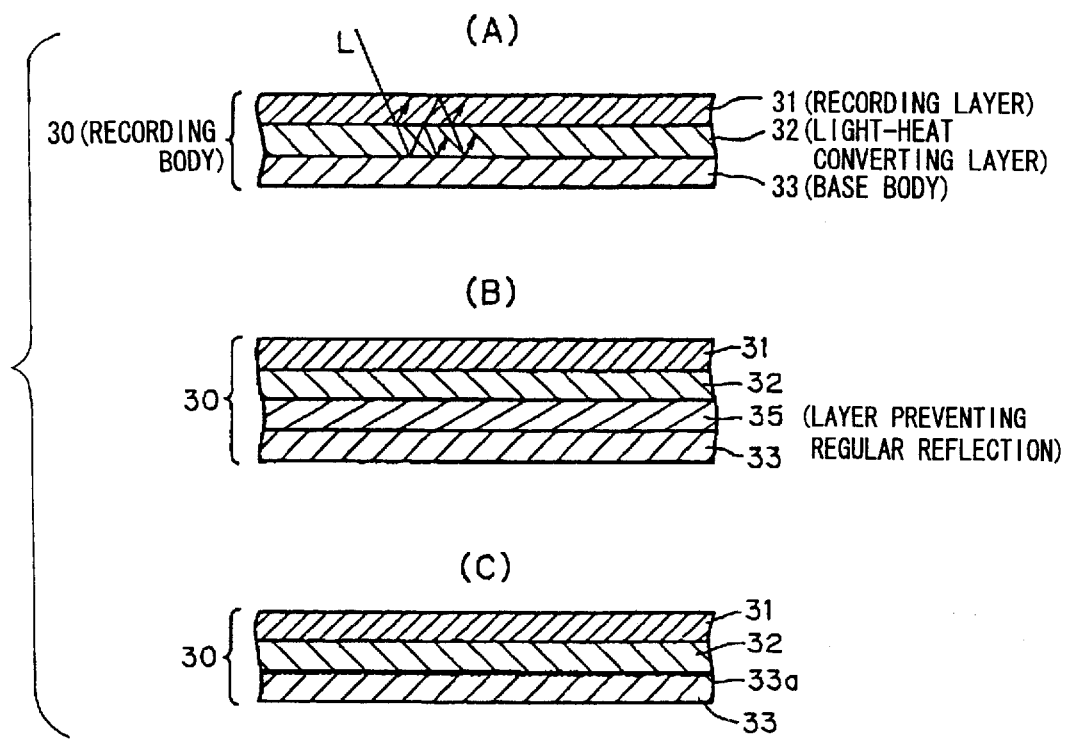
FIG. 11 illustrates an essential structural view to explain one example of a recording body according to the present invention.

However, as shown in FIG. 11(A), a recording body 30 comprises a recording layer 31, a light-heat converting layer 32 and a base body 33. It should be noted in the following description that the light-absorbing element is not necessarily contained in the recording body 30. As heating means, for example in a case of writing by means of a laser, when incident light passes through the recording layer 31 and the light-heat converting layer 32 from a surface of the recording layer 31 the recording so as to reflect the light at a surface of the substrate body 33, a regular reflection is strong and the reflected light arrives at a boundary face between the light-heat converting layer 32 and the recording layer 31 or the surface of the recording layer 31. This reflected light is again reflected at each boundary face and the surface and the like, so that multi-reflection takes place within each layer, thereby giving rise to problems relating to spreading of an exposed region and the irregular recording, such as a moire. In a method for exposing an image region, that is to say, a positive writing method, by spreading of the exposed region is meant spreading of the image region, while in a method for exposing a non-image region, that is to say, a negative writing method, by spreading of the exposed region is meant narrowing of the image region. Since increasing the number of the layer result in an increased cost, problems to be solved in the present invention is to provide the recording body having the number of the layer as limited as possible.

Figure 12:
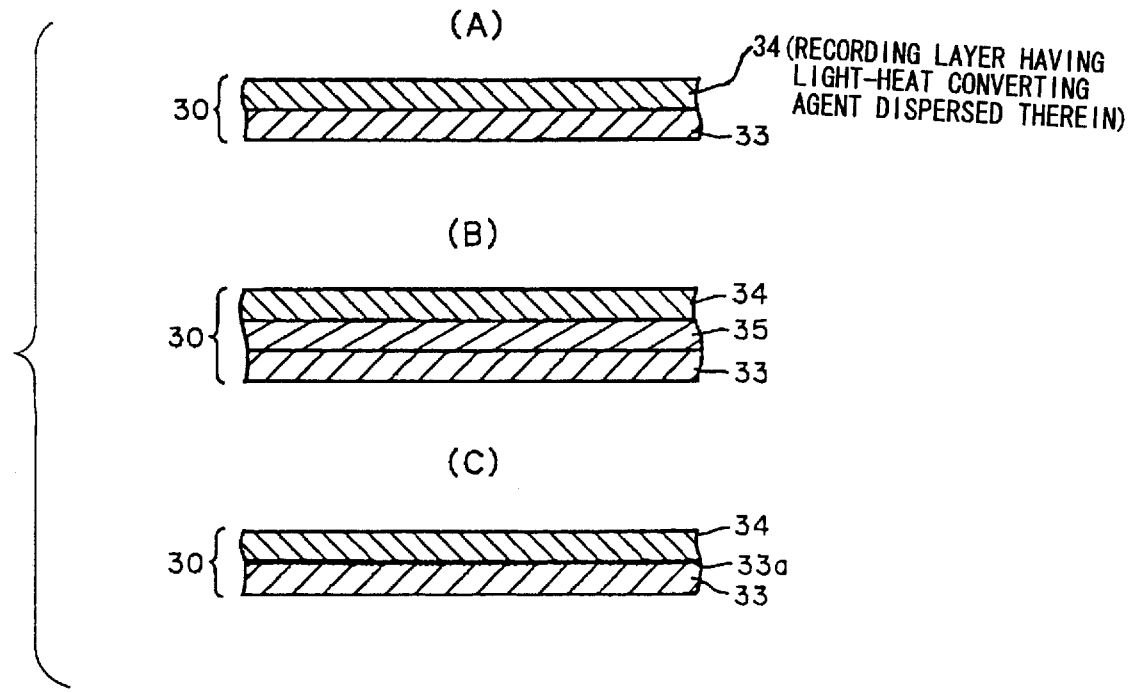
FIG. 12 illustrates a cross-sectional view to explain other example of the recording body according to the present invention.

Also, as shown in FIG. 12(A), the recording body 30 comprises a recording layer 34 having the light-heat converting agent dispersed therein and a base body 33. As heating means, for example in a case of writing by means of the laser, when incident light from a surface of the recording layer 34 passes through the recording layer 34 and the light is reflected at a surface of the base body 33, a regular reflection is strong and the reflected light arrives at the surface of the recording layer 34. This results in multi-reflection within the recording layer 34, thereby presenting the problems regarding spreading of the exposed region and the irregular recording, such as the moire. In a method for exposing an image region, by spreading of the exposed region is meant spreading of the image region, while in a method for exposing a non-image region, by spreading of the exposed region is meant narrowing of the image region. Since increasing the number of the layer result in an increased cost, problems to be solved in the present invention is to provide the recording body having the number of the layer as limited as possible.

Further, in another recording body other than the above structure, for example the recording body may comprise the recording layer, the light-heat converting layer and a transparent base body. When incident light from the surface of the recording body passes through the recording layer, the light-heat converting layer and the transparent base body, and the light is reflected at a back surface of the transparent base body, a regular reflection is strong and the reflected light arrives at a boundary face between the transparent base body and the light-heat converting layer, a boundary face between the light-heat converting layer and the recording layer, or the surface of the recording body. This results in multi-reflection within each layer, as stated above, thereby presenting the problems regarding spreading of the exposed region and the irregular recording, such as the moire. In addition, there may be arisen the problem to be solved that the recording body is required to produce as cheap as possible.

Furthermore, the recording body may comprise a recording layer having the light-heat converting agent dispersed therein and the transparent base body. When incident light from the surface of the recording layer passes through the recording layer and the transparent base body and the light is reflected at the back surface of the transparent base body, the regular reflection is strong and the reflected light arrives at the boundary face between the transparent base body and the recording layer or the back surface of the recording layer. This results in multi-reflection within each layer, as mentioned above, thereby presenting the problems regarding spreading of the exposed region and the irregular recording, such as the moire. In addition, there may be arisen the problem to be solved that the recording body is required to produce as cheap as possible.

Moreover, a carrier of the recording body carries the recording body comprising the recording layer, the light-heat converting layer and the transparent base body. In this case, when incident light from the surface of the recording layer passes through the recording layer, the light-heat converting layer and the transparent base body and the light is reflected at a surface of the carrier of the recording body, a regular reflection is strong and the reflected light arrives at the boundary face between the transparent base body and the light-heat converting layer, the boundary face between the light-heat converting layer and the recording layer, or the surface of the recording layer. This results in multi-reflection within each layer, thereby presenting the problems regarding spreading of the exposed region and the irregular recording, such as the moire.

Similarly, the recording body may comprise the recording layer having the light-heat converting agent dispersed therein and the transparent base body. In this case, when incident light from the surface of the recording layer passes through the recording layer and the transparent base body and the light is reflected at the surface of the carrier of the recording body, an regular reflection is strong and the reflected light arrives at the boundary face between the transparent base body and the light-heat converting layer, or the surface of the recording layer. This results in multi-reflection within each layer, thereby presenting the problems regarding spreading of the exposed region and the irregular recording, such as the moire.

According to the present invention, spreading of the exposed region can be reduced and widening and narrowing of imaged areas can be compensated with the recording body comprising the recording layer, the light-heat converting layer and the base body, the recording body comprising the recording layer having the light-heat converting agent dispersed therein and the base body, the recording body comprising the recording layer, the light-heat converting layer and the transparent base body, the recording body comprising the recording layer having the light-heat converting agent dispersed therein and the transparent base body, the recording body comprising the recording layer carried on a carrier of the recording body, the light-heat converting layer and the transparent base body, and also the recording body comprising the recording layer which is carried on the carried of the recording body and has the light-heat converting agent dispersed therein, and the transparent base body.

FIG. 11(A) shows a cross-sectional view to explain an embodiment of the recording body which is applicable to the present invention. The recording body 30 comprises the recording layer 31, the light-heat converting layer 32 and the base body 33. As mentioned above, when the incident light from the surface of the recording layer 31 passes through the recording layer 31 and the light-heat converting layer 32 and the light is reflected at the surface of the base body 33, the regular reflection is strong and the reflected light arrives at the boundary face between the light-heat converting layer 32 and the recording layer 31, or the surface of the recording layer 31. This results in multi-reflection within each layer, thereby presenting the problems regarding spreading of the exposed region and the irregular recording, such as the moire.

FIG. 11(B) shows a cross-sectional view of one embodiment of the recording body 30 according to the present invention. A layer 35 preventing the regular reflection of the incident light which is used for recording is provided between the base body 33 and the light-heat converting layer 32 of the recording body 30. As the layer 35 preventing the regular reflection, for example a light-diffusing layer is used, which comprises a binder and a fine particle ($TiO_2$, MgO) dispersed therein. This allows the regular reflection where the light is reflected at the surface of the base body 33 to be weakened, so that multi-reflection can be eliminated within each layer. This ameliorates the problems relating to spreading of the exposed region and the irregular recording, such as the moire.

FIG. 11(C) shows a cross-sectional view to explain other embodiment of the recording body according to the present invention. In this figure, an uneven structure 33a is provided on a surface side of the light-heat converting layer 32 of the base body 33. This structure 33a causes the regular reflection of the incident light which is used for recording to be prevented. However, as shown in FIG. 11(B), increasing the number of layer results in high cost. Thus, as shown in FIG. 11(C), by providing the uneven structure 33a on the surface side of the light-heat converting layer 32 of the base body, the regular reflection can be weakened when the incident light is reflected at the surface of the base body 33, so that multi-reflection can be inhibited within each layer and the problems can be improved with respect to spreading of the exposed region and the irregular recording, such as the moire. In addition, without increase in the number of layers the recording body can be produced inexpensively. It should be noted that a roughness of the even structure is in a range of from 0.1 to 1.0 µm.

FIG. 12(A) shows a cross-sectional view to explain an embodiment of the recording body which is applicable to the present invention. In this figure, the recording body 30 comprises the recording layer having the light-heat converting agent dispersed therein and the base body 33. As stated above, when the incident light from the surface of the recording layer 34 passes through the recording layer 34 and the light is reflected at the surface of the base body 33, the regular reflection is strong and the reflected light arrives at the surface of the recording layer 34. This results in multi-reflection within each layer, so that there may be arisen the problems relating to spreading of the exposed region and the uneven recording, such as the moire.

FIG. 12(B) shows a cross-sectional view of an embodiment of the recording body 30 according to the present invention. As shown in FIG. 12(B), the recording body 30 comprises the base body 33, the recording layer 34 having the light-heat converting agent dispersed therein and a layer 35 preventing the regular reflection of the incident light which is used for recording are placed between the recording layer 34 and the base body 33. As the layer 35, the light-diffusing layer is used, which comprises the binder and the fine particle (TiO$_2$, MgO) dispersed therein. This allows the regular reflection where the light is reflected at the surface of the base body 33 to be weakened, so that multi-reflection can be eliminated within each layer. This ameliorates the problems relating to spreading of the exposed region and the uneven recording, such as the moire.

FIG. 12(C) shows a cross-sectional view to explain other embodiment of the recording body according to the present invention. In this figure, an uneven structure 33a is provided on the surface of the light-heat converting layer 34 of the base body 33. This structure 33a causes the regular reflection of the incident light which is used for recording to be prevented. However, as shown in FIG. 12(B), increasing the number of layer results in high cost. Thus, as shown in FIG. 12(C), by providing the uneven structure 33a on the surface of the base body 33, the regular reflection can be weakened when the incident light is reflected at the surface of the base body 33, so that multi-reflection can be inhibited within each layer and the problems can be improved with respect to spreading of the exposed region and the irregular recording, such as the moire. In addition, without increase in the number of layers the recording body can be produced inexpensively. It should be noted that the roughness of the uneven structure is in a range of from 0.1 to 1.0 µm.

Figure 13:
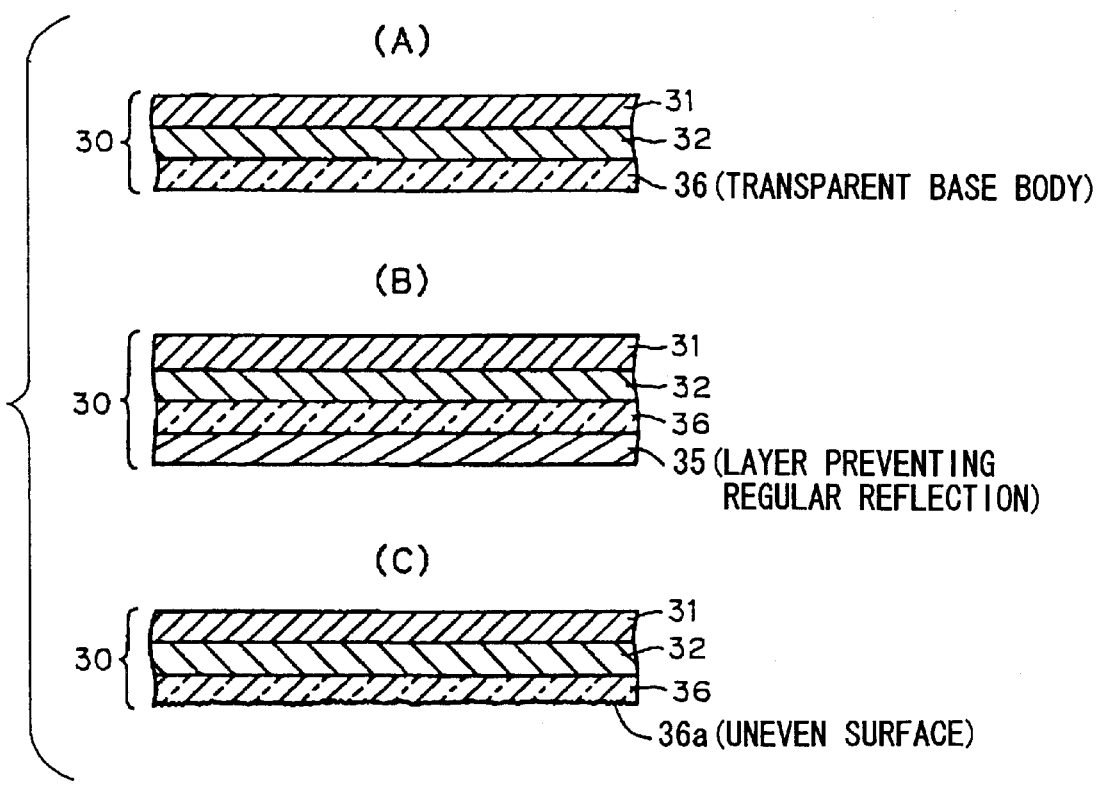
FIG. 13 illustrates a cross-sectional view to explain other example of the recording body according to the present invention.

FIG. 13(A) shows a cross-sectional view to explain other embodiment of the recording body which is applicable to the present invention. In this figure, the recording body 30 comprises the transparent base body 36, the light-heat converting layer 32 and the recording layer 31. As stated above, when the incident light from the surface of the recording layer 31 passes through the recording body 30, the light-heat converting layer 32 and the transparent base body 36 and the light is reflected at the back surface of the transparent base body 36, the regular reflection is strong and the reflected light arrives at the boundary face between the transparent base 36 and the light-heat converting layer 32, the boundary face between the light-heat converting layer and the recording layer 31, or the surface of the recording layer 31. This results in multi-reflection within each layer, so that there may be arisen the problems relating to spreading of the exposed area and the irregular recording, such as the moire.

FIG. 13(B) shows a cross-sectional view to explain an embodiment according to the present invention. In this figure, the recording body 30 further comprises a layer 35 preventing the regular reflection of the incident light which is used for recording. As the layer 35, the light-diffusing layer is used, which comprises the binder and the fine particle (TiO$_2$, MgO) dispersed therein. This allows the regular reflection where the light is reflected at the surface of the base body 33 to be weakened, so that multi-reflection can be eliminated within each layer. This ameliorates the problems relating to spreading of the exposed region and the irregular recording, such as the moire.

FIG. 13(C) shows a cross-sectional view to explain other embodiment according to the present invention. In this figure, an uneven structure 36a is provided on an opposite side surface of the base body 36 to the light-heat converting layer 32. This structure 36a causes the regular reflection of the incident light which is used for recording to be inhibited. However, as shown in FIG. 13(B), increasing the number of layer may result in high cost. According to the present invention, the problems to be solved is to provide the even structure on the opposite side of the base body 36 to the light-heat converting layer 32. The roughness of the uneven structure is in a range of from 0.1 to 1.0 µm. Thus, the regular reflection can be weakened when the incident light is reflected at the surface of the transparent base body, so that multi-reflection can be inhibited within each layer and the problems can be improved with respect to spreading of the exposed region and the irregular recording, such as the moire. In addition, without increase in the number of layers the recording body can be produced inexpensively.

Figure 14:
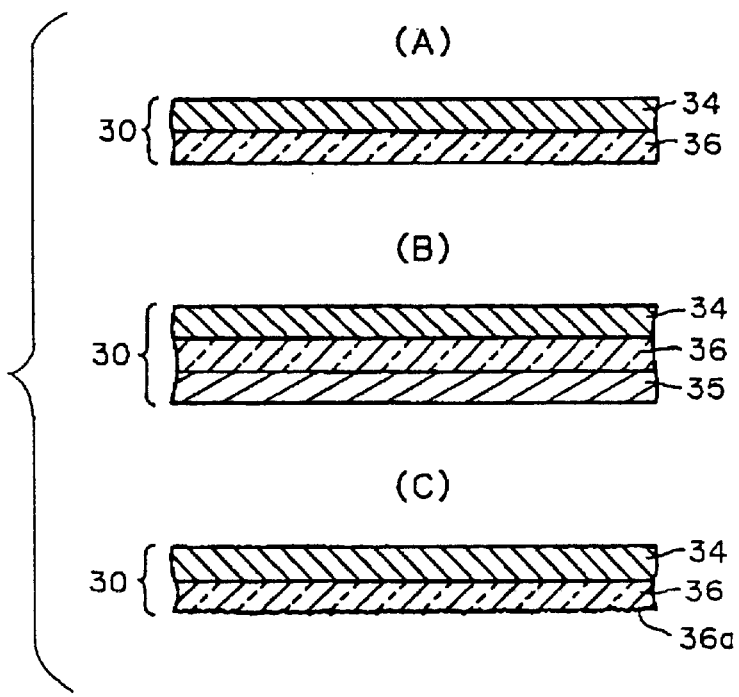
FIG. 14 illustrates a cross-sectional view to explain other example of the recording body according to the present invention.

FIG. 14(A) shows a cross-sectional view to explain other embodiment of the recording body which is applicable to the present invention. In this figure, the recording body 30 comprises the transparent base body 36 and the recording layer 34 having the light-heat converting agent dispersed therein. In this structure, when the incident light from the surface of the recording layer 34 passes through the recording layer 34 and the transparent base body 36 and the light is reflected at the back surface of the transparent base body 36, the regular reflection is strong and the reflected light arrives at the boundary face between the transparent base body 36 and the recording layer 34 or the recording layer 34. This results in multi-reflection within each layer, so that there may be arisen the problems relating to spreading of the exposed area and the irregular recording, such as the moire.

FIG. 14(B) shows a cross-sectional view to explain an embodiment according to the present invention. As shown in FIG. 14(B), the recording body 30 further comprises a layer 35 preventing the regular reflection of the incident light which is used for recording, the layer 35 being arranged in the opposite side of the transparent base body 36 to the recording layer 34. As the layer 35, the light-diffusing layer is used, which comprises the binder and the fine particle (TiO$_2$, MgO) dispersed therein. This allows the regular reflection where the light is reflected at the back surface of the transparent base body 36 to be weakened, so that multi-reflection can be eliminated within each layer. This ameliorates the problems relating to spreading of the exposed region and the irregular recording, such as the moire.

FIG. 14(C) shows a cross-sectional view to explain other embodiment according to the present invention. In this figure, an uneven structure 36a is provided on the opposite side of the transparent base body 36 to the recording layer 34. This structure 36a causes the regular reflection of the incident light which is used for recording to be inhibited.

However, as shown in FIG. 14(B), increasing the number of layer may result in high cost. According to the present invention, the problems to be solved is to provide the even structure on the opposite surface of the recording layer 34 of the transparent base body 36. The roughness of the uneven structure is in a range of from 0.1 to 1.0 µm. Thus, the regular reflection can be weakened when the incident light is reflected at the surface of the transparent base body 36, so that multi-reflection can be inhibited within each layer and the problems can be improved with respect to spreading of the exposed region and the irregular recording, such as the moire. In addition, without increase in the number of layers the recording body can be produced at low cost.

FIG. 15(A1) shows an essential cross-sectional structural view of a recording apparatus which is applicable to the present invention. In this figure, the recording body 30 comprises the transparent base body 36, the light-heat converting layer 32 and the recording layer 31. A carrier of the recording body 40 carries the recording body 30. For example, in a case where the recording body 30 is carried on the carrier of the recording body 40 by means of the recording body roller 2 as shown in FIG. 1, when the incident light from the surface of the recording layer 31 passes through the recording layer 31, the light-heat converting layer 32 and the transparent base body 36, and the light is reflected at a surface of the carrier of the recording body 40, the regular reflection is strong and the reflected light arrives at the boundary face between the transparent base body 36 and the light-heat converting layer 32, the boundary face between the light-heat converting layer 32 and the recording layer 31, or the surface of the recording layer 31. This results in multi-reflection within each layer, thereby presenting the problems relating to spreading of the exposed area and the irregular recording, such as the moire. By spreading of the exposed area is meant spreading of the image area in the case of the method for exposing the image region, while by spreading of the exposed area is meant narrowing of the image region in the case of the method for exposing the non-image region.

FIG. 15(B1) shows an essential cross-sectional structural view to explain other recording apparatus which is applicable to the present invention. A carrier of the recording body 40 carries the recording body 30 comprising the transparent base body 36 and the recording layer 30 having the light-heat converting agent dispersed therein. For example, in a case where the recording body 30 is carried on the carrier of the recording body 40 by means of the recording body roller 2 as shown in FIG. 1, when the incident light from the surface of the recording layer 34 passes through the recording layer 34 and the transparent base body 36 and the light is reflected at a surface of the carrier of the recording body 40, the regular reflection is strong and the reflected light arrives at the boundary face between the transparent base body 36 and the recording layer 34 or the surface of the recording layer 34. This results in multi-reflection within each layer, thereby presenting the problems relating to spreading of the exposed area and the irregular recording, such as the moire. By spreading of the exposed area is meant spreading of the image area in the case of the method for exposing the image region, while by spreading of the exposed area is meant narrowing of the image region in the case of the method for exposing the non-image region.

FIG. 15(A2) and FIG. 15(B2) show essential cross-sectional structural views to explain embodiments according to the preset invention, respectively. As shown in these figures, the present invention provides the layer 35 preventing the regular reflection of the incident light into the surface of the carrier of the recording body 40. As the layer 35, the light-diffusing layer is used, which comprises the binder and the fine particle ($TiO_2$, MgO) dispersed therein. Thus, the regular reflection can be weakened when the incident light is reflected at the surface of the carrier of the recording body 40, so that multi-reflection can be inhibited within each layer and the problems can be improved with respect to spreading of the exposed region and the irregular recording, such as the moire.

FIG. 15(A3) and FIG. 15(B3) show essential cross-sectional structural views to explain embodiments according to the preset invention, respectively. In these figures, the uneven structure 40a is provided on the surface of the carrier of the recording body 40. The roughness of the uneven structure is in a range of from 0.1 to 1.0 µm. Thus, the regular reflection can be weakened when the incident light is reflected at the surface of the carrier of the recording body 40, so that multi-reflection can be inhibited within each layer and the problems can be improved with respect to spreading of the exposed region and the irregular recording, such as the moire. In addition, without increase in the number of layers the recording body can be produced at low cost.

As explained above, after pressing a desired run, the recording body 10 or 30 is reused upon removal of the ink remaining on the recording body. If an amount of the ink remaining on the body is small in this case, it is easy to remove the ink. If the recording body has the rough surface in a case where the surface of the recording body is washed, a pigment-based ink is likely to remain on recess portion of the surface. So, by smoothing the surface of the recording body, more specifically, an amount of the remaining pigment can be reduced by making the surface of the recording body having roughness of less than 20 µm, preferably less than 10 µm. Because the recording body according to the present invention has the smooth surface thereof, it is easy to wash the surface of the recording body due to the small amount of the remaining ink on the surface of the recording body.

When the surface of the recording body is brought into contact with any members, a scratch is generated on the surface, so that function of the scratched portion of the surface is deteriorated as the recording body, thereby giving rise to problems relating to scumming and an area not to be recorded at the scratched site. Alternatively, in a case where the function of the scratched portion is kept even when scratched, the pigment contained in the ink is likely to remain at the scratched site, so that the scratched site may be causative factor in the scumming. In order to avoid this, the scratch is unlikely to generate by enhancing a hardness of the recording layer. More specifically, it is preferable for the hardness of the recording layer to have more than H hardness as a pencil hardness, more preferably more than 2H hardness, so that the scratch is unlikely to generate on the surface of the recording body.

In addition, by providing elasticity for the recording layer of the recording body, the scratch is unlikely to generate on the surface of the recording body because of relaxation of a stress applied on the surface of the recording body. Additionally, when the above recording layer has a thickness of more than predetermined value, the scratch is further unlikely to generate on the surface. More specifically, a Young's modulus of the recording layer is preferably equal to or less than $1.0 \times 10^7$ $N/m^2$, more preferably equal to or less than $0.5 \times 10^7$ $N/m^2$, and the thickness of the recording layer is preferably equal to or more than 2 µm, more preferably equal to or more than 4 µm.

Furthermore, when a substrate of the recording body has elasticity of a predetermined value, the scratch is also unlikely to generate on the surface of the recording body because of relaxation of the stress applied on the surface of the recording body. Additionally, when the above recording layer has the thickness of more than predetermined value, the scratch is further unlikely to generate on the surface. More specifically, the Young's modulus of the substrate 11 is preferably equal to or less than $1.0 \times 10^8$ N/m$^2$, more preferably equal to or less than $1.0 \times 10^8$ N/m$^2$, and the thickness of the substrate 11 is preferably equal to or more than 25 μm, more preferably equal to or more than 50 μm.

As shown in FIG. 16, by providing a cushion layer 38 having elasticity between the recording layer 31 (or 34) of the recording body 30 and the base body 33, the scratch is also unlikely to generate on the surface of the recording body because of relaxation of the stress applied on the surface of the recording body. In addition, when the cushion layer 38 has the thickness of more than a predetermined value, the scratch is also unlikely to generate on the surface of the recording body. More specifically, the Young's modulus of the cushion layer 38 is preferably equal to or less than $8.0 \times 10^7$ N/m$^2$, more preferably equal to or less than $2.5 \times 10^7$ N/m$^2$, and the thickness of the cushion layer 38 is preferably equal to or more than 5 μm, more preferably equal to or more than 10 μm.

As explained above, after the printing the desired press run by use of the recording body according to the present invention, the image formed on the recording body is removed to form a new image on the recording body, so that the recording body can be reused repeatedly. However, when the recording body used once is reused again, the remaining ink on the recording body must be washed after using previously. If not, the remaining ink prevents the following image from forming on the recording body.

As mentioned above, after the printing for the desired press run is carried out with the recording body 10 (or 30), the latent image (liquid-attracting region) produced on the recording body is removed and the ink remaining on the recording body is also removed, so that a new image can be formed on the recording body so as to reuse the recording body. The removal means for removing the remaining ink may be incorporated into the image forming apparatus. The removal means may be detachable from the recording body roller 2, or the removal means may be detachable from the image forming apparatus together with the recording body.

According to the present invention, as stated above, after printing the desired press run, the recording body is coated a liquid which is compatible with a resin and the pigment contained in the ink for recording, or the recording body is immersed in the liquid which exhibits compatibility with the resin and the pigment. And then, the pigment-based ink and the resin on the recording body are wiped by means of a waste or the like, together with the above liquid. As the liquid which shows compatibility with the resin and the pigment used for ink, it is possible to use aliphatic hydrocarbon, aromatic hydrocarbon, ketones, alcohols, a polar solvent, a non-polar solvent or the like. More specifically, a blanket cleaner which is commercially available is coated on the recording body 10 developed already and the ink is wiped by means the waste or the like to remove the ink.

According to other embodiment of the present invention, after the printing is completed, the involatilizable or volatilizable solvent which are contained in the ink is coated on the recording body and the ink is wiped with the waste or the like, so that the pigment-based ink and the resin can be removed effectively. The solvent for coating can be selected according to the solvent contained in the ink to be removed, for example paraffin and olefin solvent. More specifically, solvent No. 6 (This is paraffin solvent), which is frequently used for ink solvent, is coated on the recording body developed already and the ink can be wiped with the waste or the like so as to remove the ink.

The liquid which exhibits compatibility with the resin and the pigment contained in the ink for recording, or the involatilixable or volatilizable solvent which is contained in the ink for recording is coated on the recording body after printing, or the recording body is immersed in the above liquid or solvent and the recording body is then subjected to supersonic treatment. By means of non-contact means, the surface of the recording body is washed to remove the remaining ink. More specifically, the recording body developed already is immersed in a liquid of the blanket cleaner and the ink remaining on the recording body is removed by means of a supersonic washing machine, so that the ink can be removed without the scratch on the recording body.

In addition, after removal of the remaining ink, the surface of the recording body is washed to completely remove the pigment and the solvent for ink and a cleaning liquid, which are remaining on the surface thereof. For example, after removal of the ink, a residual material on the surface of the recording body, such as water and a surfactant or the like, are completely removed and the surface is washed with a liquid which does not remain on the surface of the recording body. More specifically, after removal of the ink by the above method, the surface of the recording body is washed with a 10 wt % solution of the surfactant containing a fluorine atom, such as surfron (Asahi Chemical Co. Ltd).

As stated above, after printing the desired press run, the ink remaining on the recording body is removed to reuse the recording body again. In this case, small amount of the remaining ink thereon facilitates removal of the remaining ink.

In order to remove the remaining ink after printing, the ink remaining on the surface of the recording body can be easily removed by contacting a adhesive member with the surface of the recording body. As the adhesive member, it is possible to use a single member having adhesiveness itself, or a composite member having a coating of an adhesive tape or an adhesive agent on a NBR rubber. More specifically, a isobutyl rubber roller comes into contact with the surface of the recording body to remove the ink.

In another embodiment according to the present invention, when a member having a surface roughness more than that of the recording body is brought into contact with the surface of the recording body developed already, the remaining ink on the surface of the recording body can be easily removed. In this case, it is preferred that the member has the surface roughness more than that of the surface of the recording body. More specifically, in a case where the recording body has the surface roughness of 10 μm, when the member has the surface roughness of 20 μm, the ink can be removed, In other embodiment according to the present invention, a solid film is formed on the surface of the recording body developed already and the solid film is removed together with the ink to easily remove the ink remaining on the surface of recording body. In this case, a liquid is coated, from which the solid film is formed in the absence of water. After drying, the remaining ink can be removed with the film. More specifically, a 2 wt % aqueous solution of polyvinyl alcohol (POVAL) is coated on the surface of the recording body. After drying, a film of POVAL can be removed with the ink.

In other embodiment according to the present invention, after the residual material is air-dried on the surface of the recording body to cure it completely, removal of the dried ink can be carried out by the above method, so that the ink can be removed easily and effectively. More specifically, after printing, the ink remaining on the surface of the recording body is allowed to stand until the ink is cured completely, for example, standing for 3 to 4 hours, and the isobutyl rubber is then brought into contact with the ink to remove it.

Alternatively, after the ink remaining on the surface of the recording body developed already is cured compulsorily, removal of the cured ink is easily accomplished by the above method for a short time. More specifically, after the ink remaining on the recording body is completely cured by a compulsory means, such as heating fixation, silicone fixing method or the like, a silicone rubber is brought into contact with the surface of the recording body developed already. The solution of POVAL is then coated on the surface to form a film of POVAL by drying. The film can be removed with the ink.

In the image forming apparatus as stated above, negative writing for the image formation is carried out by heating the non-image region. If the heating element or energy radiation source of the image forming apparatus is broken down, a broken portion of the element or the source does not work to generate a line of scumming, thereby giving rise to problems relating to dramatic image degradation. In order to solve these problems, other heating body or other energy radiation source is compensated for the broken element.

Figure 17:
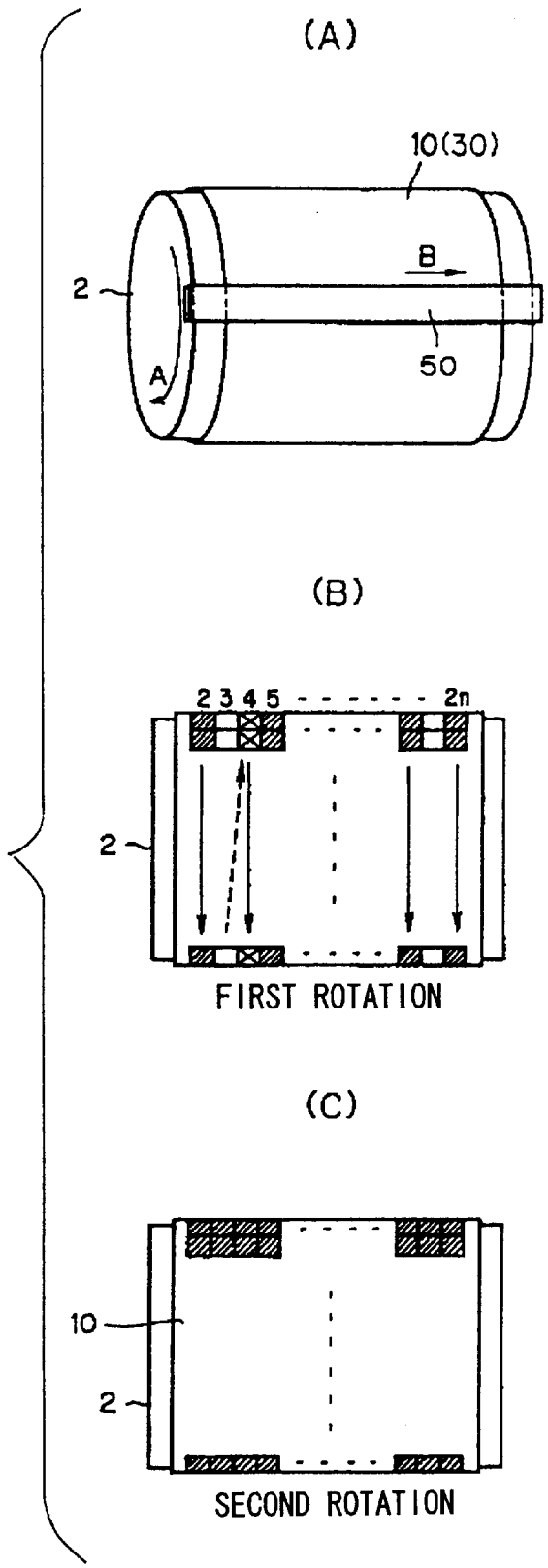
FIG. 17 illustrates an essential schematic structural view to explain an embodiment according to the present invention.

FIG. 17 illustrates an essential schematic structural view to explain an embodiment according to the present invention. The image forming apparatus includes the recording body roller 2, the recording body 10 (or 30), a multi-head 50. At the time of recording, that is to say, image formation, the recording body rotates in a direction shown by an arrow A and the multi-head 50 is movable gradually in a direction shown by an arrow B. According to the present invention, the recording body has the surface properties that the receding contact angle decreases (the liquid-attracting state) when the recording body comes into contact with the liquid in a heated state thereof and the receding contact angle increases (the liquid-repelling state) when the recording body is heated in a non-contact state with the liquid. The image forming means according to the present invention heats the recording body in the state where the recording body is in contact with the element selected from the liquid and/or the solid. Alternatively, right after the surface of the recording body is heated by the image forming means, the surface of the recording body comes into contact with the element selected from the liquid and/or the solid to decreases the receding contact angle of the surface of the recording body, that is to say, the liquid-attracting treatment, and the non-image region of the recording body is then heated selectively by the image forming means in the absence of the contacting element. The above image forming means comprises the multi-head having a plurality of heating sources for the recording body. The same pixel can be written simultaneously by the plurality of heating sources FIG. 17(B) and FIG. 17(C) show views to explain the recording method according to the present invention. FIG. 17(B) illustrates a record view of a first rotation of the recording body 10 and FIG. 17(C) illustrates a record view of a second rotation of the recording body 10. In these figures, a portion having a slating line indicates a pixel written already and a portion having X mark indicates a pixel to be written due to heating failure. A blank portion indicates a pixel to be written later. For example, in a case where the forth heating source fails to write, image formation is accomplished by use of odd heating sources (the third and the fifth heating sources) which are usually not used. As shown in FIG. 17(C), an intended image can be obtained. This results in prevention of generation of unheated, i.e. non-imaged region, so that generation of a line of scumming can be eliminated.

EXAMPLE

1. An ink was used as listed in Table 3.
2. As the recording body, the following was used:
   Material: Acrylate-based material containing a fluorine atom.
   Substrate 1: PET film roll. (250 mm×50 mm, 100 μm thickness) for thermal head.
   Substrate 2: Direct matted PET film sheet (220 mm×350 mm, 180 μm thickness) for thermal head.
   Substrate 3: Direct matted PET film roll (350 mm×10 m, 100 μm thickness) for thermal head.
   Substrate 4: Direct matted PET film sheet (350×540 mm, 50 μm thickness) +2 μm thickness of carbon layer (light-absorbing layer) for laser source.
   Substrate 5: Direct matted PET film roll (350 mm×10 m, 100 μm thickness)+3 μm thickness of carbon layer (light-absorbing layer) for laser source.
3. As developing means, development was carried out with an ink roller of a nitrile rubber (hardness is 50).
4. As a recording paper, use was made of a wood free paper, a slightly coated paper, a coated paper, an art paper, a synthetic paper and a plain paper.
5. As the image forming means, experiments was conducted with the following means.
   5-1) 600 dpi thermal head
   5-2) 300 dpi thermal head
   5-3) 70 W semiconductor laser

TABLE 3

USED INK

| NUMBER | SPECIES | SUB-NUMBER | PRODUCT NAME OR COMPOSITION |
|---|---|---|---|
| 1 | INK FOR WATER-LESS LITHOGRAPHY | ① | AQUALESS SUPER KB BLACK CYAN MAGENTA YELLOW M (TOYO INK) |
|  |  | ② | AQUALESS FIVE K2 BLACK CYAN MAGENTA YELLOW M (TOYO INK) |
|  |  | ③ | AQUALESS SUPER FC BLACK CYAN MAGENTA YELLOW YXU (TOYO INK) |
|  |  | ④ | NEW ALPO G BLACK CYAN MAGENTA YELLOW M (TOKA CO. LTD) |
|  |  | ⑤ | WATERLESS S PL BLACK S (THE INCTEC INC) |
|  |  | ⑥ | WATERLESS S GT BLACK N (THE INCTEC INC) |
| 2 | AQUEOUS INK | ① | 5 wt % BLACK PIGMENT + 20 wt % POLYETHYLENEGLYCOL + 75 wt % POLYVINYL PYRROLIDONE |
|  |  | ② | AQUEOUS DYE INK (INCLUSION OF 5 wt % POLYVINYL ALCOHOL (PVA)) |

In a case where the following image forming means was used, in general, even heating sources was used to write the recording body.

1. 600 dpi thermal head (Manufactured by Toshiba Co. Ltd. )/(resistance: 3000 Ω, pulse width: pulse row of 8 μs, applied voltage: 16 V).
2. 300 dpi thermal head (Manufactured by Kyosera Co. Ltd. )/(resistance: 1000 Ω, fundamental pulse width: 0.3 ms, applied voltage: 12 V).

When the recording body is made the first rotation, the heating source is movable in a main scanning direction by one pixel and the recording body is then made the second rotation. A spiral writing is carried out to complete image formation. When failure of the even heating sources took place, the odd heating sources was activated to write a pixel which has not written by the failed heating source, so that image formation can be carried out even when the heating source fails to write.

In a case where the following image forming means was used, in general, one light source write 1500 pixels per one line.

3. 70 W semiconductor laser ×84 of A4 size multi-head (spot shape: φ20 μm, arrangement of light source: 1500 pixel pitch). When failure of the light source took place, a light source adjacent to the failed light source is activated to write, so that image formation can be carried out even when the light source fails to write.

Figure 18:
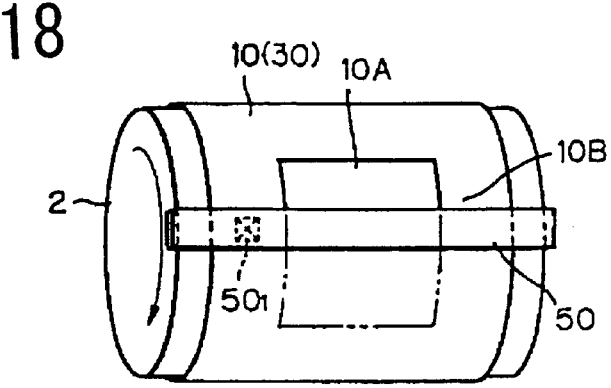
FIG. 18 illustrates an essential structural view to explain other embodiment according to the present invention.

FIG. 18 illustrates an essential structural view to explain other embodiment according to the present invention. The image forming apparatus includes the recording body 10, the image region 10A, a margin region 10B and the multi-head 50. The multi-head 50 has a failed heating source 501 which is always in a heated state. In a case where the failed heating source 501 which is always in the heated state is generated and the failed heating source 501 is disposed in the margin region 10b, other heating source is not compensated for the failed heating source 501, so that time required to compensation for writing is diminished, thereby lowering capacity of the control program.

EXAMPLE

As the ink used, the recording body, the developing means, the recording paper and the image forming means, the same was used as the above experiment. With the same image forming means and under conditions of the same as the above example, when image formation was accomplished, the heating source of the image forming means located in the margin region was always in the heated state due to inability of control thereof. As a result of using the failed heating source in the heated state, the margin region was heated without problems.

Figure 19:
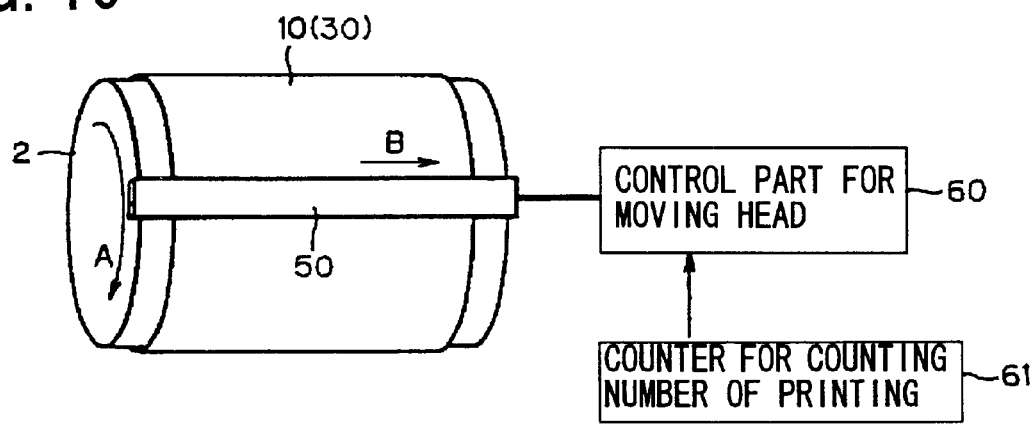
FIG. 19 illustrates an essential structural view to explain other embodiment according to the present invention.

FIG. 19 illustrates an essential structural view to explain other embodiment according to the present invention. The image forming apparatus includes the recording body 10, the multi-head 50, a control part 60 for moving the head and a counter 61 for counting the number of printing. The multi-head 50 is moved in the main scanning direction (shown by an arrow B) by the control part 60 each time a predetermined amount of printing is counted by the counter 61. This inhibits the failed heating source caused by an excess use thereof.

EXAMPLE

As a result of experiments conducted with the same ink, the same recording body, the same developing means, the same recording paper and the same image forming means as the above example, the number of the heating source corresponding to the margin region was moved each time image formation was carried out for 500 sheets of the recording body of A3 region. As a result, the number of generation for failure of the heating source was decreased. The experimental results are listed in Table 4.

TABLE 4

| With respect to a lifetime of thermal head | |
|---|---|
| Conventional Lifetime | The heating element was broken down after operation corresponding to 1000 sheets/A3. |
| Lifetime according to the present invention | The heating element was broken down after operation corresponding to 3000 sheets/A3. |
| With respect to a lifetime of semiconductor laser | |
| Conventional Lifetime | The laser source was broken down after operation corresponding to 100000 sheets/A3. |
| Lifetime according to the present invention | The laser source was broken down after operation corresponding to 200000 sheets/A3. |

Figure 20:
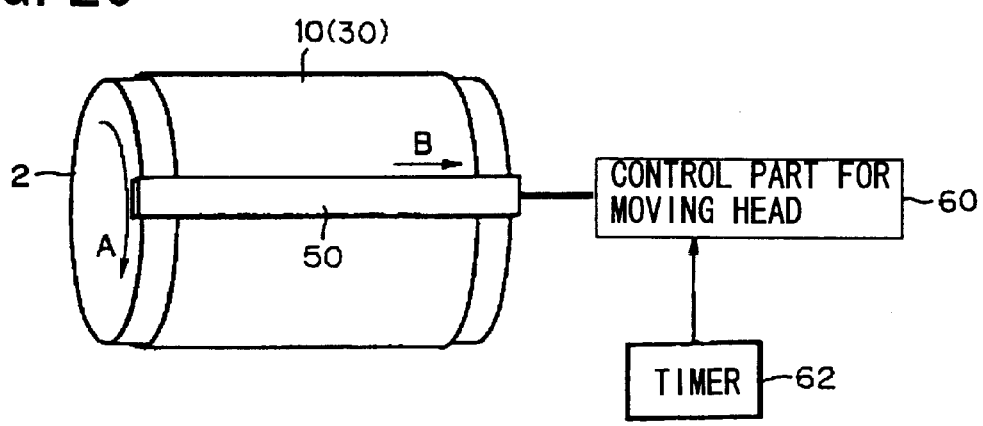
FIG. 20 illustrates an essential structural view to explain other embodiment according to the present invention.

FIG. 20 illustrates an essential structural view to explain other embodiment according to the present invention. The image forming apparatus includes the recording body 10, the multi-head 50, the control part 60 for moving the head and a timer 62. The multi-head 50 is moved in the main scanning direction (shown by an arrow B) by the control part 60 through the timer 62 every predetermined period. This inhibits the failed heating source caused by an excess use thereof.

EXAMPLE

With use of the same ink, the same recording body, the same developing means, the same recording paper and the same image forming means as the above example, the heating source corresponding to the number of the margin region was moved in the main scanning direction every other month (image formation was carried out for 500 sheets of the recording body of A3). As a result, the number of generation for failure of the heating source was decreased. The experimental results are listed in Table 5.

TABLE 5

| With respect to a lifetime of thermal head | |
|---|---|
| Conventional Lifetime | The heating element was broken down after operation corresponding to 1000 sheets/A3. |
| Lifetime according to the present invention | The heating element was broken down after operation corresponding to 3000 sheets/A3. |
| With respect to a lifetime of semiconductor laser | |
| Conventional Lifetime | The laser source was broken down after operation corresponding to 100000 sheets/A3. |
| Lifetime according to the present invention | The laser source was broken down after operation corresponding to 200000 sheets/A3. |

Figure 21:
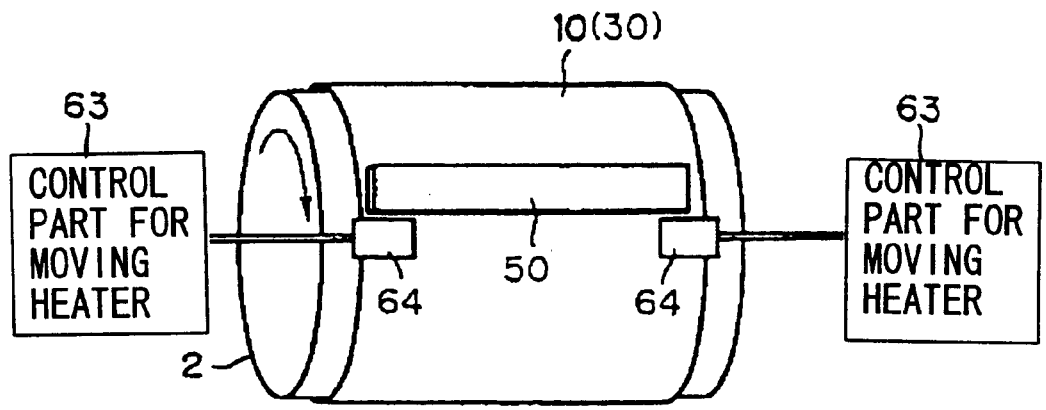
FIG. 21 illustrates an essential structural view to explain other embodiment according to the present invention.

FIG. 21 illustrates an essential structural view to explain other embodiment according to the present invention. The imaging forming apparatus includes the recording body 10, the multi-head 50, a heater 64 for heating the margin region and a control part 63 for moving the heater. In this invention, the heater 64 is compensated for the failed heating source caused by an excess use thereof.

EXAMPLE

By using the same ink, the same recording body, the same developing means, the same recording paper and the same image forming means as the above example, and a ceramic heater as the heater 64 for heating the margin region, image formation was carried out for 1000 sheets of the recording body of A3. As a result, the number of generation for failure of the heating source was decreased and reliability for the heating source was improved. The experimental results are listed in Table 6.

TABLE 6

| With respect to a lifetime of thermal head | |
|---|---|
| Conventional Lifetime | The heating element was broken down after operation corresponding to 1000 sheets/A3. |
| Lifetime according to the present invention | The heating element was broken down after operation corresponding to 10000 sheets/A3. |
| With respect to a lifetime of semiconductor laser | |
| Conventional Lifetime | The laser source was broken down after operation corresponding to 100000 sheets/A3. |
| Lifetime according to the present invention | The laser source was broken down after operation corresponding to 500000 sheets/A3. |

Figure 22:
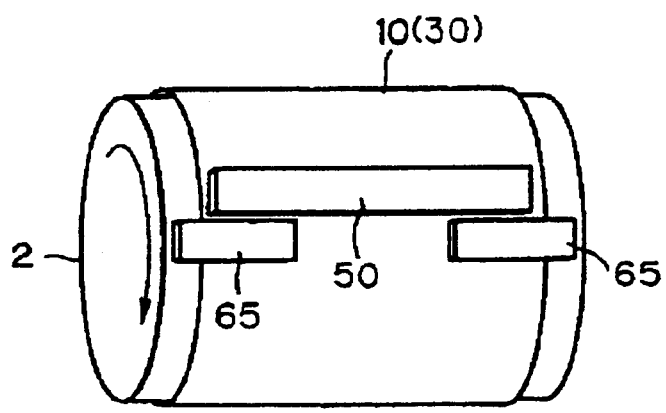
FIG. 22 illustrates an essential structural view to explain other embodiment according to the present invention.

FIG. 22 illustrates an essential structural view to explain other embodiment according to the present invention. The image forming apparatus includes the recording body 10, the multi-head 50 and a thermal head 65 having a low resolution. The thermal head 65 is used in stead of the heater 64 in FIG. 21, so that heating time for the marginal region can be reduced, thereby allowing a time required for image formation to be decreased.

EXAMPLE

By using the same ink, the same recording body, the same developing means, the same recording paper and the same image forming means as the above example, and 200 dpi thermal head for heating the margin region as the thermal head having the low resolution, image formation was carried out for 1000 sheets of the recording body of A3. As a result, the number of generation for failure of the heating source was decreased and reliability for the heating source was improved. The experimental results are listed in Table 7.

TABLE 7

| With respect to a lifetime of thermal head | |
|---|---|
| Conventional Lifetime | The heating element was broken down after operation corresponding to 1000 sheets/A3. |
| Lifetime according to the present invention | The heating element was broken down after operation corresponding to 3000 sheets/A3. |
| With respect to a lifetime of semiconductor laser | |
| Conventional Lifetime | The laser source was broken down after operation corresponding to 100000 sheets/A3. |
| Lifetime according to the present invention | The laser source was broken down after operation corresponding to 800000 sheets /A3. |

Figure 23:
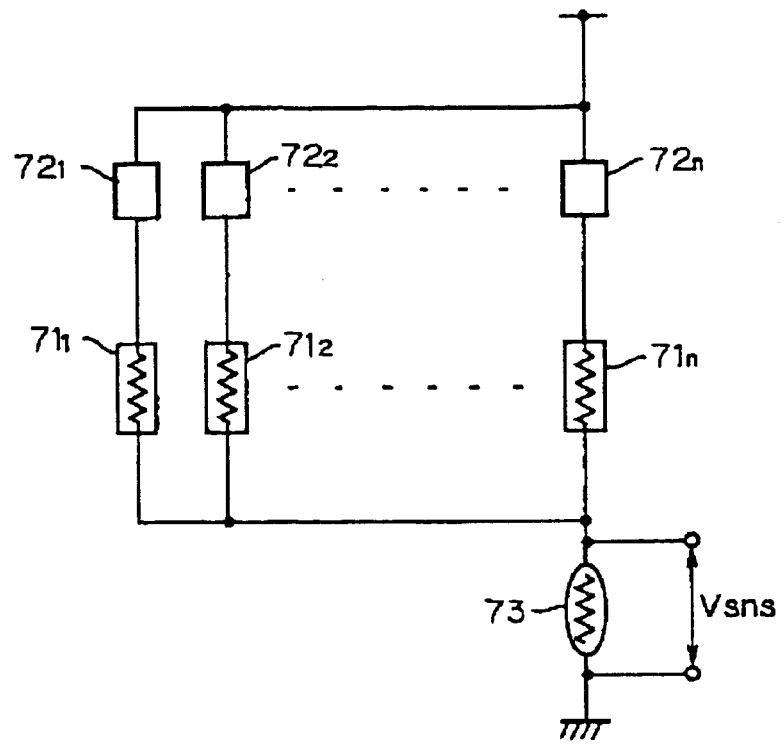
FIG. 23 illustrates a diagrammatic view to explain other embodiment according to the present invention.
Figure 24:
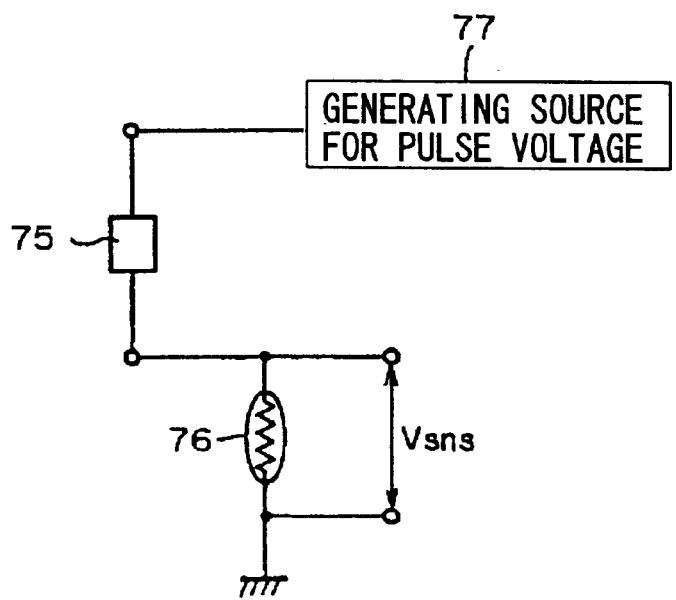
FIG. 24 illustrates a diagrammatic view to explain other embodiment according to the present invention.

FIG. 23 and FIG. 24 illustrate views to explain other embodiment according to the present invention. FIG. 23 shows a case where the image forming means is the thermal (multiple) head. In this figure, $71_1$ to $71_n$ show the thermal head and $72_1$ to $72_n$ show a drive IC which is resistance for detection of failure of the heating source. FIG. 24 shows a case where the image forming means is a laser diode. In this figure, 75 shows the laser diode, 76 shows a resistance for detection of failure of the laser diode 75, and 77 shows a generating source for a pulse voltage in order to drive the laser diode 75. A resistance value of each heating source of the multi-head and/or a voltage value across the resistance element connected in series with the heating source are checked to compare a defined value. In this way, the presence of failure of the heating source can be examined to prevent the generation of the non-image region due to non-heating, so that generation of a line of scumming can be eliminated.

EXAMPLE

Use was made of the same ink, the same recording body, the same developing means, the same recording paper and the same image forming means as the above example.
1. In a case of the thermal head
An initial resistance value of an element resistance of the heating source was about 3000 Ω. When this value became infinite largely, the heating source became failed. The presence of failure of the heating source was detected in this way.
2. In a case of the semiconductor laser
An initial value of voltage across the resistance element connected in series with the laser diode was 200 mV. When this value made zero, the laser diode became failed. The presence of failure of the laser diode was detected in this way.

Figure 25:
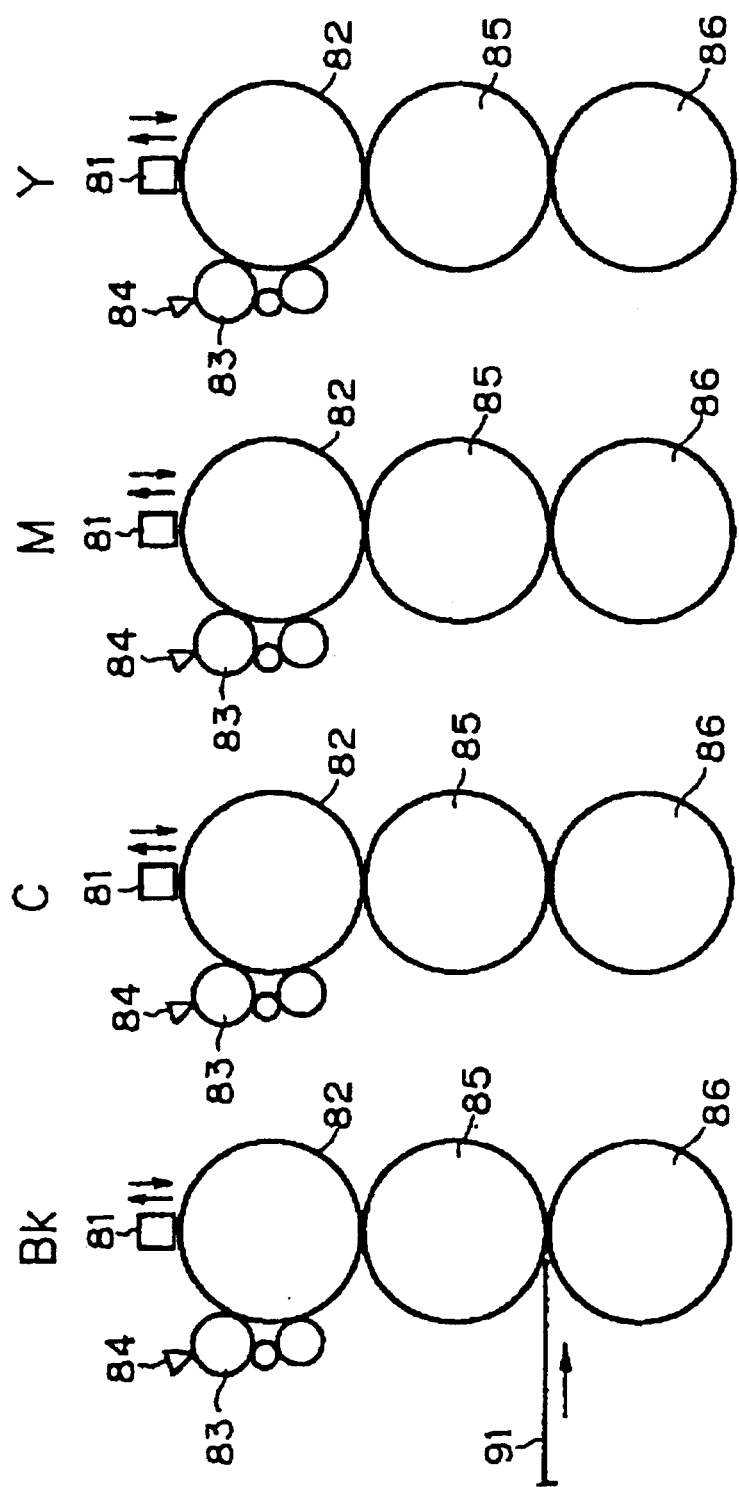
FIG. 25 illustrates an essential structural view to explain other embodiment according to the present invention.
Figure 26:
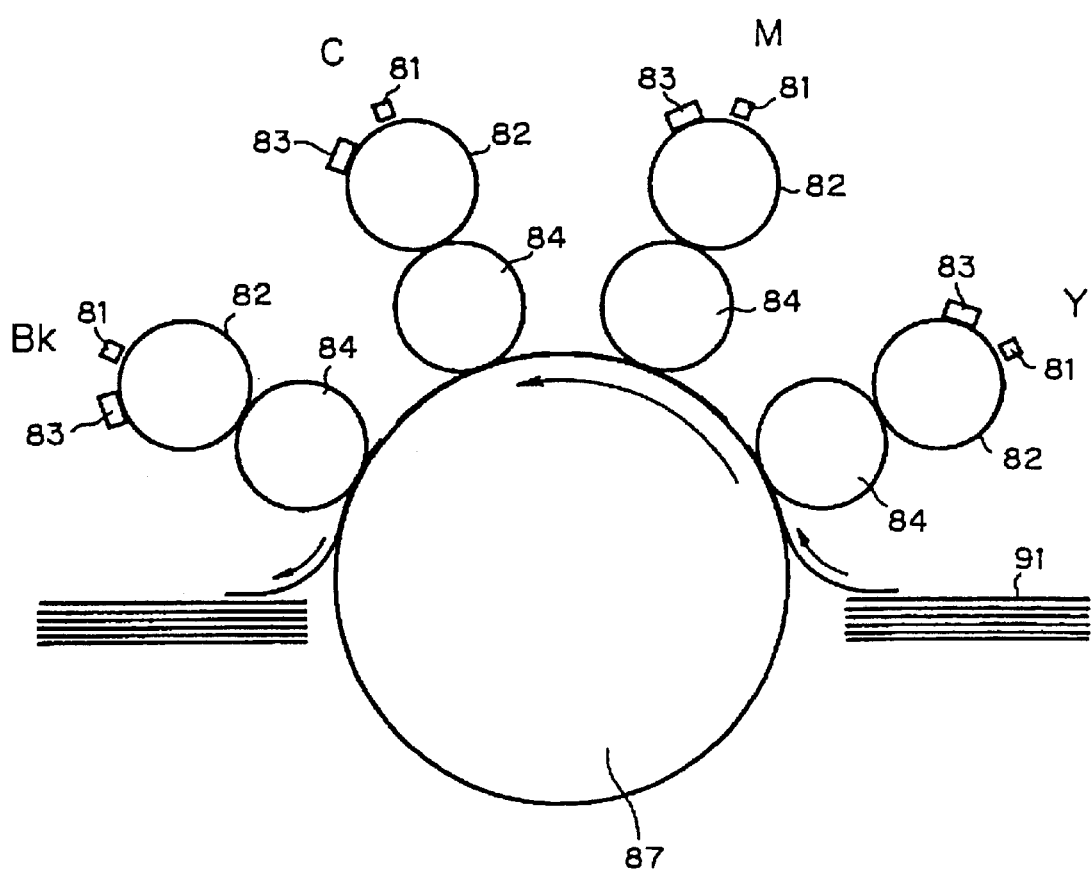
FIG. 26 illustrates an essential structural view to explain other embodiment according to the present invention.

FIG. 25 and FIG. 26 illustrate essential structural views to explain embodiments according to the present invention. In these figure, Bk, C, M and Y represent black, cyan, magenta and yellow colors, respectively. For each color, the image forming apparatus comprises heads 81(Bk), 81(C), 81(M) and 81(Y), the recording bodies 82(Bk), 82(C), 82(M) and 82(Y), the developing rollers 83(Bk), 83(C), 83(M) and 83(Y), blades 84(Bk), 84(C), 84(M) and 84(Y), intermediate transfer bodies 85(Bk), 85(C), 85(M) and 85(Y), and pressing rollers 86(Bk), 86(C), 86(M) and 86(Y). In an embodiment of FIG. 26, the image forming apparatus includes a single common pressing roller 87 in stead of the individual pressing rollers 86(Bk), 86(C), 86(M) and 86(Y). The recording paper 91 is fed in sequence between the pressing roller and the intermediate transfer bodies. The image forming apparatus comprises a plurality of the above image forming means to produce a multi-color image with high quality.

EXAMPLE

By using the same ink, the same recording body, the same developing means, the same recording paper and the same image forming means as the above example, and also four image forming means, a multi-color printing apparatus can be obtained with the long lifetime and high reliability by the above method in which the failed heating source can be detected.

In the image forming apparatus which is applicable to the present invention, negative writing is performed by selectively heating the non-image region of the recording body 10 so as to form the liquid-repelling state of the non-image region and then leaving the image region of the recording body 10 state of liquid-attracting to form the latent image. More specifically, the recording body 10 has the surface characteristics that the receding contact angle decreases when the surface of the image recording body in the heated state is brought into contact with the liquid (the liquid-attracting state), and the receding contact angle increases when the image recording body is heated in the state where the image recording body is not contact with the liquid (the liquid-repelling state). Image formation can be carried out as follows. After the surface of the recording body is heated in the contact state with the element selected from the liquid and/or the solid, or right after the surface is heated and the surface comes into contact with the element selected from the liquid and/or the solid, the receding contact angle decreases, that is to say, the liquid-attracting state. The non-image region of the recording body is selectively heated by the image forming means in the absence of the contacting element to achieve image formation. As explained above, there may be problems that image quality is degraded because of irregularities of heating and heat accumulation of the recording body and/or the image forming means at the time of negative writing. The present invention provides function of adjusting the heat amount of the image forming means at the time of negative writing. More particularly, the present invention further provides improvement of the irregularities of heating and heat accumulation of the recording body and/or the image forming means at the time of negative writing in which a writing amount is very large.

Figure 27:
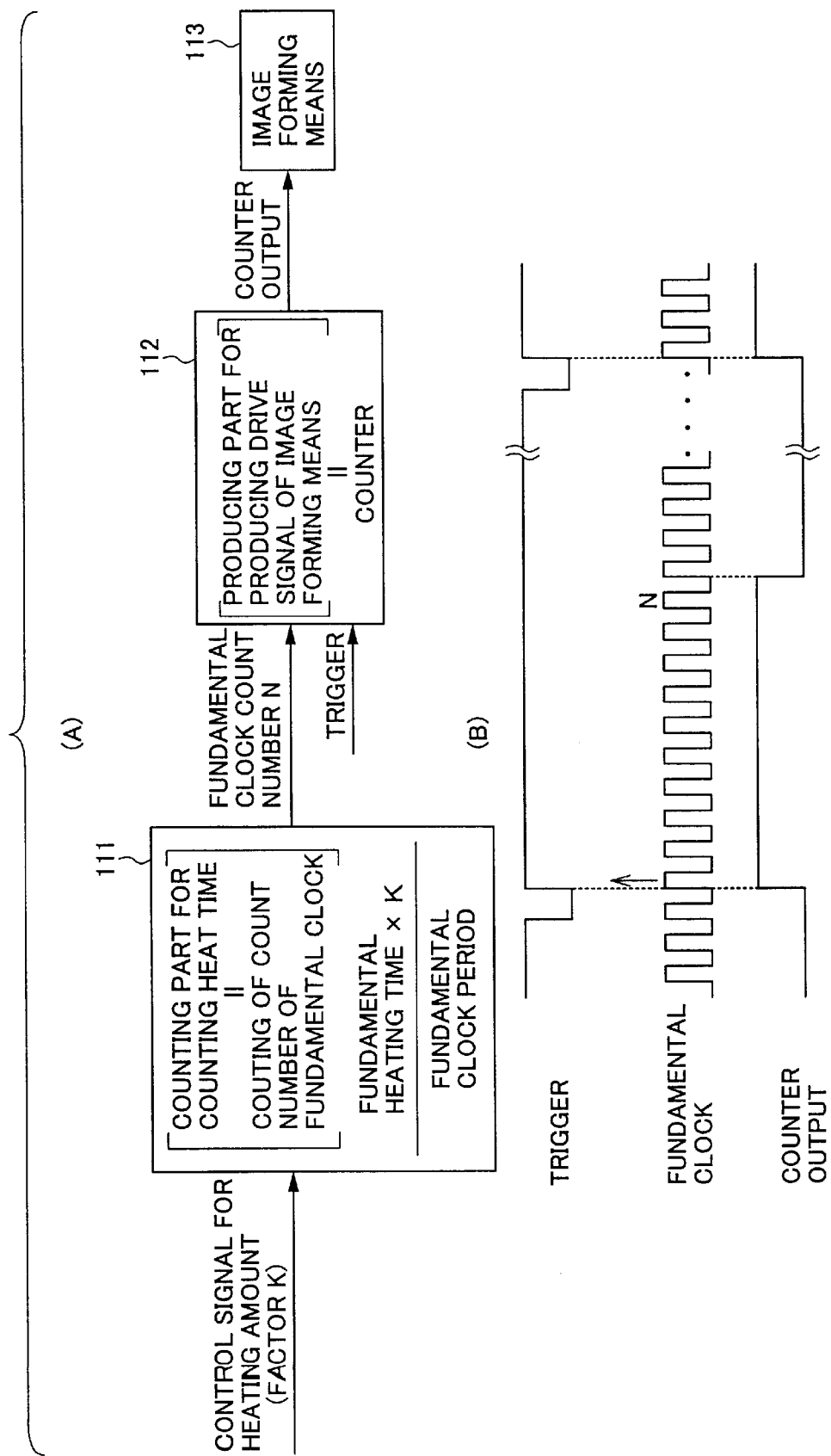
FIG. 27 shows a schematic view to explain one example in a case where a writing heat quantity is adjusted by modulating a pulse width.

FIG. 27 illustrates a schematic view to explain one example in a case where the writing heat amount is adjusted by modulating a pulse width. FIG. 27(A) illustrates a flow diagram showing procedures of operation and FIG. 27(B) illustrates a time chart to explain the operation. In FIG. 27(A), 111 shows counting part for counting a heating time (i.e., counting the number of count of a fundamental clock), 112 shows a producing part for producing a signal to drive the image forming means (i.e., a counter) and 113 shows the image forming means (for example, the thermal head, laser source or the like). The counting part 111 computes the count number N by using a formula (1) with a control signal for the heating amount (factor K) and the fundamental clock period so as to determine the count number N from the fundamental clock. The producing part 112 for producing a signal to drive the image forming means includes the counter and N pulse is counted from the above fundamental clock by the counter. When the number N is below a defined count value, the number N is made H (high) and when the number N becomes the defined count value, the number is made L (low). That is to say, When the counter receives a trigger pulse, a gate of the counter is made H to initiate the counting and the image forming means is driven (heating or light emission) until the counter counts the number N of the fundamental clock pulse.

(the fundamental heating time)/(the fundamental clock period)  (1)

Figure 28:
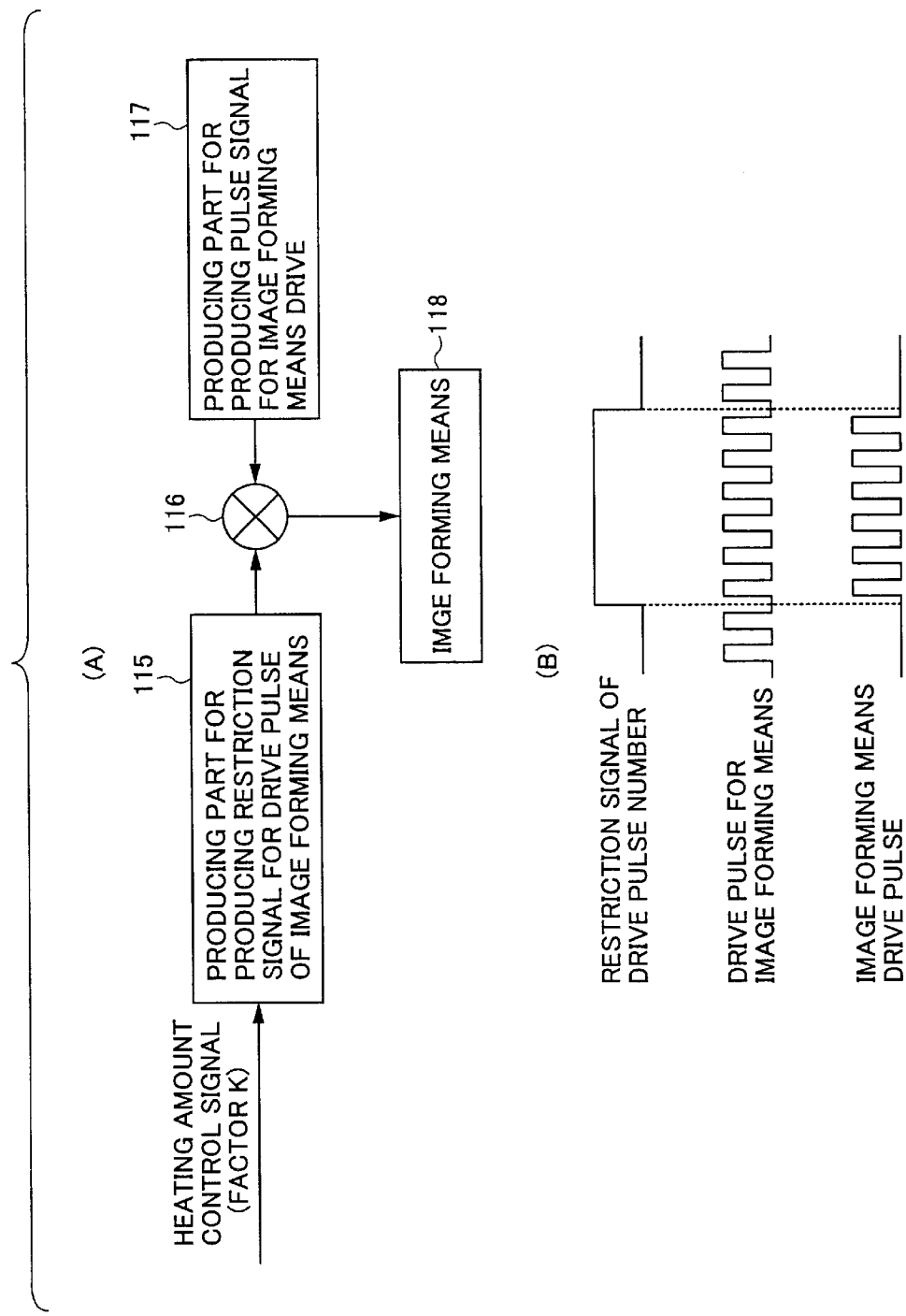
FIG. 28 shows a schematic view to explain an example in a case where the writing heat quantity is adjusted by modulating the pulse width.

FIG. 28 shows a schematic view to explain one example in a case where the writing heat amount is adjusted by modulating the pulse number. FIG. 28(A) shows an essential structural view to explain the operation and FIG. 28(B) shows a time chart to explain the operation. In FIG. 28(A), 115 shows a producing part for producing a signal for the image forming means (a producing part for producing a restriction signal of a drive pulse number), 116 shows a AND circuit, 117 shows a producing part for producing a signal for a drive pulse of the image forming means and 118 shows the image forming means. The producing part 115 determines the fundamental clock count number N from the heating amount control signal (K) and the fundamental clock period by using the formula (1) so as to generate the restriction signal for the drive pulse number of the pulse width defined by the count number N. The AND circuit generates a logic sum from the control signal for the drive pulse number produced at the producing part 115 for producing the restriction signal of the image forming means drive pulse number and a pulse for drive of the image forming means produced at the producing part 117 for producing the drive signal of the image forming means, so as to form the drive pulse (pulse number) for the image forming means to drive the image forming means 118.

EXAMPLE

1. An ink was used as listed in Table 3.
2. As the recording body, the following was used:
    Material: Acrylate-based material containing a fluorine atom (LS317, manufactured by Asahi Glass Co. Ltd,.).
    Substrate 1: PET film roll. (250 mm×50 mm, 100 μm thickness) for thermal head.
    Substrate 2: Direct matted PET film sheet (220 mm×350 mm, 180 μm thickness) for thermal head.
    Substrate 3: Direct matted PET film roll (350 mm×10 m, 100 μm thickness) for thermal head.
    Substrate 4: Direct matted PET film sheet (350×540 mm, 50 μm thickness)+1 μm thickness of carbon layer (light-absorbing layer) for laser source.
    Substrate 5: Direct matted PET film roll (350 mm×10 m, 100 μm thickness)+1 μm thickness of carbon layer (light-absorbing layer) for laser source.
3. As developing means, development was carried out with an ink roller of the nitrile rubber (hardness is 50).
4. As a recording paper, use was made of a wood free paper, a slightly coated paper, a coated paper, an art paper, a synthetic paper and a plain paper.

As the image forming means and the method for adjusting the heat amount, experiments was conducted with the following apparatus.

(1) 600 dpi thermal head (manufactured by Toshiba Co. Ltd,. )/(Resistance: 300 Ω, pulse width: a pulse row of 8 μs, applied voltage: 16 V) The head has function that the head is driven by varying the pulse number.

(2) 300 dpi thermal head (manufactured by Kyosera Co. Ltd,. )/(Resistance: 1000 Ω, fundamental pulse width: 0.3 ms, applied voltage: 12 V) The head has function that the head is driven by varying the pulse number.

(3) 200 mW semiconductor laser
    (spot shape; φ20 μm) The head has function that the head is driven by varying the pulse number.

(4) 50 mW semiconductor laser×16 of 1270 dpi multi-head (spot shape; φ20 μm) The head has function that the head is driven by varying the pulse number.

A s a result, good writing was performed without the irregularities of heating as shown in Table 8.

TABLE 8

| | | | USED INK |
|---|---|---|---|
| NUMBER | SPECIES | SUB-NUMBER | PRODUCT NAME OR COMPOSITION |
| 1 | INK FOR WATER-LESS LITHOGRAPHY | ① ② ③ | AQUALESS SUPER KB BLACK CYAN MAGENTA YELLOW M (TOYO INK) AQUALESS FIVE K2 BLACK CYAN MAGENTA YELLOW M (TOYO INK) AQUALESS SUPER FC BLACK CYAN MAGENTA YELLOW YXU (TOYO INK) |

TABLE 8-continued

| NUMBER | SPECIES | USED INK SUB-NUMBER | PRODUCT NAME OR COMPOSITION |
|---|---|---|---|
| 2 | AQUEOUS INK | ④ | NEW ALPO G BLACK CYAN MAGENTA YELLOW M (TOKA CO. LTD) |
| | | ⑤ | WATERLESS S PL BLACK S (THE INCTEC INC) |
| | | ⑥ | WATERLESS S GT BLACK N (THE INCTEC INC) |
| | | ① | 5 wt % BLACK PIGMENT + 20 wt % POLYETHYLENEGLYCOL + 75 wt % POLYVINYL PYRROLIDONE |
| | | ② | AQUEOUS DYE INK (INCLUSION OF 5 wt % POLYVINYL ALCOHOL (PVA)) |

Figure 29:
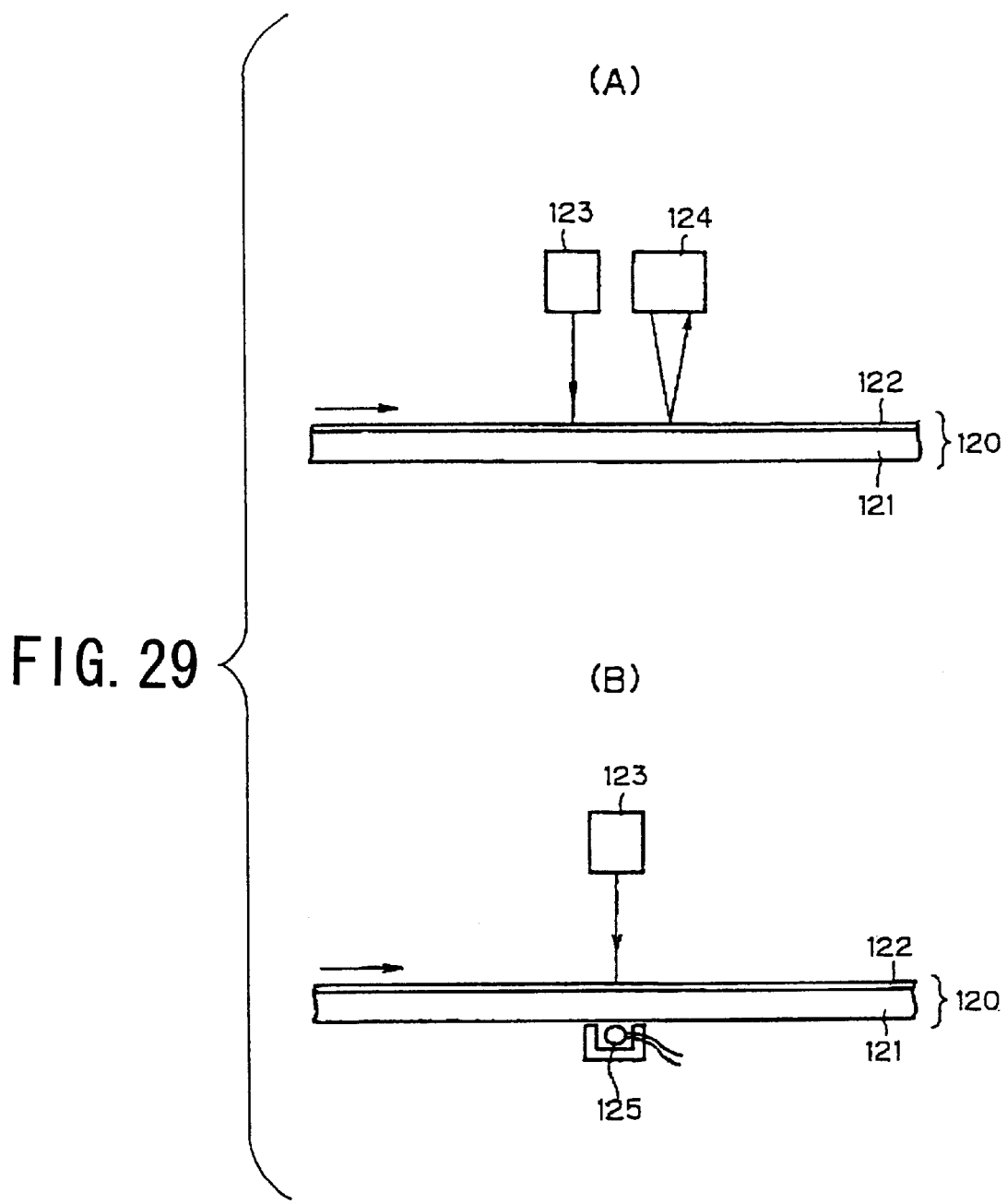
FIG. 29 illustrates an essential structural view to explain an example to detect a temperature of the recording body.

FIG. 29 illustrates an essential structural view to explain one example to detect the temperature of the recording body 120 comprising the base body 121 and the recording layer 122. FIG. 29(A) shows a case of using an infrared radiation thermometer which is a non-contact type and FIG. 29(B) shows a case of using a thermistor, a thermocouple and the like which are a contact type. In order to detect the temperature a surface of the recording body 120, FIG. 29(A) shows one example which uses the infrared radiation thermometer 124 or the like which are the non-contact type, while FIG. 29(B) shows the other example which uses the thermometer 125 such as thermistor, the thermocouple or the like which are the contact type. By using these thermometers, the temperature of the surface of the recording body 120 can be detected and output of the laser source 123 is adjusted on the basis of the detected output, so that the surface temperature of the recording body can be controlled to a suitable temperature.

EXAMPLE

Under the same condition as the above example (the ink, the recording body, the developing means and the recording paper) and by using the same image forming means and the method for adjusting the heating amount, detecting means for detecting the temperature are used as follows:

1. Thermistor - - - the back surface temperature of the recording body.
2. Thermocouple - - - the back surface temperature of the recording body.
3. Infrared radiation thermometer - - - the surface temperature of the recording body.

An optimal heating amount was supplied for the heating source, such as the laser source or the like, on the basis of a base temperature of the recording body, so that image formation could be carried out with high quality.

Figure 30:
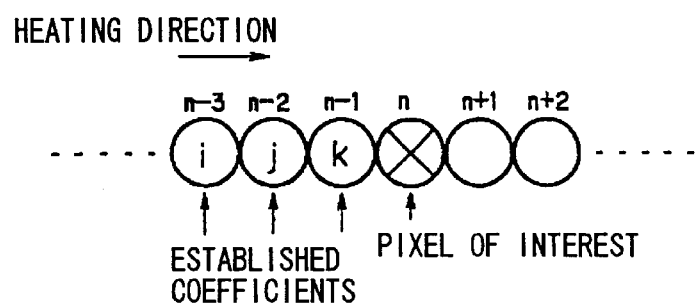
FIG. 30 shows a schematic view to explain one embodiment according to the present invention.

FIG. 30 shows a schematic view to explain one example according to the present invention. A serial head is shown in this figure, in which the image forming means is moved in the main scanning direction to achieve recording. As shown in FIG. 30, each coefficients k, j and i is established to the first pixel, the second pixel and the third pixel in front of pixel of interest, respectively. According to the heated pixels (k, j, i, . . . ), a heating time is calculated by multiplying the fundamental heating time by the each set coefficient of respective pixel, although a relationship of values for each coefficient is k<J<i<1.

In this embodiment, heating amount for writing is adjusted according to heating information of a pixel adjacent to a pixel to be heated (hereinafter referred to as pixel of interest) and a pixel written with the pixel of interest at the same time or the pixel written already. This results in inhibition of the temperature irregularities of the pixel of interest which is heated based on the temperature condition for adjacent pixel, so that image formation can be performed with high quality.

Figure 31:
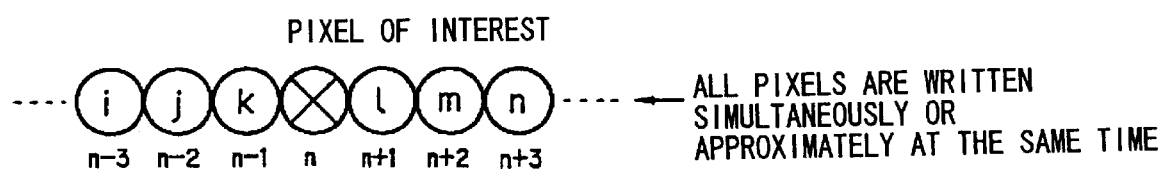
FIG. 31 shows a schematic view to explain another embodiment according to the present invention.

FIG. 31 shows a schematic view to explain other example according to the preset invention. This figure illustrates a case of using a line head. All pixels are written simultaneously or at the same time substantially by the use of the line head. In a case where the all pixels are written simultaneously or approximately at the same time, when all pixels are written simultaneously, a relationship is as follows:

$k=1$ $j=m$ $i=n$ and $k<j<I<1$. For example, in a case where two pixels represented by n−1 and n+2 are written, a heating time is calculated by the following formula (2):

$$\text{(the fundamental heating time)} \times k \times m \qquad (2)$$

Figure 32:
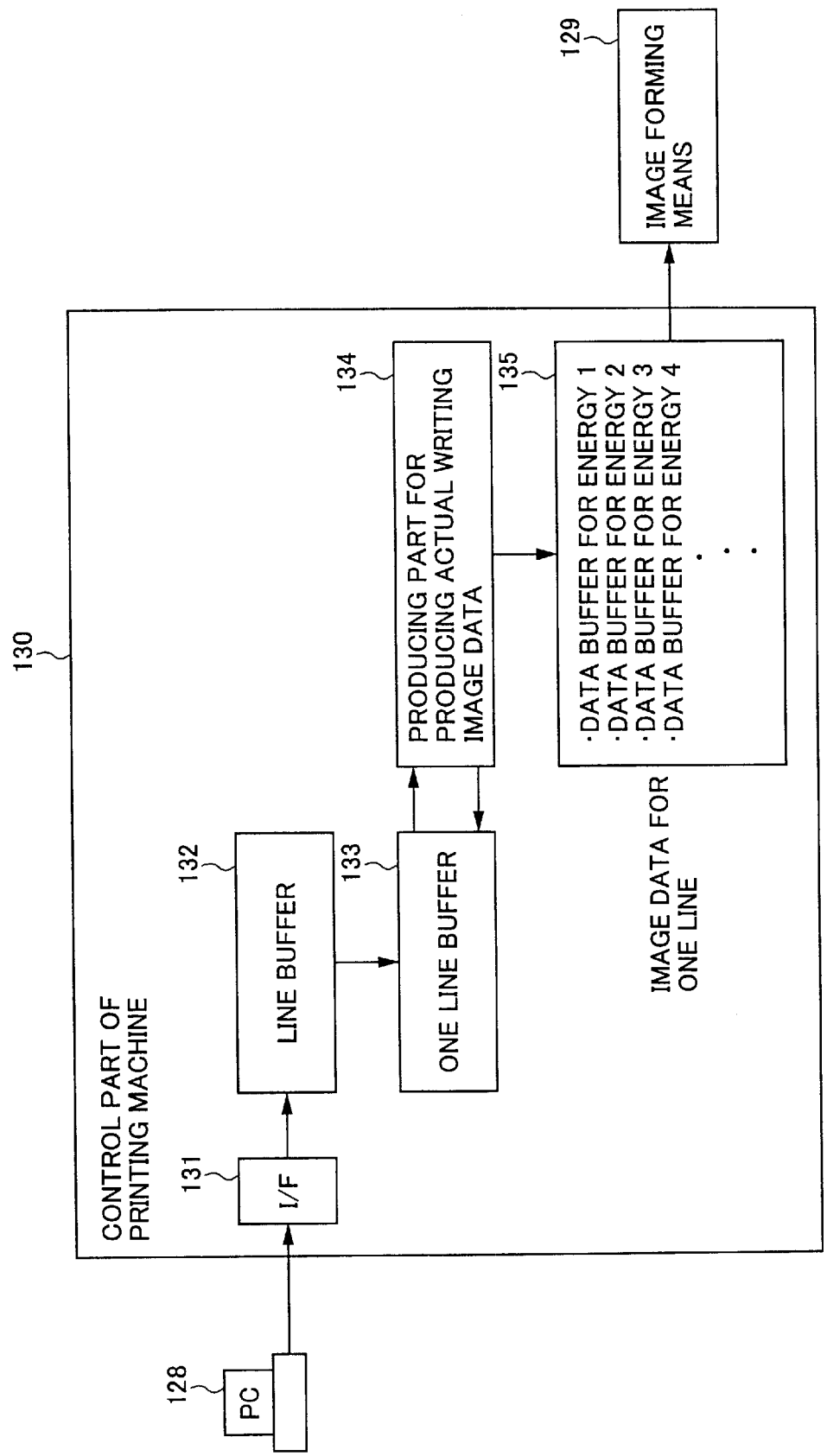
FIG. 32 illustrates a schematic structural view of a control part of a printing machine to carry out the present invention.

FIG. 32 illustrates a schematic structural view to explain a control part of a printing machine to carry out the present invention. Pixel information from a personal computer (PC) 128 is accumulated in a line buffer 132 through an I/F 131 of the control part 130 of the printing machine. The pixel information is latched in one line buffer 133 every other line and is send into a producing part 134 for producing an actual writing image data. For the image data per one line of the producing part 134 for producing the actual writing image data, a signal component of heating energy for each pixel is added by a data buffer 135 for an energy and the image is formed by the image forming means 129.

EXAMPLE

Under the same condition as the above example and by using the same image forming means and the same method for adjusting heating amount as the above example, writing was carried out. As a result, an influence of the temperature irregularities produced in the pixel of interest can be inhibited according to the heating state of the adjacent pixel, thereby producing high quality image.

Figure 33:
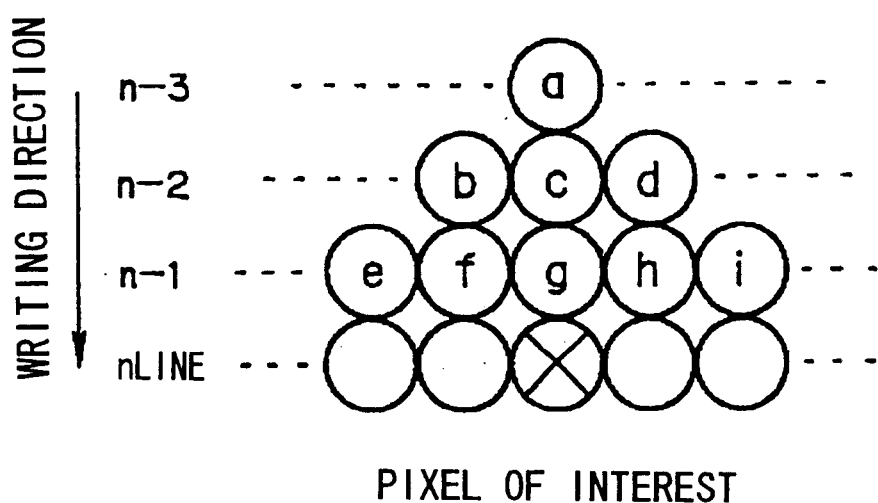
FIG. 33 shows a schematic view to explain an example in a case where a pixel in a main scanning direction is written at the same time, considering 3 lines written already.

FIG. 33 shows a schematic view to explain other embodiment according to the present invention. Since the influence of the temperature irregularities produced in the pixel of interest according to heat records of a plurality of lines written already so that the high quality image can be produced, the heating amount for writing can be changed according to the heat records of the plurality of lines which are written already and are in the same main scanning direction or in a near scanning direction.

FIG. 33 shows an example of a case where pixels in the main scanning direction are written at the same time, considering three lines written already. In this case, by using a value which is determined by the following formula (3);

$$g<f<e<c<b<a<1 \text{ and } b=d, g=h, e=1 \qquad (3)$$

and a threshold table, writing energy for some steps can be obtained.

Figure 34:
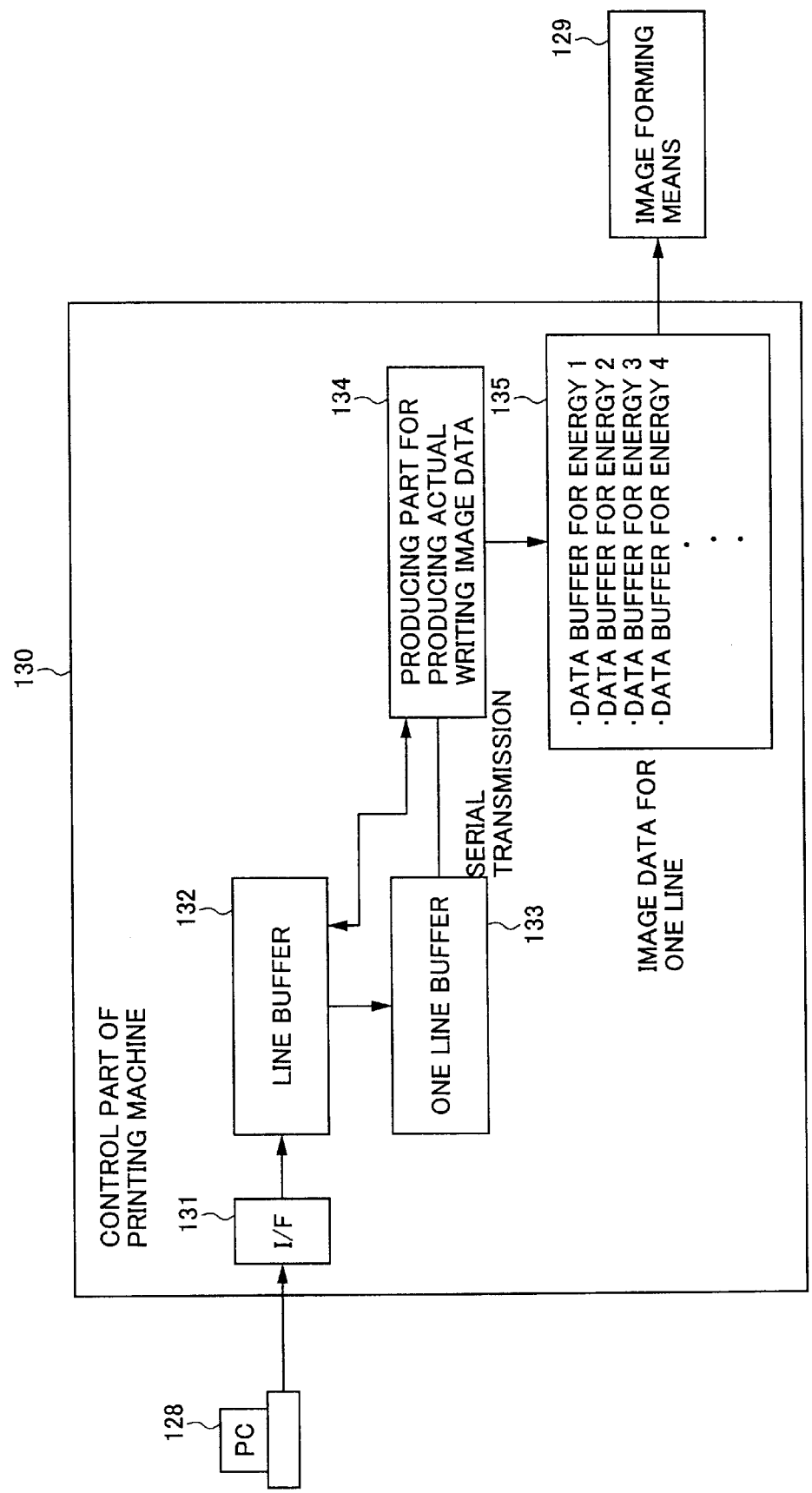
FIG. 34 illustrates a schematic structural view showing a structural example of a printing machine to carry out the present invention.

FIG. 34 illustrates a schematic structural view showing a structural example of the control part of the printing machine to carry out the present invention. The basic operation is the same as the case of FIG. 32. In this embodiment, the line buffer 132 has memory for some lines, and the image data for some lines written already produced actually in the producing part 134 for producing the actual image data is returned to the line buffer 132 per the line so as to establish the relationship as shown in FIG. 33. For the pixel of interest, the heating energy is calculated by the formula (3). From one line buffer 133, the pixel information per one pixel is serially transmitted to the producing part for producing the actual writing image data and the signal component for the heating energy is added to each pixel of the image data per one line by the data buffer 135 for the energy, so that the pixel information thus produced is transmitted to the image forming means 129 per one line so as to achieve recording.

Figure 35:
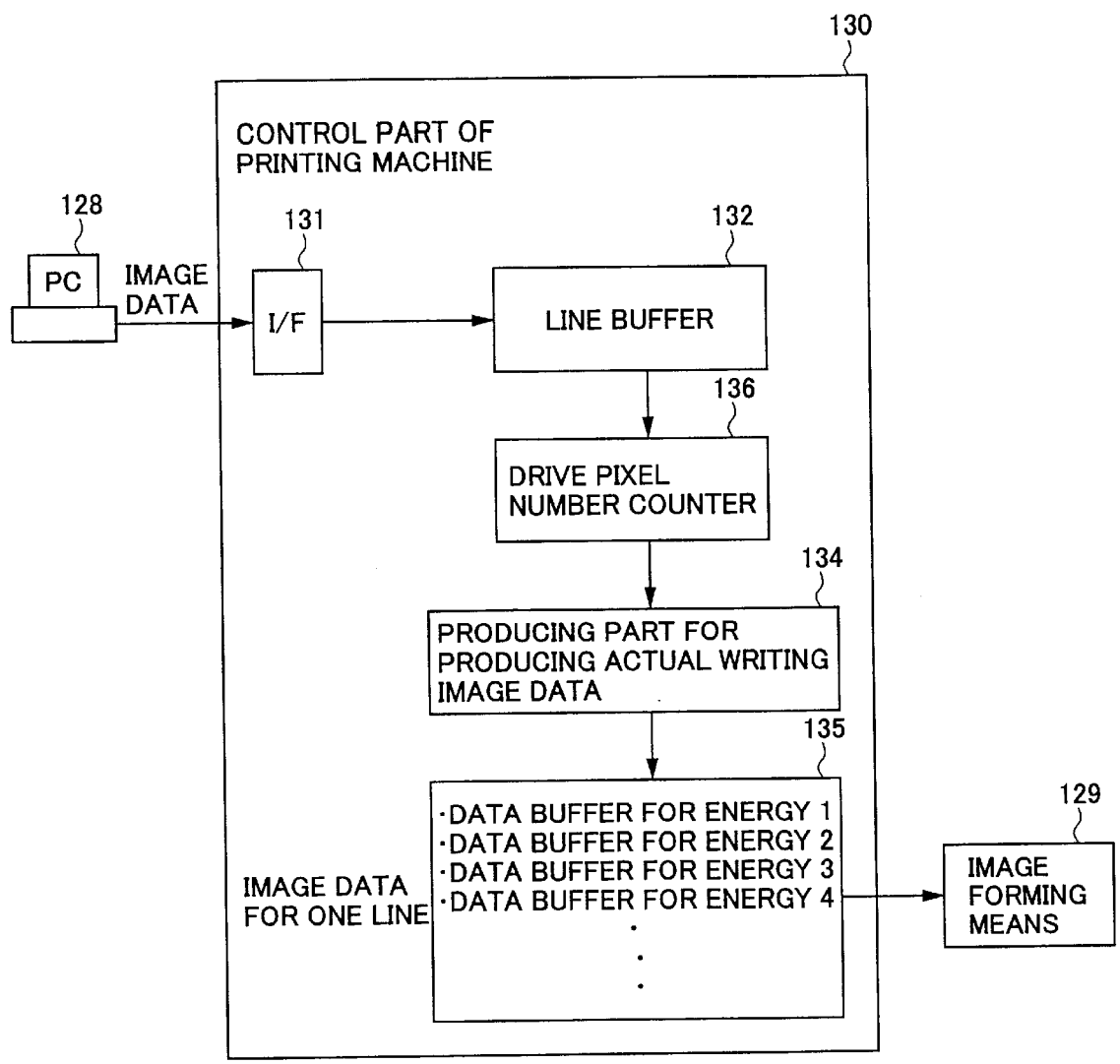
FIG. 35 shows an essential structural view to explain other embodiment according to the present invention.

FIG. 35 shows an essential structural view to explain other embodiment according to the present invention. In this figure, 136 shows a drive pixel number counter provided in stead of the line buffer 133 shown in FIG. 32 and the other is the same as shown in FIG. 32. However, the present invention inhibits the irregularities of heating amount produced by an amount driving simultaneously, so that the high quality image can be produced. The heating energy amount from the image forming means (multi-head) having the plurality of heating sources for the recording body can be changed by calculating the number of the heating source (pixel) heating simultaneously with the drive pixel number counter 136, according to the amount of the heating source driving simultaneously. For example, by referring to the coefficient table corresponding to the drive pixel number, multiply with fundamental heating time determines the heating time.

FIG. 36 shows an essential schematic view to explain one embodiment according to the present invention. FIG. 36(A) shows a case of the serial writing head in which 2 shows the recording body roller, 10 (or 30, or 120) shows the recording body, 141 shows a recording head. As well-known, the recording body roller 2 is rotated in a sub-scanning direction as shown by an arrow A and the recording head 141 executes a to-and-fro motion in the main scanning direction as shown by an arrow B. According to the present invention, however, in order to produce the high quality image with elimination of heat accumulation at the time of writing and inhibition of heating irregularities, writing is carried out more than every at least other line in the main scanning direction (the B direction) (portions having a slanting line is a pixel to be written in FIG. 36). For example, as shown in FIG. 36(B), writing is carried out on every other pixel in the first rotation (a blank portion is a pixel to be written later) and as shown in FIG. 36(C), residual pixels (which are pixels shown in FIG. 36(B)) are written in the second rotation.

FIG. 37 shows an essential schematic view to explain other embodiment according to the present invention. 142 shows the line head in FIG. 37(A) illustrating an example of a line writing head. However, as shown in FIG. 37(B), writing is carried out every other line in the first rotation in the sub-scanning direction (A direction), that is to say, the portion having the slanting line is recorded. As shown in FIG. 37(C), a blank portion which is not written in the first rotation (corresponding to the blank portion of FIG. 37(B)) is written in the second rotation.

Figure 38:
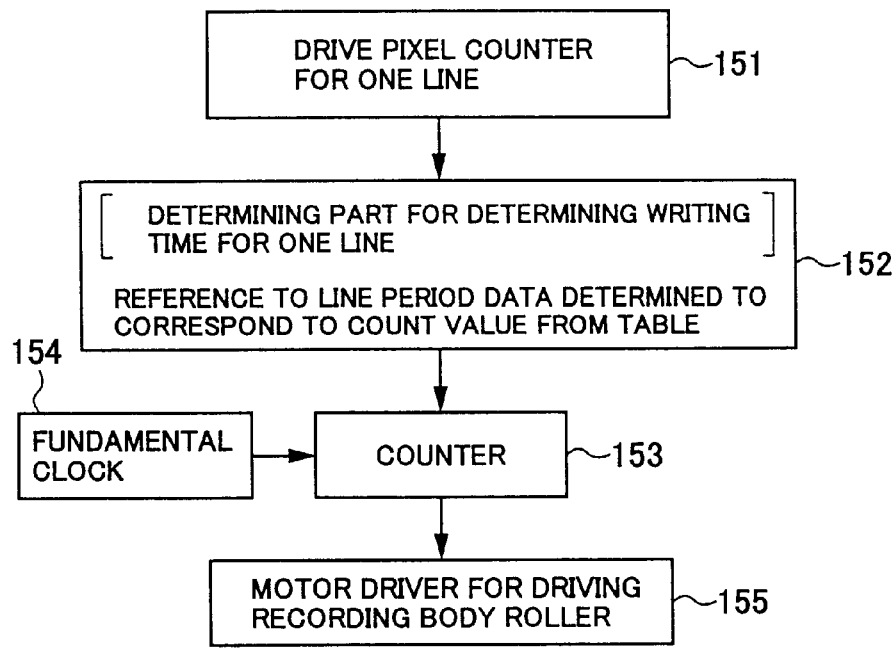
FIG. 38 shows an essential schematic view to explain other embodiment according to the present invention.

FIG. 38 shows an essential schematic view to explain one embodiment according to the present invention. In this figure, 151 shows a drive pixel number counter for one line, 152 shows a determining part for determining the writing time for one line, 153 shows a counter, 154 shows a producing part for producing a fundamental clock to dive the counter 153 and 155 shows a motor driver for driving the recording body roller.

Figure 39:
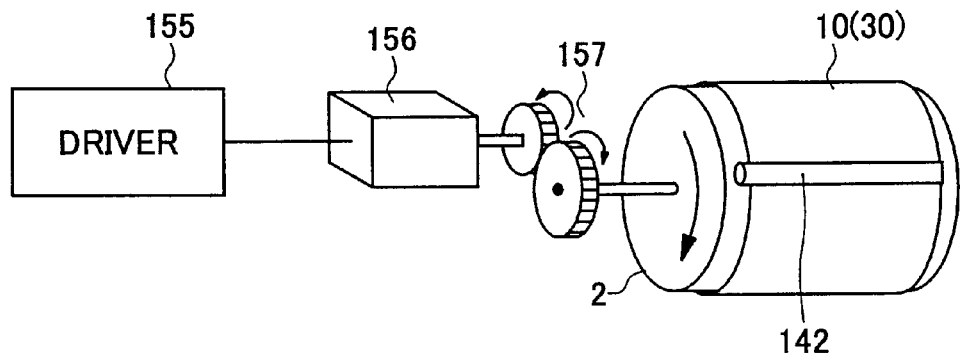
FIG. 39 illustrates a schematic view showing a relationship between a motor driven by a motor driver and a drum of a recording body, the drum being driven by the motor.

Additionally, FIG. 39 illustrates a schematic view showing a relationship between a motor driven by the motor driver 155 as shown in FIG. 38 and the recording body drum driven by the motor. In this figure, 155 shows the motor driver for driving the recording body roller as stated above, 156 shows a motor for driving the recording body roller driven by the motor driver 155, 157 shows a gear for transmitting a rotation of the motor 156 to the recording body drum, 2 shows the recording body roller, 10 shows the recording body and 142 shows the line head.

According to the present invention, however, by changing a writing rate according to image information, irregularities of accumulation of heating amount at the different time of writing in response to image information is inhibited so as to produce the high quality image. As shown in FIG. 38, the writing time for one line is determined by counting the number of drive pixels within one line. Determination of this writing time, for example, is made by referring to a line period data corresponding to the count value (this line period data is the count number of the fundamental clock pulse) of a table. The count number thus determined is counted by counting the fundamental clock pulse by the counter 153, so that the motor 156 for driving the recording body roller is driven during the period of this count (the period is the period between the count commencement and the count end). In a case of many drive pixel numbers, this results in a decrease in the writing rate by increasing the time required to write the next line because of an increase in accumulation of heating amount of the recording body head.

Figure 40:
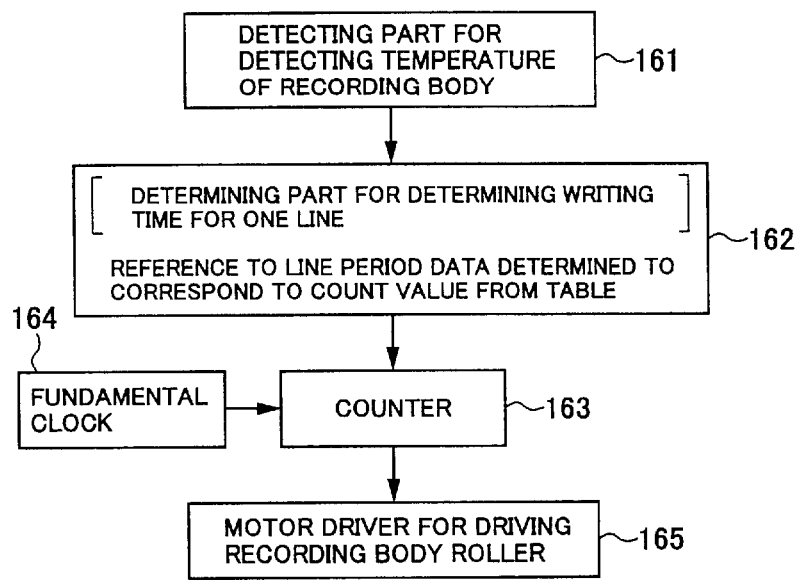
FIG. 40 illustrates an essential diagrammatic view to explain one embodiment according to the present invention.

FIG. 40 illustrates an essential structural view to explain other embodiment according to the present invention. In this figure, 161 shows a detecting part for detecting the temperature of the recording body, 162 shows a determining part for determining the writing time for one line (determination is based on reference of the line period data determined according to the temperature of the recording body to the table), 163 shows a counter for counting the count number (or the time) determined by the determining part 162 for determining the writing time for one line and 164 shows a producing part 164 for producing the fundamental clock. By counting the fundamental clock pulse, established count value or the time at the counter 163 is counted at the counter 163 so as to drive the motor driver 165 for driving the recording body roller during the time.

Figure 41:
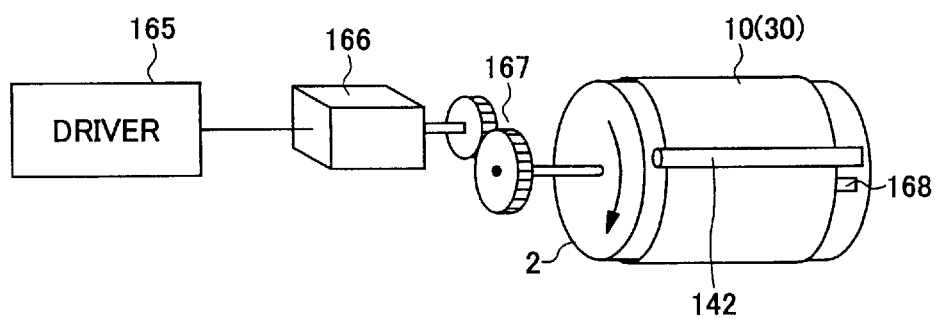
FIG. 41 illustrates a schematic view showing a relationship between a motor driven by a motor driver and a drum of a recording body, the drum being driven by the motor.

FIG. 41 illustrates a schematic view showing a relationship between the motor driven by the motor driver 165 for driving the recording body roller and the recording body roller driven by the motor. In this figure, 165 shows the above motor driver for driving the recording body roller, 166 shows the motor for driving the recording body roller driven by the motor driver 165, 167 shows the gear for transmitting the rotation of the motor 166 to the recording roller 2, 2 shows the recording body roller, 10 shows the recording body, 142 shows the line head and 168 shows the thermometer for detecting the temperature of the recording body, for example the infrared radiation thermometer.

According to the present invention, however, an increase in the temperature of the recording body at the time of writing can be reduced by changing the writing rate according to the increase in the temperature of the recording body, so that image formation is carried out with high quality. As stated above, the increase in the temperature of the recording body 10 can be inhibited by retarding a rotation rate of the motor 166 for driving the recording body roller in a case of high temperature of the recording body 10.

Figure 42:
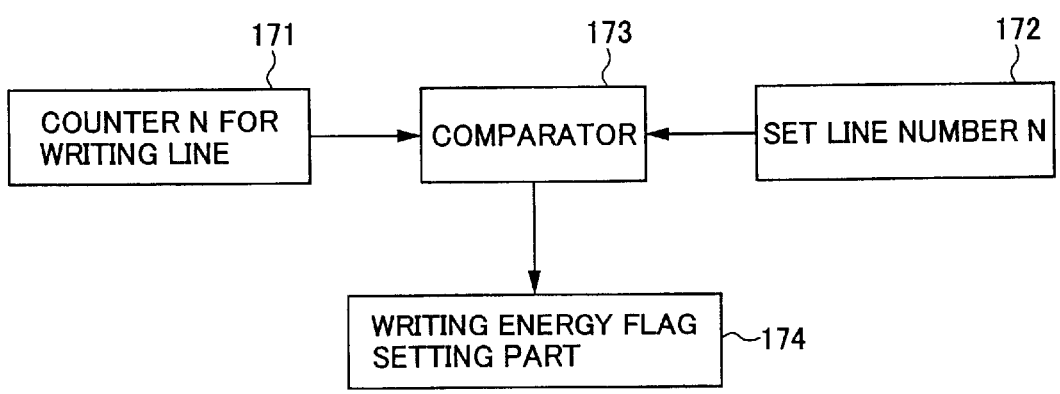
FIG. 42 illustrates an essential diagrammatic view to explain one embodiment according to the present invention.

FIG. 42 illustrates an essential diagrammatic view to explain other embodiment according to the present invention. In this figure, 171 shows a counter for counting the number n of a writing line at the beginning of writing. 172 shows a set counter for setting the number N of the writing line. 173 shows a comparator. 174 shows a writing energy flag setting part. In the comparator 173, by comparing the number n of the writing line at the beginning of writing from the counter 171 with a set number N of the writing line from the set counter 172, writing energy is increased during n<N and writing energy is decreased during n>N.

Because of this, image formation is carried out with increased heating amount at the beginning of writing so that shortage of the heating amount can be prevented until the temperature of the recording body is stabilized, so as to produce the high quality image. In practice, 200 lines in the marginal region are heated at the beginning of writing with energy having 1.2 times the usual energy, thereby leading to the good result.

Figure 43:
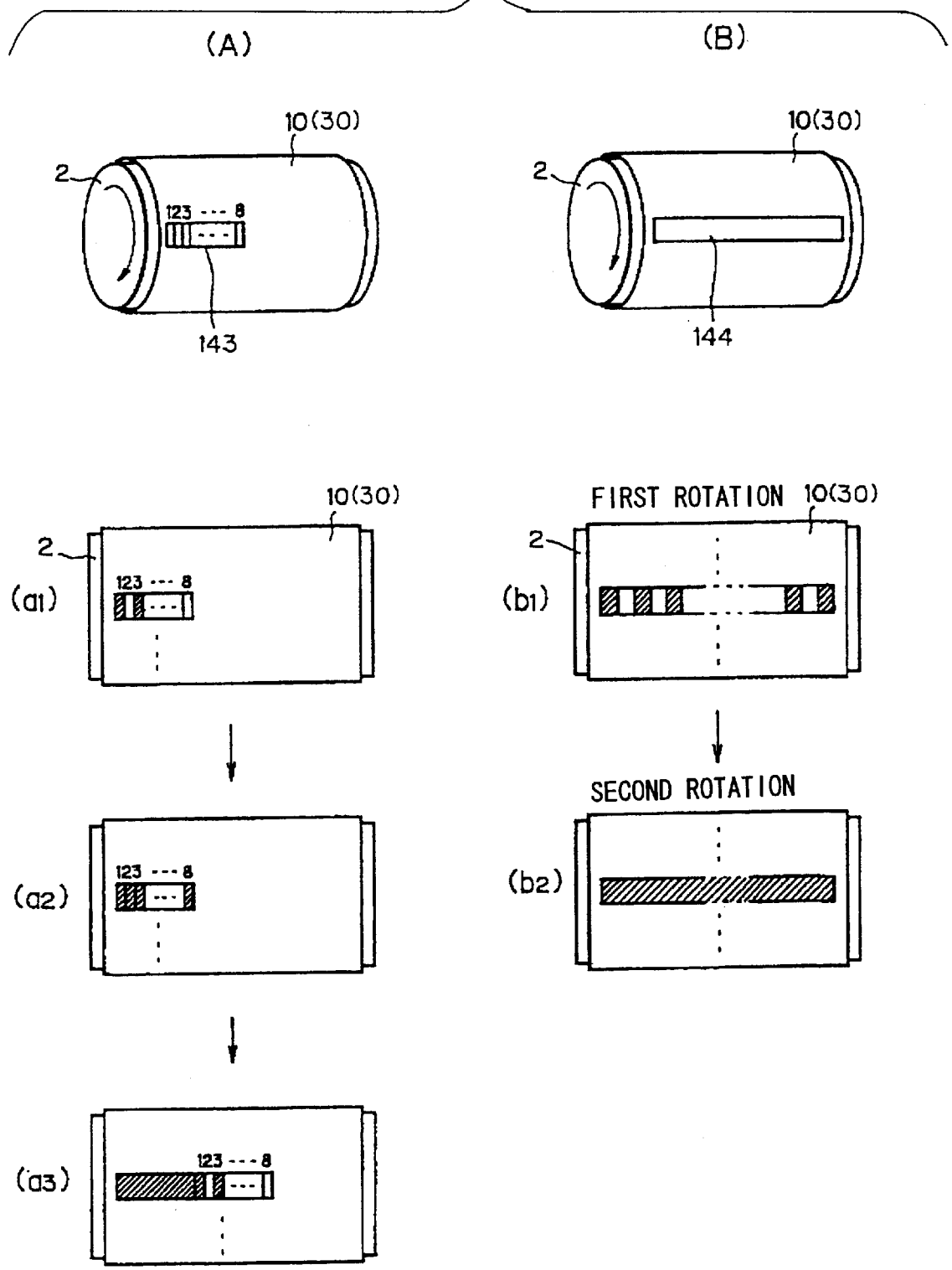
FIG. 43 shows a diagrammatic view to explain operation of the present invention.

FIG. 43 shows a diagrammatic view to explain operation of the present invention. In this figure, 2 shows the recording body roller, 10 shows the recording body, 143 and 144 show multi-head. In FIG. 43(A) the multi-head of the laser source 143 is used, while in FIG. 43(B) the line thermal head 144 is used.

However, in this invention the image forming means has the multi-head and by carrying out writing more than every at least other pixel in the same line, accumulation of heat at the time of writing can be inhibited so as to inhibit the uneven heating, thereby producing the high quality image. In a case where laser source multi-head 143 is used in FIG. 43(A), (a1) every other pixel, four pixels, i.e., the first pixel, the third, the fifth and the seventh pixels are written at the same time, and then (a2) four pixels, i.e., the second, the fourth, the sixth and the eighth pixels are written at the same time, (a3) with a shift of eight pixels in the main scanning direction the similar writing is carried out sequentially to achieve writing for one line. The next line is similarly written with the shift of eight pixels in an opposite direction of the main scanning direction from the same position, or after moving to a home position of the main scanning direction, the same writing as the previous line is carried out so as to achieve writing of the whole image region.

Additionally, in a case where the line thermal head 144 is used, (b1) For each heating element block (4 blocks in all), i.e., for 1 pixel, image formation for one line is accomplished by writing 8 times in all with an even pixel and an odd pixel driven alternatively. The next line is similarly written so as to achieve writing of the whole image region.

(b2) With the recording body 10 moving in the sub-scanning direction, after a half pixel of each line is written by driving every other pixel for each heating element block (4 blocks in all), i.e., the even pixel or the odd pixel to achieve writing from an initial line to a final line, next one rotation writing is carried out by driving the odd pixel or the even pixel which is not driven, so that writing of the whole image region can be accomplished.

FIG. 44 shows a diagrammatic view to explain other embodiment according to the present invention. The multi-head 145 using the laser source as the heating source is shown in FIG. 44(A), while the multi-head 146 using the heating element as the heating source is shown in FIG. 44(B). However, the present invention provides the image forming apparatus comprising the multi-head having the heating source formed more than every other pixel, so that accumulation of heat can be inhibited at the time of writing and heating irregularities can be inhibited, thereby producing the high quality image.

In a case where use is made of 50 mW semiconductor laser x 4 multi-head (spot shape: $\phi 21 \mu m$) as the laser source multi-head 145 shown in FIG. 44(A), 4 pixels are simultaneously written every 2100 pixels (a1), after one rotation is performed for the recording body, writing for 2100 rotation is carried out while shifting the light source one pixel, so that writing of the whole image region is accomplished (a2).

In a case of the thermal head as shown in FIG. 44(B), 300 dpi thermal head is used, in which resistance is 1000 $\Omega$, a fundamental pulse width is 0.3 ms, applied voltage is 12 V and shape of heating element is 40×20 m (the main scanning direction x sub-scanning direction). For each heating element (4 blocks in all), the only even or the only odd pixels is driven every other pixel (b1), and after the first rotation is carried out for the recording body, the head is shifted one pixel in the main scanning direction and writing for second rotation is carried out, so that writing of the whole image region is accomplished.

Figure 45:
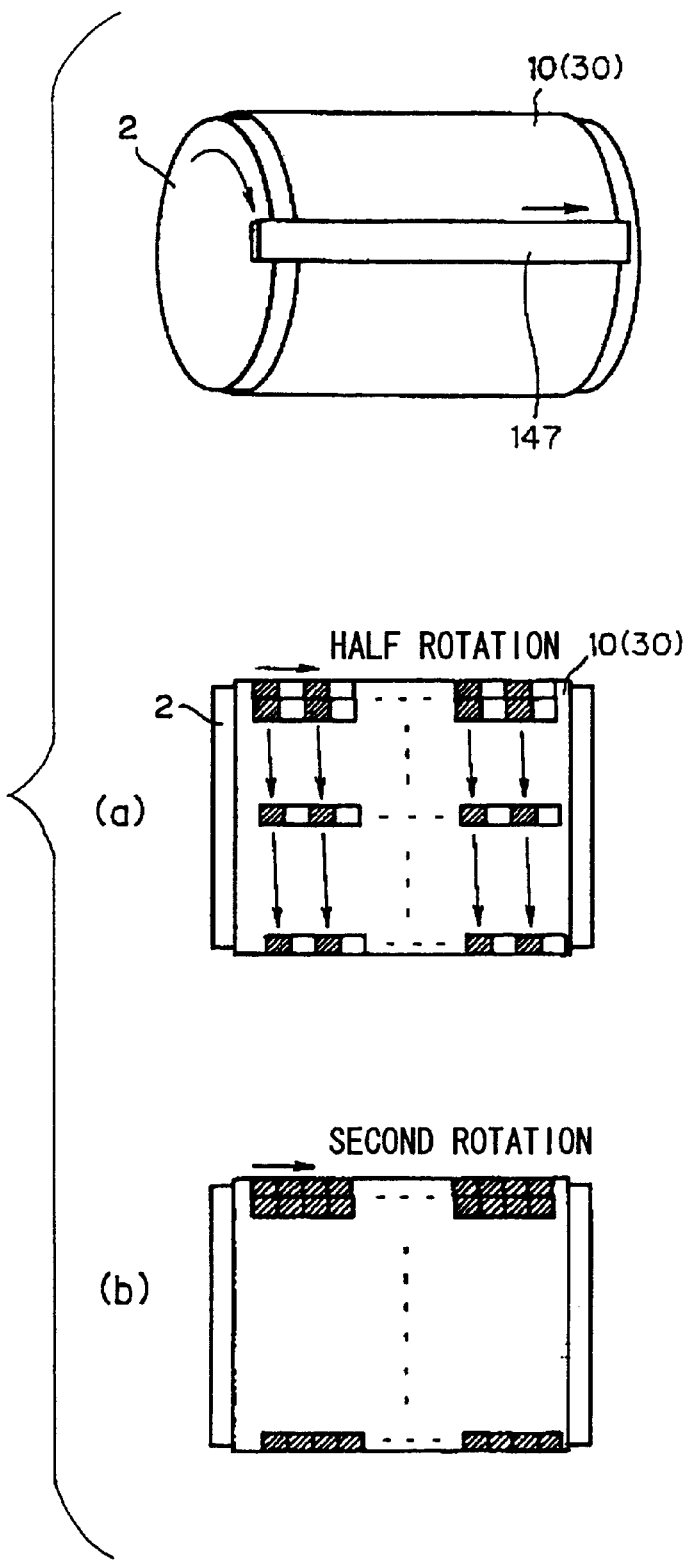
FIG. 45 illustrates an essential structural view to explain other embodiment according to the present invention.

FIG. 45 illustrates an essential structural view to explain other embodiment according to the present invention. In this figure, 2 shows the recording body roller, 10 shows the recording body, 147 shows the multi-head. The image forming means according to the present invention comprises the multi-head 147 and writing is carried out in the same line more than every at least other pixel. Spiral writing is carried out by writing while shifting the head in the main scanning direction little by little, so that accumulation of heat is inhibited at the time of writing and heating irregularities can be inhibited, thereby producing the high quality image.

In FIG. 45, in the case where the laser source multi-head 143 as shown in FIG. 43 is used as the multi-head 147, 4 pixels are simultaneously written every other pixel. One rotation is performed for the recording body 10 and 2100 rotations is also performed while shifting the light source in the main scanning 10 direction little by little to move a distance corresponding to one pixel so as to form the whole image by spiral writing. In the case where the thermal head 144 as shown in FIG. 43 is used as the multi-head, for each heating element block (4 blocks-in all), the only even or the only odd pixels are driven every other pixel. After the first rotation is performed for the recording body, the second rotation is also performed while shifting the head in the main scanning direction little by little to move the distance corresponding to one pixel so as to accomplish the whole image formation by spiral writing. FIG. 45(A) shows a state where a half rotation is carried out for the recording body roller 2 and the head is shifted to a right side the distance of half pixel. FIG. 45(B) shows the state where second rotation is carried out for the recording body roller 2 and the head is shifted to the right side the distance of two pixels.

Figure 46:
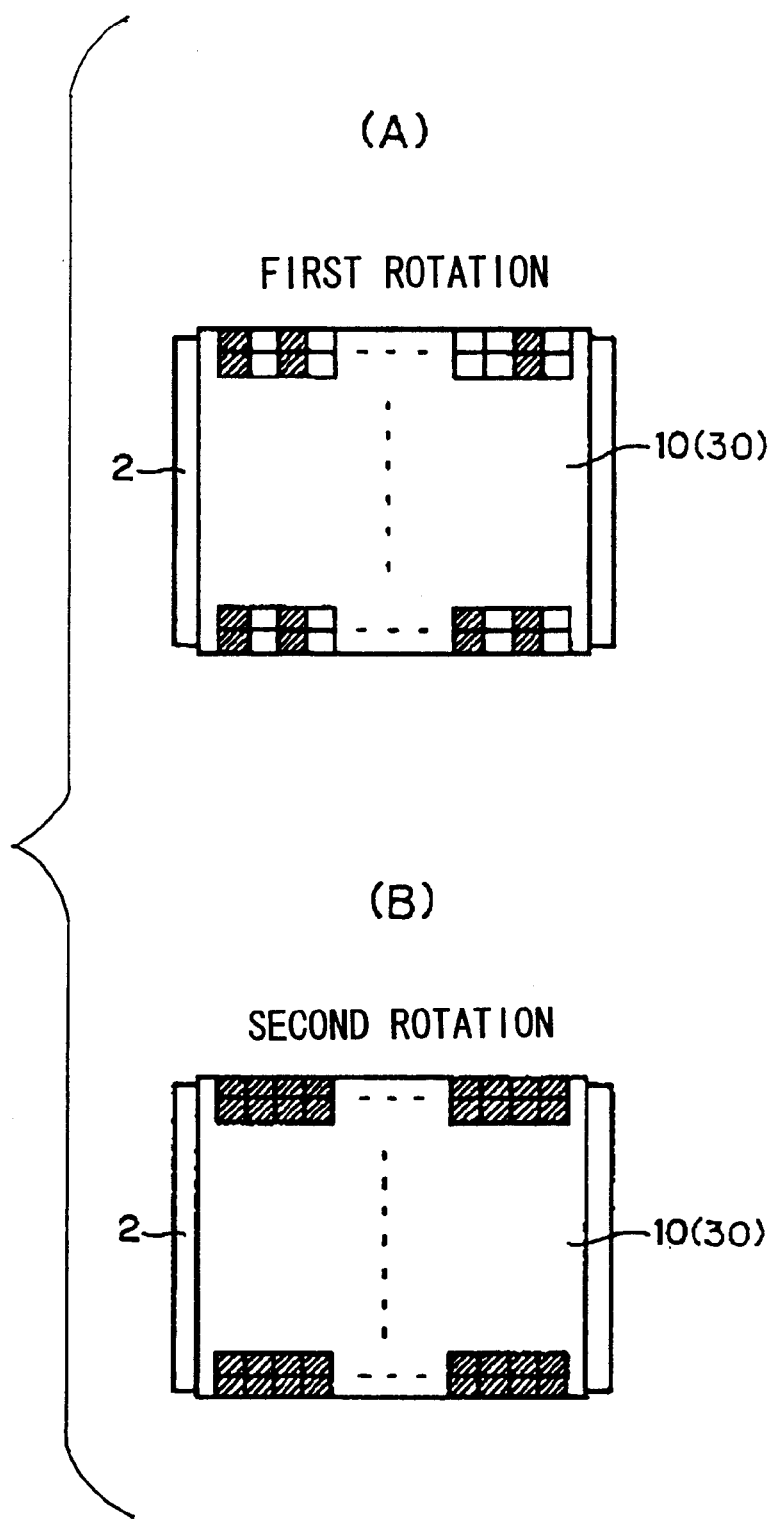
FIG. 46 shows a diagrammatic view to explain the present invention.

FIG. 46 shows a diagrammatic view to explain other embodiment according to the present invention. In this figure, 2 shows the recording body roller, 10 shows the recording body and the image forming means comprises the multi-head and writes at least more than one pixel in the same line (FIG. 46(A)). After the final line is written, the image forming means or the recording body is movable in the main scanning direction so as to continue writing, so that accumulation of heat can be inhibited at the time of writing and heating irregularities can be inhibited, thereby producing the high quality image. In FIG. 46(A), the portion having the slanting line is the pixel to be written (irrespective of heating), while the portion having blank space is the pixel to be written lately. In the case where the laser source multi-head is used, for example, 4 pixels are simultaneously written every 2100 pixels, the whole image formation is accomplished by writing for 2100 rotations while shifting the light source one pixel each time one rotation is carried out for the recording body. Additionally, in the case where the thermal head is used, for example, for each heating element block (4 blocks in all), the only even or the only odd pixels is driven every other pixel and after one rotation is carried out for the recording body, the whole image formation is accomplished by writing the second rotation while shifting the head one pixel in the main scanning direction.

In a case of constructing a multi-color image forming apparatus by the use of the present invention, a plurality of the above-mentioned image forming means is provided to form the construction as shown in FIGS. 25 and 26. It should be noted that in FIGS. 25 and 26 Bk represents black, C represents cyan, M represents magenta and Y represents yellow. For each color, the multi-color image forming apparatus comprises the:head 81, the recording body 82, the developing unit 83, the blade 84, the intermediate transfer roller 85 and the pressing rollers 86 and 87. In the example of FIG. 25, the pressing rollers 86 are provided for each color, while in the example of FIG. 26 the pressing roller 87 is the common roller for each color. It should be noted that the recording paper is designated 91.

As shown in FIGS. 25 and 26, however, in the case where the multi-color high quality image is formed by providing the plurality of image forming means, image formation is carried out for black, cyan, magenta and yellow recording bodies with four multi-head 143 as shown FIG. 43(A), when the laser source multi-head is employed. When the thermal head is employed, image formation is carried out for black, cyan, magenta and yellow recording bodies by the image forming method which employs four multi-head 144 as shown in FIG. 43(B), for example, 300 dpi multi-head As mentioned above, according to the present invention, the recording body 10 (or 30) is heated, for example, the recording body 10 is heated by the laser light to form the latent image. This heating can also realized by scanning the laser light on the recording body by means of the rotating multi-face mirror. A plane light scanning apparatus in which the laser light which is modulated in response to image information signal is scanned by means of the rotating multi-face mirror so as to form the latent image is widely used in a laser beam printer based on an electrophotographic method. The light is scanned on a precharged photoreceptor in response to image information to form an electrostatic latent image by photoelectric conversion. Because the photoreceptor has a high sensitivity, a few to several tens copies having a A4 size can be printed per one minute by means of a few mW laser.

However, in a case where the light is scanned on the recording body having the light-heat converting layer or the recording body comprising the recording layer having the light-heat converting agent dispersed therein to form the latent image on the above recording body by light-to-heat conversion, since the recording body has an extremely low sensitivity, a high power laser may be used, or an increased scanning time may be required to realize writing.

However, in order to reduce the apparatus cost, writing can be realized not by using an expensive high power laser but by increasing the scanning time. The increased scanning time results in slow scanning rate, for example, in a type in which rotating multi-face mirror is moved to rotate by the motor, the rotating multi-face mirror results in drive at low revolution. However, in this case, because the inertia action due to the rotation does not act on, the rotation rate becomes unstable, thereby giving rise to problems regarding rotation irregularities of the multi-face mirror, and changes in scanning rate of the laser beam and in scanning time. This results in irregularities of light-heat conversion. This also results in irregularities of image density, dot and the line size (such as broadening and narrowing or the like).

As stated above, in the light scanning apparatus which employs the rotating multi-face mirror, in a case where the rotating multi-face mirror is driven at a low revolution by the motor, since the inertia action due to the rotation does not act on, the rotation rate becomes unstable, thereby giving rise to problems regarding rotation irregularities of the multi-face mirror, and changes in scanning rate of the laser beam and in scanning time. This results in irregularities of light-heat conversion. This also results in irregularities of image density, dot and the line size (such as broadening and narrowing or the like). Additionally, because the number of the constituting member is large and the member is complicated to become expensive, problems to be solved was to reduce the number of the constituting member and to simplify the member.

Figure 47:
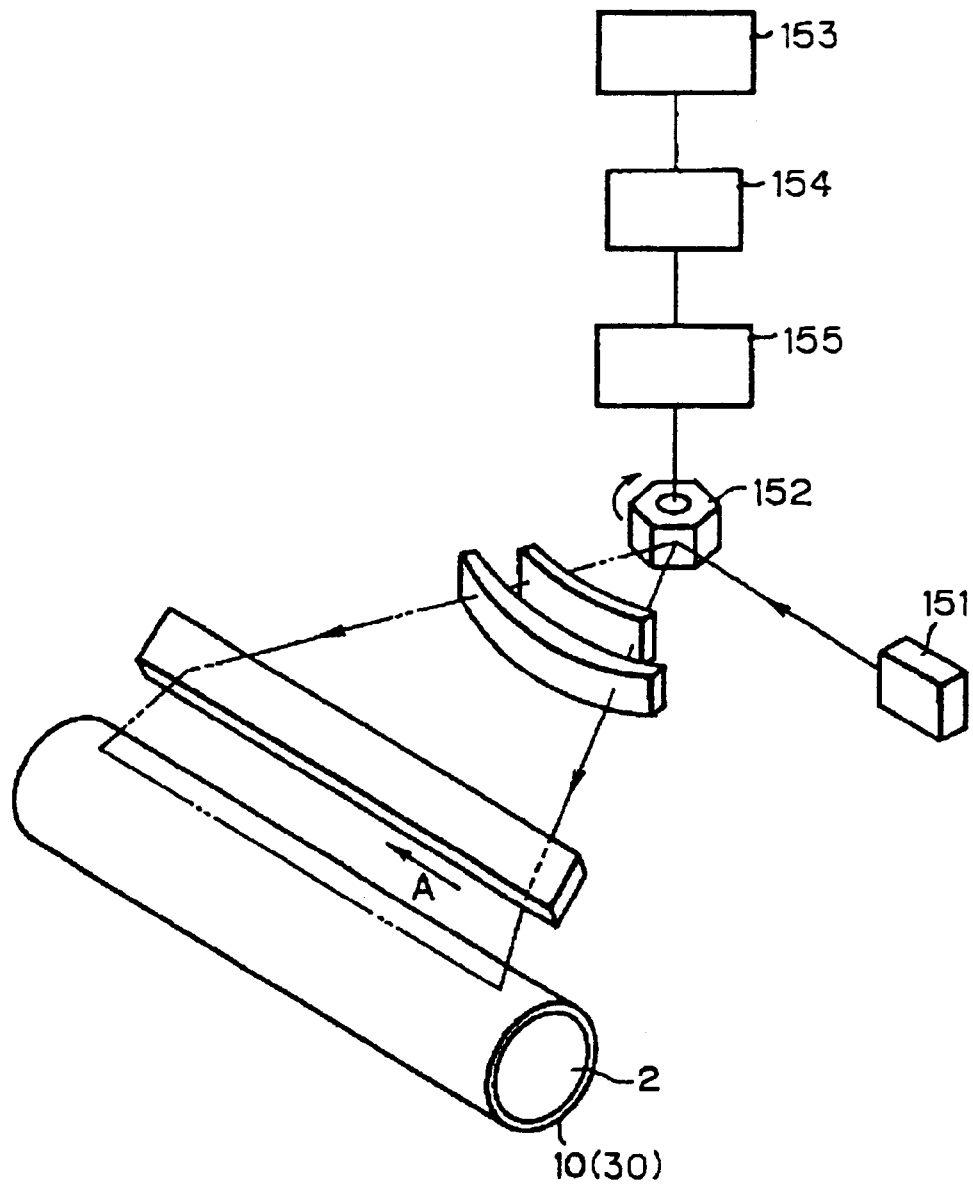
FIG. 47 illustrates an essential structural view to explain one embodiment of a light-scanning apparatus according to the present invention.

FIG. 47 illustrates an essential structural view to explain one embodiment of the light scanning apparatus according to the present invention. In this figure, 151 shows, for example, the semiconductor laser light source, 152 shows the rotating multi-face mirror (a polygon mirror) and 153 shows a motor for rotating the rotating multi-face mirror 152. The laser light from the laser light source 151 is reflected at the rotating multi-face mirror 152 to scan the light on the recording body 10. The present invention is applicable to a case where the latent image is formed on the recording body having the light-heat converting agent by such light scanning method and the scanning rate of light writing can stably be realized even when the rate of light scanning is low.

In the light scanning apparatus which employs the rotating multi-face mirror, in a case where the rotating multi-face mirror is driven at the low revolution by the motor, since the inertia action due to the rotation does not act on, the rotation rate becomes unstable, thereby giving rise to problems regarding rotation irregularities of the multi-face mirror, and changes in scanning rate of the laser beam and in scanning time. This results in irregularities of light-heat conversion. This also results in irregularities of image density, dot and the line size (such as broadening and narrowing or the like).

According to the present invention, in order to solve such problems, the motor is rotated at the high revolution of a stable revolution region and the rotating multi-face mirror can stably be rotated at the low revolution by means of deceleration mechanism 14. As deceleration mechanism 14, use was made of a gear, magnetic pulley idler, pulley belt or the like. This results in stability of the revolution of the multi-face mirror at the low rate, so that the scanning rate and scanning time of the laser beam can be kept constant. This also results in reduction of irregularities of image density, dot and the line size (broadening and narrowing) to obtain a low cost light scanning.

Additionally, in order to stabilize the rotation of the motor, because the number of the constituting member is large and the member is complicated so as to become expensive, it is important to reduce the number of the constituting member and to simplify the member. In order to solve this problem, an inertia mass body 155 is provided on an axis of the motor 153 or the rotating multi-face mirror 152. This inertia mass body 155 preferably has a radius substantially equal to or more than that of revolution of the rotating multi-face mirror. Alternatively, it is possible to use a discal member having a mass substantially equal to or more than that of the rotating multi-face mirror. It should be noted that as the discal member use is made of a plate or a casting formed of a metal, such as iron, aluminum, copper, lead or the like. This results in stability of revolution of the rotating multi-face mirror at the low rate, so that the light scanning apparatus can be obtained without irregularities of image density, dot and the line size (broadening and narrowing) or the like. Additionally, because the constituting member is only discal member, low cost apparatus can be realized.

What is claimed is:

1. An image recording body comprising:

a recording layer having a receding contact angle that decreases when a surface of said recording layer contacts a liquid in a heated state and increases when said surface of said recording layer is heated in a non-contact state with the liquid;

a dye or pigment disposed in said recording layer in a dispersed state and configured to absorb light in response to image information; and a reflecting layer which reflects light and is provided between said recording layer and a substrate, wherein a surface of the reflecting layer has a roughness (Rz) from 0.1 micron to 10 micron so that light is scattered at the surface.

2. The image recording body as claimed in claim 1, wherein said recording layer comprises an organic material including a site having changeable character of wettability and a site which absorbs light in response to image information to achieve recording.

3. The image recording body of claim 1, comprising:

said recording layer having thermal changeable character of wettability; and a substrate carrying said recording layer and configured to be heated to form a latent image on said recording layer and said latent image then developed to transfer to a recording paper, wherein said recording layer has a Young's modulus of less than $1.0 \times 10^7$ N/m$^2$ and a thickness of more than 2 μm.

4. The image recording body of claim 1, comprising:

said recording layer having thermal changeable character of wettability; and a substrate carrying said recording layer and configured to be heated to form a latent image on said recording layer and said latent image then developed to transfer to a recording paper, wherein said substrate has a Young's modulus of less than $1.0 \times 10^8$ N/m$^2$ and a thickness of more than 25 μm.

5. The image recording body of claim 1, comprising:

said recording layer having thermal changeable character of wettability;

a substrate; and a cushion layer having a elastic property and provided between said substrate and said recording layer, said cushion layer configured to be heated to form a latent image on said recording layer and said latent image then developed to transfer to a recording paper, wherein said cushion layer has a Young's modulus of less than $8.0 \times 10^7$ N/m$^2$ and a thickness of more than 5 μm.

6. The image recording body as claimed in claim 1, wherein the content of said pigment is in a range between 10 and 30 wt % while the content of said dye is in a range between 1 and 10 wt %.

7. An image recording body comprising:

a recording layer which absorbs light in response to image information so as to achieve recording, said recording layer comprising a copolymer including a first monomer unit with a changeable character of wettability and including a second monomer unit having a skeleton structure of a dye as a side chain.

8. The image recording body as claimed in claim 7, further comprising:

a reflecting layer having a surface roughness (Rz) from 0.1 micron to 10 micron so that light is scattered at the rough surface.

* * * * *